United States Patent [19]

Tierney

[11] Patent Number: 4,682,304
[45] Date of Patent: Jul. 21, 1987

[54] ASYNCHRONOUS MULTIPLE BUFFERED COMMUNICATIONS INTERFACE HAVING AN INDEPENDENT MICROPROCESSOR FOR CONTROLLING HOST/PERIPHERAL EXCHANGES

[75] Inventor: Lannie J. Tierney, Tigard, Oreg.

[73] Assignee: Tektronix, Inc., Beaverton, Oreg.

[21] Appl. No.: 867,640

[22] Filed: May 23, 1986

Related U.S. Application Data

[63] Continuation of Ser. No. 520,395, Aug. 4, 1983, abandoned.

[51] Int. Cl.⁴ .................... G06F 3/00; G06F 13/00
[52] U.S. Cl. .................................................. 364/900
[58] Field of Search ... 364/200 MS File, 900 MS File; 340/825.06, 825.34; 370/85

[56] References Cited

U.S. PATENT DOCUMENTS

| | | | |
|---|---|---|---|
| 3,699,530 | 10/1972 | Capowski et al. | 364/200 |
| 4,074,352 | 2/1978 | Cook et al. | 364/200 |
| 4,276,594 | 6/1981 | Morley | 364/200 |
| 4,342,095 | 7/1982 | Goodman | 364/900 |
| 4,394,734 | 7/1983 | Norgren et al. | 364/200 |
| 4,484,263 | 11/1984 | Olson et al. | 364/200 |
| 4,507,732 | 5/1985 | Catiller et al. | 364/200 |

Primary Examiner—Archie E. Williams, Jr.
Assistant Examiner—William G. Niessen
Attorney, Agent, or Firm—William A. Birdwell; John P. Dellett; Robert S. Hulse

[57] ABSTRACT

A communications interface for controlling asynchronous data transmission between a host computer and an input/output device achieves very high data transfer rates and reduces I/O bottlenecks. The interface includes a microprocessor and a memory addressable thereby. The microprocessor controls data transfer from the host computer into an output buffer maintained within the memory and controls subsequent data transfer from the output buffer to an output device, independently of the operation of the host computer. Data received from the host computer is stored directly into an appropriate output buffer storage location without any time-consuming reading and writing of the data by the microprocessor. This is accomplished by providing a hardware register for storing data received from the host computer. At the appropriate time data transfer from the microprocessor to the memory is disabled, and data transfer from the register to the memory is enabled. Data is thus rapidly transferred from the register directly into the memory location addressed by the microprocessor.

13 Claims, 8 Drawing Figures

४,६८२,३०४

ASYNCHRONOUS MULTIPLE BUFFERED COMMUNICATIONS INTERFACE HAVING AN INDEPENDENT MICROPROCESSOR FOR CONTROLLING HOST/PERIPHERAL EXCHANGES

This is a continuation of application Ser. No. 520,395 filed Aug. 4, 1983 and now abandoned.

FIELD OF THE INVENTION

This invention pertains to input/output interfaces for facilitating communication between a digital computer and one or more input/output devices. In particular, the invention pertains to an interface for controlling asynchronous communication between a digital computer and an input/output device such as a high-speed keyboard-equipped graphics terminal.

BACKGROUND

Communications interfaces facilitate digital computer input/output operations by controlling the flow of data transmitted by the computer to one or more output devices and the flow of data transmitted from one or more input devices to the computer.

Typically, the computer is programmed to transmit output data to a communications interface which, in turn, transmits the data to the output device in controlled fashion, at the relatively slow data transfer rate at which the output device operates, thereby freeing the computer from the task of ensuring that all applicable data transmission protocols are adhered to while the data is transmitted to the output device.

The computer programming for transferring data from the computer to an output device is usually such that a check is first made by the computer to determine whether the communications interface is already "busy" transmitting data to the output device. If the communications interface is "busy", then the computer must wait some minimum time interval before again checking to see if the communications interface is free to accept fresh data. If the communications interface is "free", then a data character is transmitted to the communications interface, which then enters the "busy" state, and transmits the data character to the output device, independently of the operation of the computer. Because the data transfer rate attainable by even a very high-speed output device will be relatively slow in comparison to the data transfer rate attainable by the computer, the communications interface remains in the "busy" state for a comparatively long time. If the computer has additional data available for transmission to the output device it must wait until the communications interface has reverted from the "busy" state to the "free" state. Such waiting causes a bottleneck which may impede operating some very high-speed output devices (such as graphics terminals, which may be capable of operating at 19,200 baud data transfer rates) at their maximum capabilities.

The present invention substantially reduces the time during which the computer must wait for the communications interface to revert from the "busy" state to the "free" state and become available to accept fresh data for transmission to the output device. The communications interface of the present invention may accept up to 1,022 data characters from the computer much faster than a conventional output device can accept that data. The data is temporarily stored in an output buffer included in the communications interface. The transfer of data from the computer to the temporary output storage buffer is handled by high-speed electronic hardware, in a manner which minimizes the time the computer must wait before fresh data may be transmitted. The communications interface then transmits the data from the temporary output storage buffer to the output device at the relatively slow data transfer rate attainable by the output device and independently of the operation of the computer which initiated the data output operation.

A corresponding data transfer bottleneck may be encountered during the transmission of data from an input device to the computer. The computer may, for example, be busy executing some non-input task when the input device presents the communications interface with a stream of data characters for input to the computer. If the computer does not happen to be ready to accept fresh input data then the data may be lost, necessitating retransmission of the data to the computer.

The communications interface of the present invention also includes a temporary input storage buffer in which up to 2,048 input data characters received from an input device may be temporarily stored for subsequent rapid transfer to the computer. Thus, a relatively large block of data may be assembled for input to the computer. This is advantageous when input is to be received from a relatively high-speed input device at a time when the computer is heavily burdened by some other operation, such as outputting data to a very high-speed output device. The communications interface accepts the input data and stores it temporarily in the input storage buffer independently of the operation of the computer, thereby minimizing the likelihood that input data may be lost.

It is accordingly an object of the present invention to provide a data communications interface having output buffer storage for rapidly accumulating data output by the computer and for temporarily storing that data for subsequent transmission to a relatively slow speed output device, independently of the operation of the computer.

It is a further object of the invention to provide a communications interface having input buffer storage for accumulating, independently of the operation of the computer, data received from an input device and for temporarily storing that data for subsequent rapid transmission to the computer.

SUMMARY OF THE INVENTION

Accordingly the present invention provides a communications interface for controlling data transmission between a host computer and an input/output device. The communications interface uses a programmable controller, such as a microprocessor, and a data storage device accessible by the programmable controller. The controller governs data transfer from the host computer via a first data buffer to an output buffer maintained within the data storage device. The controller also controls subsequent transfer of the data from the output buffer to an output device independently of the operation of the host computer. Further the controller governs data transfer from an input device to an input buffer maintained within the data storage device, also independently of the operation of the host computer, and subsequently controls transfer of data from the input buffer to the host computer via a second data buffer. For each output device there is a corresponding output buffer, and for each input device there is a corresponding input buffer.

The output buffer has a plurality of sequentially addressable data storage locations in the data storage device. Data transmitted by the host computer is stored directly into the next sequentially available data storage location of the output buffer. The controller does not read or write data. This is accomplished by storing data from the host computer in the first data buffer and then disabling data transfer from the controller to the data storage device and enabling data transfer from the first data buffer to the data storage device. Data is thus transferred from the first data buffer directly into a data storage location of the data storage device addressed by the controller.

The communications interface also includes a counter which is used to signal the host computer whether data storage locations are available. Data characters from the host computer are counted, and when the counter overflows, a signal notifies the host computer that the output buffer has no available data storage locations. If a preselected number of storage locations of the output buffer is available to receive data, the counter is reset, and a signal notifies the host computer accordingly.

The communications interface is further provided with an address storage device accessible by the controller, the address storage device pointing to the address of the next sequentially available output buffer data storage location; and a digital circuit is provided for incrementing the pointer in the address storage device or for resetting the pointer to the address of the first data storage location of the output buffer when the address of the last data storage location of the output buffer is exceeded.

Appropriate timers are provided to selectively delay data output and to transfer the data from the output buffer to the output device at a specified rate.

DETAILED DESCRIPTION OF THE PREFERRED EMBODIMENT

I. Introduction

Figure 1:
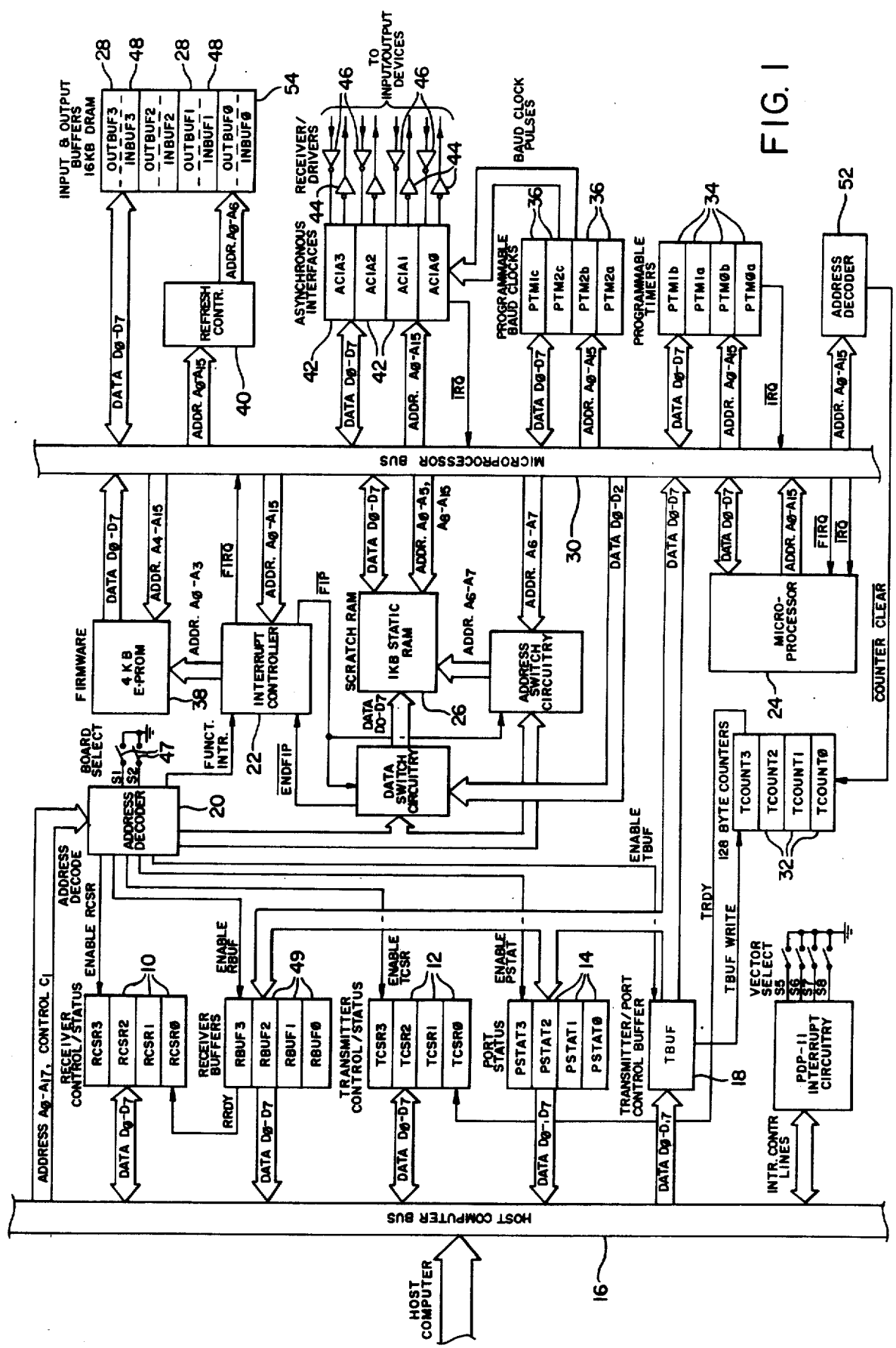
FIG. 1 is a block diagram of the preferred embodiment.

The preferred embodiment to be described is a quad (four channel) asynchronous buffered communications interface for controlling data transmission between a Digital Equipment Corporation ("DEC") PDP-11 TM digital computer and up to four separate full duplex RS232C compatible input/output devices i.e., conforming to RS232C industry standards for asynchronous transmission.

The communications interface of the preferred embodiment is controlled by "programmable control means," namely, a microprocessor. Hereinafter, the term "host computer" is used to refer to the DEC PDP-11 TM computer from which output data is to be transmitted to an output device, or to which input data is to be transmitted from an input device. The term "microprocessor" is used exclusively to refer to the programmable control means which controls the operation of the preferred communications interface.

I (a). Data Transfer From Host Computer to Output Device

Data is transferred, one character at a time, from the host computer to an output device in two stages. During the first stage, data is rapidly transferred, by special purpose electronic hardware operating under the microprocessor's control, from the host computer into a temporary output storage buffer provided on the communications interface. During the second stage, data temporarily stored in the output buffer is transmitted to the output device, one character at a time, independently of the operation of the host computer, and at the relatively slow data transmission rate attainable by the output device.

Conventionally, the operation of transferring data from the host computer to the output buffer would be accomplished with an intermediate operation in which the microprocessor would read the data presented by the host computer and subsequently write the data into the appropriate output buffer data storage location. This, however, is relatively time consuming. In the preferred embodiment, the aforesaid special purpose electronic hardware facilitates direct storage into the output buffer of data presented by the host computer, without necessitating any reading or writing of the data by the microprocessor.

Utilizatiion of the host computer's operating time is thus optimized by reducing the number of host computer operating cycles completed before the communications interface becomes free to accept another data character for output.

I (b). Data Transfer From Input Device to Host Computer

Data is also transferred, one character at a time, from an input device to the host computer in two stages. During the first stage, which proceeds at the relatively slow data transfer rate attainable by the input device, and independently of the operation of the host computer, data received from the input device is temporarily stored in an input storage buffer provided on the communications interface. During the second stage, which occurs whenever the host computer is free to accept the input data, the data is rapidly transferred, one character at a time, from the temporary input storage buffer to the host computer.

Because the first data input stage proceeds independently of the operation of the host computer, the possibility of losing input data because the host computer is too busy to accept that data is eliminated.

II. Block Diagram Overview

FIG. 1 is a block diagram representative of the preferred communications interface, which is capable of simultaneously controlling asynchronous data transfer between a host computer 110 and up to four output devices, and between the host computer and up to four input devices. Thus, the communications interface includes four data output channels and four data input channels.

Operation of the communications interface is controlled by microprocessor 24. EPROM 38 contains the firmware program which defines the sequence of operations performed by microprocessor 24. Static RAM 26 serves as an "address storage means" in which tables of address pointers to the temporary input and output storage buffers are maintained. The temporary input and output storage buffers are maintained in a "data storage means," namely dynamic RAM 54, which is controlled and refreshed by RAM controller 40

A separate temporary, cyclical, output storage buffer ("OUTBUF") 28 is maintained in RAM 54 for each of the four output channels. Similarly, a separate, cyclical, input storage buffer ("INBUF") 48 is maintained in RAM 54 for each input channel. OUTBUFs 28 each include 2,048 sequentially addressable one-byte storage locations. The output buffer storage locations are used in pairs, to store a data character and an "attribute code" which is utilized, as hereinafter explained, to control some aspects of the manner in which the data character is transmitted to the output device. Each output buffer thus contains 1,024 pairs of one-byte storage locations. However, only 1,022 pairs of storage locations are actually utilized in each buffer. This is to avoid time-consuming buffer pointer address comparison operations which would otherwise be required to determine whether the "oldest" data character in a particular buffer might be overwritten by a newly received data character. The storage capacity of each output buffer is therefore 1,022 data characters plus 1,022 attribute codes. Although each data character stored in a particular output buffer is in fact separated, by an attribute code, from the next data character stored in the same output buffer, the output buffers are nonetheless described herein as each comprising 1,022 "sequentially addressable" data storage locations. Each input buffer includes 2,048 sequentially addressable data storage locations (i.e. each input buffer may store a maximum of 2,048 data characters).

Up to four communications interfaces, each controlling four input/output channel pairs, may be used with a single host computer. Switches 47 (FIGS. 1 and 5) may be set to identify each of the four possible interfaces with a unique one-of-four code addressable by the host computer.

II (a). Data Transfer From Host Computer to Output Device

A transmitter ready ("TRDY") flag is maintained for each output channel to signal the host computer when the communications interface is ready to accept a fresh data character for output via a particular channel. The hardware TRDY flags facilitate direct interrupts of the host computer. The TRDY flags, which are maintained in transmitter control/status registers ("TCSR") 12, may also be interrogated by the host computer if it is outputting data with interrupts disabled.

The host computer presents the data character to the communications interface via the host computer bus 16. The eight-bit data character is stored in a temporary (hardware) holding register ("TBUF") 18. The host computer also presents address decoder 20 with address information identifying the output channel servicing the output device to which the data character is to be transferred. After decoding this information, address decoder 20 triggers interrupt controller 22 which interrupts the operation of microprocessor 24. Microprocessor 24 then obtains from the address pointer tables maintained in RAM 26, an address which points to the next sequentially available data storage location in whichever of OUTBUFs 28 is associated with the output device to which the data character is to be transferred. The data character is then transferred, on microprocessor bus 30, from TBUF 18, directly into the appropriate OUTBUF 28, as hereinafter explained.

Microprocessor 24 controls the transfer of data from OUTBUFs 28 to their associated output devices in conventional fashion with the aid of asynchronous communication interface adapters ("ACIAs") 42 and line drivers 44. One ACIA is provided for each input/output channel pair, and each output channel is provided with a line driver 44.

A counter 32 is provided for each of the four output channels to assist in ensuring (as hereinafter explained) that OUTBUFs 28 do not overflow. A programmable timer 34 is also provided for each output channel for timing delayed output of successive data characters, as hereinafter explained. Each channel is also provided with a programmable clock 36 for controlling the channel data transfer rate, as hereinafter explained.

II (b). Data Input From Input Device to Host Computer

Line receivers 46 (one per input channel) convey serial input data from the input devices to the associated ACIAs 42 which convert the data to parallel form and, in turn, interrupt the operation of microprocessor 24. Microprocessor 24 transfers the input data character from the receiving ACIA into whichever of INBUFs 48 is associated with the output device from which the data was received. Data characters temporarily stored in INBUFs 48 are then transferred, one character at a time, by microprocessor 24 to a (hardware) receiver buffer ("RBUF") 49. Each input channel is provided with a separate RBUF register.

A receiver ready ("RRDY") flag is maintained for each input channel to signal the host computer when a fresh data character is waiting to be read from the associated RBUF 49. The RRDY flags facilitate direct interrupts of the host computer. The RRDY flags, which are maintained in receiver control/status registers ("RCSR") 10, may also be interrogated by the host computer if it is inputting data with interrupts disabled.

II (c). Channel Status and Control

The communications interface of the preferred embodiment facilitates software control, by the host computer, of the operating characteristics of each of the four input/output channels serviced by the communications interface. Channel (or, "port") status and control registers (respectively, "PSTAT" 14, and "PCTR") are maintained for each input/output channel pair. By interrogating the appropriate PSTAT 14 the host computer may determine the current operating characteristics of a particular input/output channel. Similarly, the host computer may, by depositing an appropriate code in a particular PCTR, change the current operating characteristics of a particular input/output channel.

Channel characteristics which may be determined and/or controlled by the host computer are largely arbitrary, but may, for example, include the channel data transfer rate, and a "flagged input mode" facility for terminating input data transmission by a particular input device if the associated INBUF 48 is full. The definition of these characteristics may be varied, via suitable programming of the host computer and microprocessor 24, to suit the particular environment in which the communications interface must operate. Accordingly, in the description of the block diagram of FIG. 1 these characteristics are not discussed in great detail.

III. Detailed Description of Microcircuitry and Microprocessor Firmware

The communications interface of the present invention accomplishes data transfer operations with the aid of special purpose microcircuit hardware and firmware (i.e. a computer program) which programs the operation of microprocessor 24. The interaction between the microcircuitry and the firmware is now described in detail.

III (a). Registers and Microprocessor Interrupts

Figure 2:
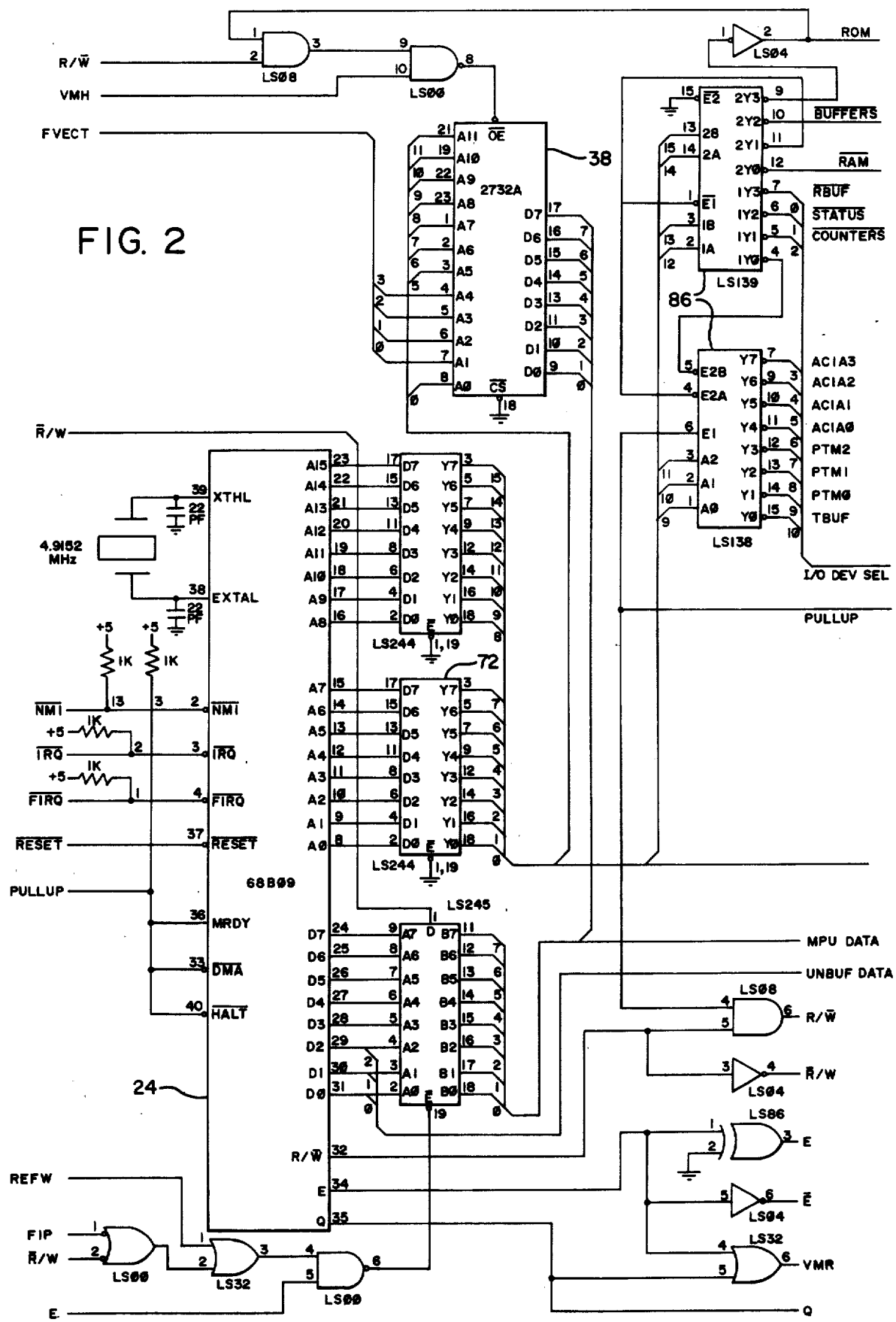
FIG. 2 is an electronic circuit schematic diagram of the microprocessor and electronically programmable read only memory ("EPROM") microcircuitry of the preferred embodiment.

Seven 16-bit registers are maintained on the communications interface in respect of each input/output channel pair. These registers, which are addressable by the host computer via address decoders 86 (FIG. 2), are used to pass data characters, channel control and status information between the host computer and the communications interface. Six of the seven registers have already been mentioned, namely, RCSRs 10, TCSRs 12, PSTATs 14, TBUF 18, RBUFs 49, and the PCTRs. The seventh register is a data attributes register (ATTR) used to pass data attribute codes from the host computer to the communications interface, as hereinafter explained.

The ATTR, PCTR and TCSR registers each pertain to data output operations. As hereinafter explained, there are three types of data output operation; namely, output of a normal data character (to which TCSRs 12 pertain), output of a data attribute code (to which the ATTR register pertains) and output of channel control information (to which the PCTR registers pertain). Since only one type of output operation may occur at any given time with respect to a particular output channel, the addresses in which the TCSRs are maintained may also be used to maintain the ATTRs and PCTRs. The three register types are distinguished by setting bits 4 and 5 thereof as will shortly be explained.

The TBUF register is used only during data output operations. Conversely, the PSTAT registers are used to input status information to the host computer. Accordingly, since input and output operations never occur at the same time on a given input/output channel pair, the address in which the TBUF register is maintained may also be used to maintain the PSTAT register.

The registers are configured as follows:

| | Receiver Status Register (RCSR) | | | | | | | | | | | | | | | |
|---|---|---|---|---|---|---|---|---|---|---|---|---|---|---|---|---|
| Bit | 15 | 14 | 13 | 12 | 11 | 10 | 9 | 8 | 7 | 6 | 5 | 4 | 3 | 2 | 1 | 0 |
| | [—] | [—] | [—] | [—] | [—] | [—] | [—] | [—] | [—] | [—] | [—] | [—] | [—] | [—] | [—] | [—] |
| | | | | | UNASSIGNED | | | | | | | | | | | |
| RECEIVER DONE (RRDY) | | | | | | | | | | | | | | | | |
| RECEIVER INTERRUPT ENABLE (RINTE) | | | | | | | | | | | | | | | | |
| UNASSIGNED | | | | | | | | | | | | | | | | |
| UNASSIGNED | | | | | | | | | | | | | | | | |
| UNASSIGNED | | | | | | | | | | | | | | | | |
| UNASSIGNED | | | | | | | | | | | | | | | | |
| UNASSIGNED | | | | | | | | | | | | | | | | |
| UNASSIGNED | | | | | | | | | | | | | | | | |

| Bit | Description and Operation |
|---|---|
| 15–8 | Unassigned |
| 7 | This is the RRDY flag which is set when a data character has been transferred to the associated RBUF 49 for input to the host computer. It is cleared when the host reads the contents of RBUF. |
| 6 | This bit, when set, causes a host computer interrupt request to be generated each time the RRDY flag is set. It may be cleared by the host program. |
| 5–0 | unassigned. |

| | Receiver Data Buffer Register (RBUF) | | | | | | | | | | | | | | | |
|---|---|---|---|---|---|---|---|---|---|---|---|---|---|---|---|---|
| Bit | 15 | 14 | 13 | 12 | 11 | 10 | 9 | 8 | 7 | 6 | 5 | 4 | 3 | 2 | 1 | 0 |
| | [—] | [—] | [—] | [—] | [—] | [—] | [—] | [—] | [—] | [—] | [—] | [—] | [—] | [—] | [—] | [—] |
| | | | | | UNASSIGNED | | | | | | | | | | | |
| | | | | | | | | | | | | | | | RECEIVED DATA | |

| Bit | Description and Operation |
|---|---|
| 15–8 | Unassigned |
| 7–0 | These bits contain the data character to be read by the host program. The data is valid only if the RRDY flag in the associated RCSR is set. |

Transmitter Status Register (TCSR)

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | [—] | [—] | [—] | [—] | [—] | [—] | [—] | [—] | [—] | [—] | [—] | [—] | [—] | [—] | [—] | [—] |

UNASSIGNED

TRANSMITTER DONE (TRDY)

TRANSMITTER INTERRUPT ENABLE (TINTE)

SAME STATE AS BIT 4

SAME STATE AS BIT 5

UNASSIGNED

UNASSIGNED

UNASSIGNED

UNASSIGNED

| Bit | Description and Operation |
|---|---|
| 15–8 | Unassigned |
| 7 | This is the TRDY flag which indicates that the host 15 computer may output data through TBUF 18. |
| 6 | This bit, when set, causes a host computer interrupt request to be generated whenever the TRDY flag is set. It may be cleared by the host program. |
| 5,4 | These two bits are used to indicate whether this register is to be interpreted as TCSR, ATTR, or PCTR. Both bits must be the same (both set or cleared) if this is to be interpreted as a TCSR register. |
| 3–0 | Unassigned. |

Port Control Register (PCTR)

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | [—] | [—] | [—] | [—] | [—] | [—] | [—] | [—] | [—] | [—] | [—] | [—] | [—] | [—] | [—] | [—] |

UNASSIGNED

REQUEST BIT 7

REQUEST BIT 6

CLEARED

SET

REQUEST BIT 3

REQUEST BIT 2

REQUEST BIT 1

REQUEST BIT 0

| Bit | Description and Operation |
|---|---|
| 15–8 | Unassigned |
| 7 | Buffer Control Request Bit. |
| 6 | Buffer Control Request Bit. |
| 5,4 | Bit 5 must be cleared and bit 4 must be set if this is to be interpreted as PCTR register. |
| 3–0 | Buffer Control Request Bits. Refer to "PORT CONTROL REQUESTS" in the PROGRAMMING section for correct request protocol. |

See Appendix A for a summary of the buffer control request codes which may be specified via appropriate settings of the buffer control request bits.

Data Attributes Register (ATTR)

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | [—] | [—] | [—] | [—] | [—] | [—] | [—] | [—] | [—] | [—] | [—] | [—] | [—] | [—] | [—] | [—] |

-continued

| | | | | | | | | |
|---|---|---|---|---|---|---|---|---|
| UNASSIGNED | | : | : | : | : | : | : | : |
| START OF REPEAT SEQUENCE | | | : | : | : | : | : | : |
| END OF REPEAT SEQUENCE | | | | : | : | : | : | : |
| SET | | | | | : | : | : | : |
| CLEARED | | | | | | : | : | : |
| DATA OUTPUT INHIBIT | | | | | | | : | : |
| | | | | | | | | DELAY UNIT |

| Bit | Description and Operation |
|---|---|
| 15–8 | Unassigned |
| 7 | When set this marks the first character of an output buffer repeat sequence. |
| 6 | When set this marks the end character of an output buffer repeat sequence. |
| 5,4 | Bit 5 must be set and bit 4 must be cleared if this 15 is to be interpreted as an ATTR register. |
| 3 | When this bit is set the character is not output to the terminal. |
| 2–0 | These 3 bits indicate the delay requested before the next character is output. |
| See Appendix A for particulars of action taken in respect of bits 7, 6 and 2–0. | |

Transmit Data Register (TBUF)

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | [—] | [—] | [—] | [—] | [—] | [—] | [—] | [—] | [—] | [—] | [—] | [—] | [—] | [—] | [—] | [—] |
| UNASSIGNED | | | | | | | | | | | | | | | | |
| TRANSMITTED DATA | | | | | | | | | | | | | | | | |

| Bit | Description and Operation |
|---|---|
| 15–8 | Unassigned |
| 7–0 | These bits contain the data character to be transmitted to the output buffer and then on to the output device. |

The registers are configured as follows:

Receiver Status Register (RCSR)

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | [—] | [—] | [—] | [—] | [—] | [—] | [—] | [—] | [—] | [—] | [—] | [—] | [—] | [—] | [—] | [—] |
| UNASSIGNED | | | | | | | | | | | | | | | | |
| CLEARED | | | | | | | | | | | | | | | | |
| DOUBLE <CTRL C> DETECTED | | | | | | | | | | | | | | | | |
| DATA OVERRUN | | | | | | | | | | | | | | | | |
| FRAMING ERROR | | | | | | | | | | | | | | | | |
| UNASSIGNED | | | | | | | | | | | | | | | | |
| UNASSIGNED | | | | | | | | | | | | | | | | |
| UNASSIGNED | | | | | | | | | | | | | | | | |
| UNASSIGNED | | | | | | | | | | | | | | | | |

| Bit | Description and Operation |
|---|---|
| 15–8 | Unassigned |
| 7 | When cleared this bit indicates that the terminal input status is reflected in bits 4–6. When set this bit indicates that port control request status is reflected in bits 4–6. |
| 6 | When set this bit indicates that two consecutive <CTRL C>s were received from the input device. |
| 5 | When set this bit indicates an input buffer or ACIA overflow. |
| 4 | When set this bit indicates that an improperly |

-continued

|   | |
|---|---|
| | framed character was received as the stop bit was not received as expected. It usually means that a BREAK code was received from the output device. |
| 3–0 | Unassigned. |
| | See Appendix A for further particulars of action taken in respect of the assigned bits. |

Port Status Register (PSTAT) Address 176XX6*
(Port Control Status Request)

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | [—] | [—] | [—] | [—] | [—] | [—] | [—] | [—] | [—] | [—] | [—] | [—] | [—] | [—] | [—] | [—] |
| | : | : | : : : UNASSIGNED : : : | | | | | | : | : | : | : | : | : | : | : |
| SET | | | | | | | | | : | : | : | : | : | : | : | : |
| | | | | | | | | | | : : STATUS : : | | | | | |
| UNASSIGNED | | | | | | | | | | | | | : | : | : | : |
| UNASSIGNED | | | | | | | | | | | | | | : | : | : |
| UNASSIGNED | | | | | | | | | | | | | | | : | : |
| UNASSIGNED | | | | | | | | | | | | | | | | : |

| Bit | Description and Operation |
|---|---|
| 15–8 | Unassigned |
| 7 | When set this bit indicates that the port control request status is reflected in bits 4–6. When cleared this bit indicates that terminal input status is reflected in bits 4–6. |
| 6–4 | See Appendix A for the returned status bit codes. |
| 3–0 | Unassigned. |

Figure 5A:
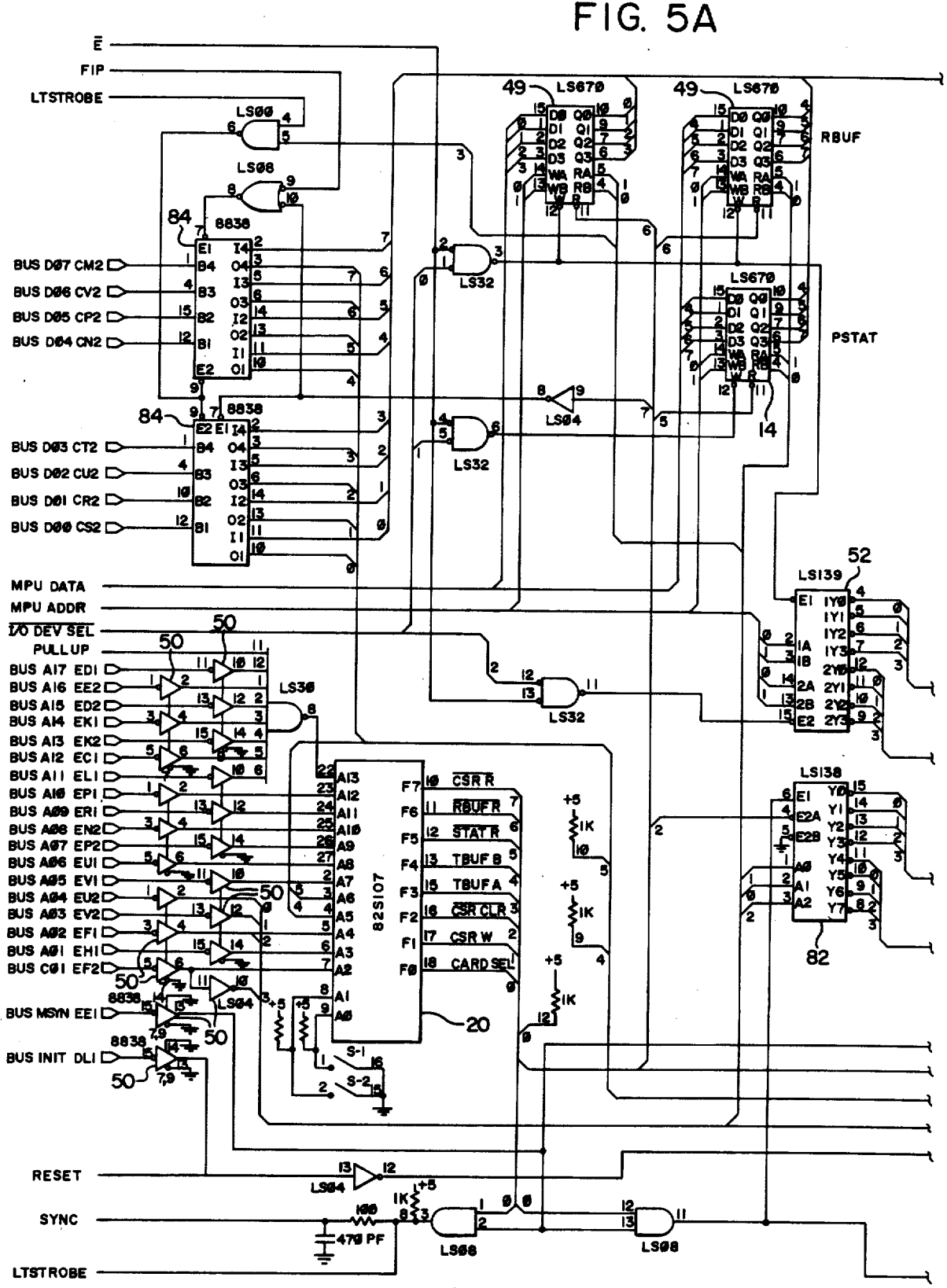
FIGS. 5A and 5B (hereinafter collectively called "FIG. 5") are alignable such that they together comprise an electronic circuit schematic diagram of the memory address and data control microcircuitry of the preferred embodiment.
Figure 5B:
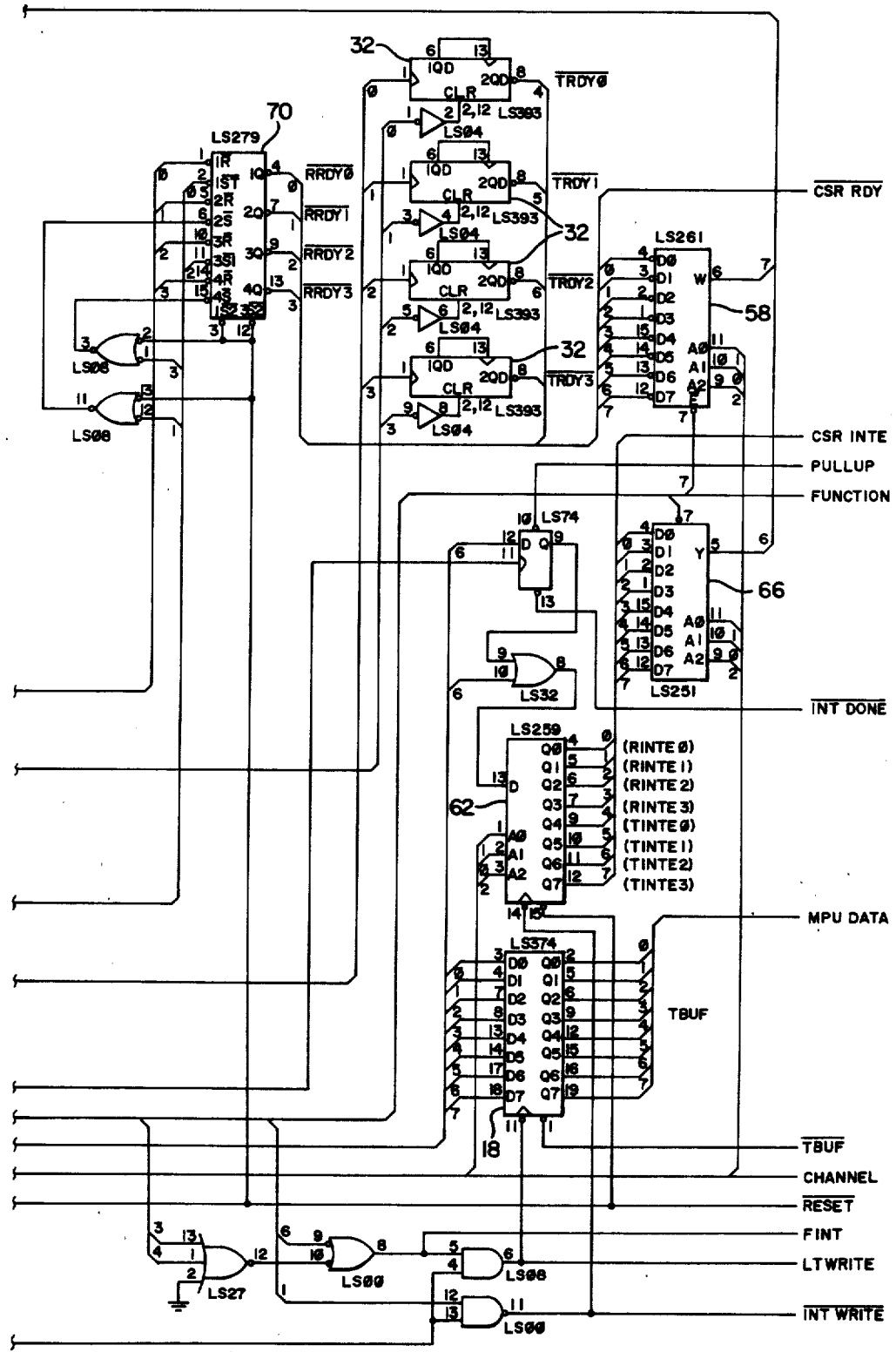
Figure 6:
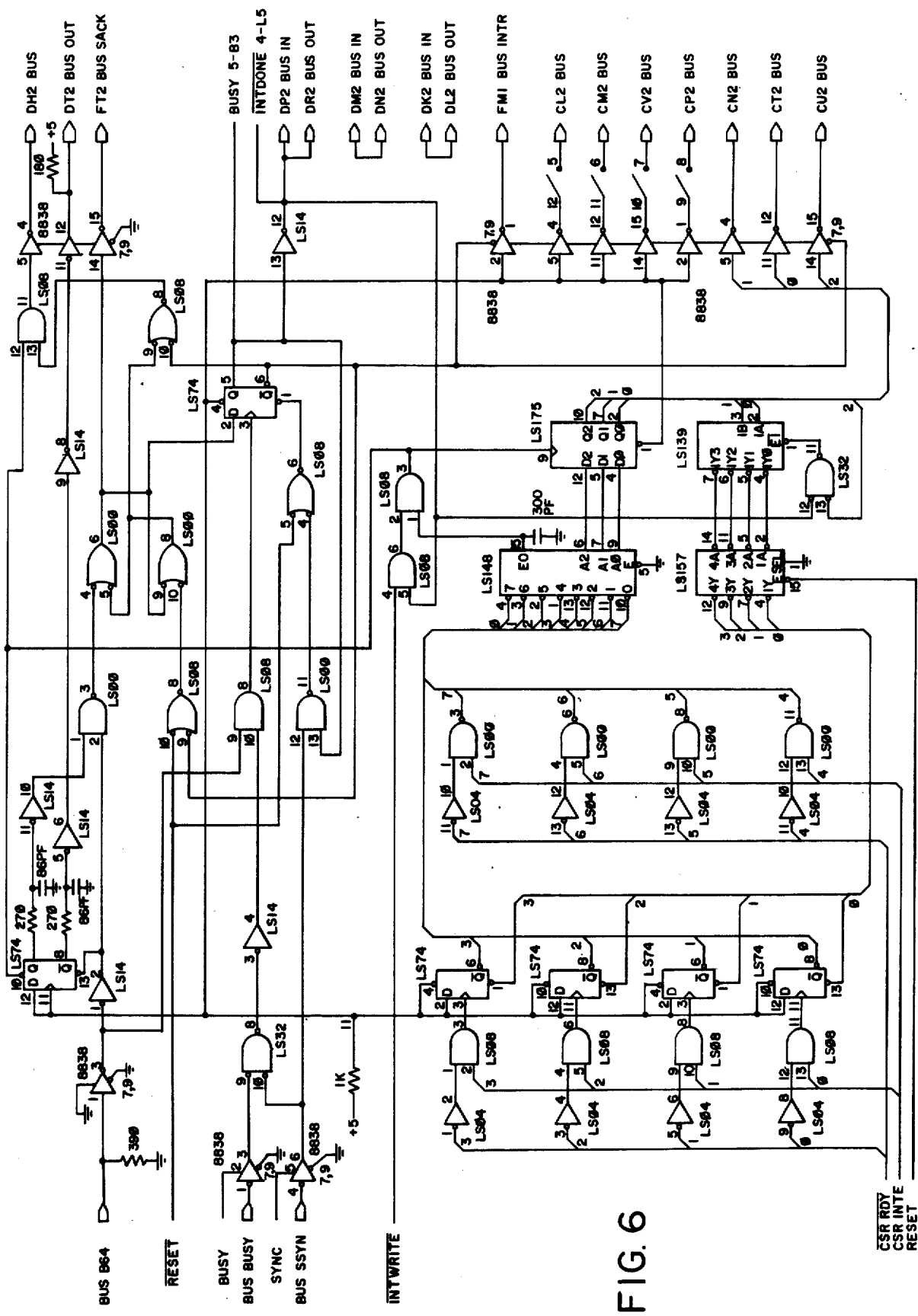

RCSRs 10 and TCSRs 12 are addressed via multiplexers 58 and 66 (FIG. 5). Multiplexer 58 selects for presentation on its output line the appropriate channel TRDY flag (maintained, as hereinafter described, via counters 32) or RRDY flag (maintained in latch 70). Multiplexer 66 selects for presentation on its output line the appropriate channel receiver or transmit enable flag (maintained in latch 62). A host computer addressable 16-bit register (14) is used to maintain PSTATs 14. Similarly, a pair of 16-bit registers (49) comprise RBUFs 49. A single flip-flop (18) comprises TBUF 18. It is not necessary to provide a separate TBUF for each output channel because, as hereinafter explained, special hardware included in the communications interface facilitates direct determination of the appropriate output buffer storage location which is to receive a data character held in TBUF 18 and also facilitates direct transfer of the data character into that storage location.

The fast interrupt request ("FIRQ") capability of microprocessor 24 (FIG. 2) is used to transfer data characters or attribute codes from TBUF 18 to OUTBUFs 28 and to transfer data characters from RBUFs 49 to the host computer. FIRQ interrupts are also used to process channel control information which the host computer may transfer to the communications interface via TBUF 18.

The interrupt request ("IRQ") capability of microprocessor 24 is used to transfer data characters from OUTBUFs 28 to the associated output devices or from the input devices to the associated INBUFs 48.

The non-maskable interrupt ("NMI") capability of microprocessor 24 is used by the self-testing routines included in the firmware which programs the operation of microprocessor 24.

III (b). Microprocessor Firmware

Appendix A to this specification is a source code listing of the firmware which programs the operation of microprocessor 24 in the preferred embodiment.

The "mainline" routine included in Appendix A runs continuously whenever interrupts are not being serviced. Each pass of the mainline routine services a different input/output channel pair. Accordingly, four passes through the mainline routine are required to service all four channel pairs. The mainline routine initiates data transfers from INBUFs 48 to RBUFs 49 and from OUTBUFs 28 to the associated output devices.

Appendix A also includes the FIRQ and IRQ interrupt service routines for processing the previously-mentioned FIRQ and IRQ interrupts.

Appendix A further includes a number of self-test and diagnostic routines which are provided for testing the integrity of the memory devices, timers, and input/output ports included in the communications interface.

It is believed that Appendix A, together with the many explanatory comments embedded therein, will enable those skilled in the art to understand the firmware programming.

III (c). Data Transfer From Host Computer to Output Device

The TRDY flags maintained in TCSRs 12 may be used by microprocessor 24 to signal the host computer that it may output a data character via the associated output channel. The host computer may be operating with its interrupts enabled or disabled. (TCSRs 12 also include the transmit interrupt enable flags for each channel.) If the host computer interrupts are enabled then operation of the host computer is interrupted if any of the four TRDY flags are set.

The host computer, when interrupted, transfers control of the host computer operations to an appropriate interrupt service routine which determines whether any data is available for output to the channel associated with the TRDY flag which caused the interrupt and, if so, outputs a data character to that channel. If the host computer interrupts are disabled then the host computer must periodically examine the TRDY flags maintained in TCSRs 12 to determine whether or not a data character may be output to a particular channel.

Data is output by the host computer on its data lines D00–D07. Addressing information identifying the particular communications interface, output channel, and register for which the data is intended is output by the host computer on its address lines A01–A17. The address information is passed through line receivers 50 (FIG. 5) to address decoder 20 which is programmed to decode the information so as to identify one of the three possible types of data output operations. These are:
1. Output of a normal data character.
2. Output of data attribute information.
3. Output of channel control information.

III (c)(i). Output of Normal Data Character

Figure 4A:
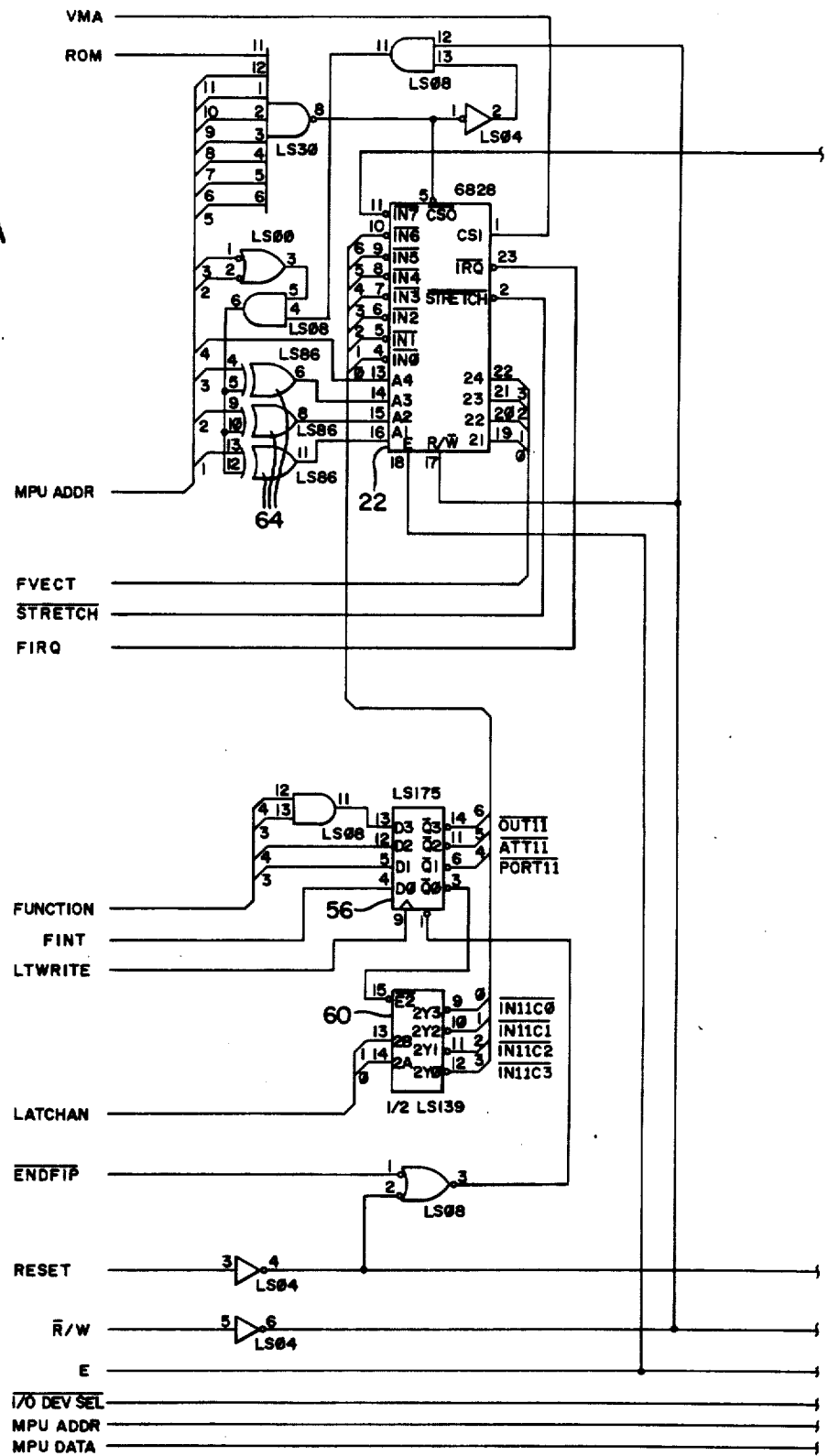
FIGS. 4A and 4B (hereinafter collectively called "FIG. 4") are alignable such that they together comprise an electronic circuit schematic diagram of the input/output control microcircuitry of the preferred embodiment.
Figure 4B:
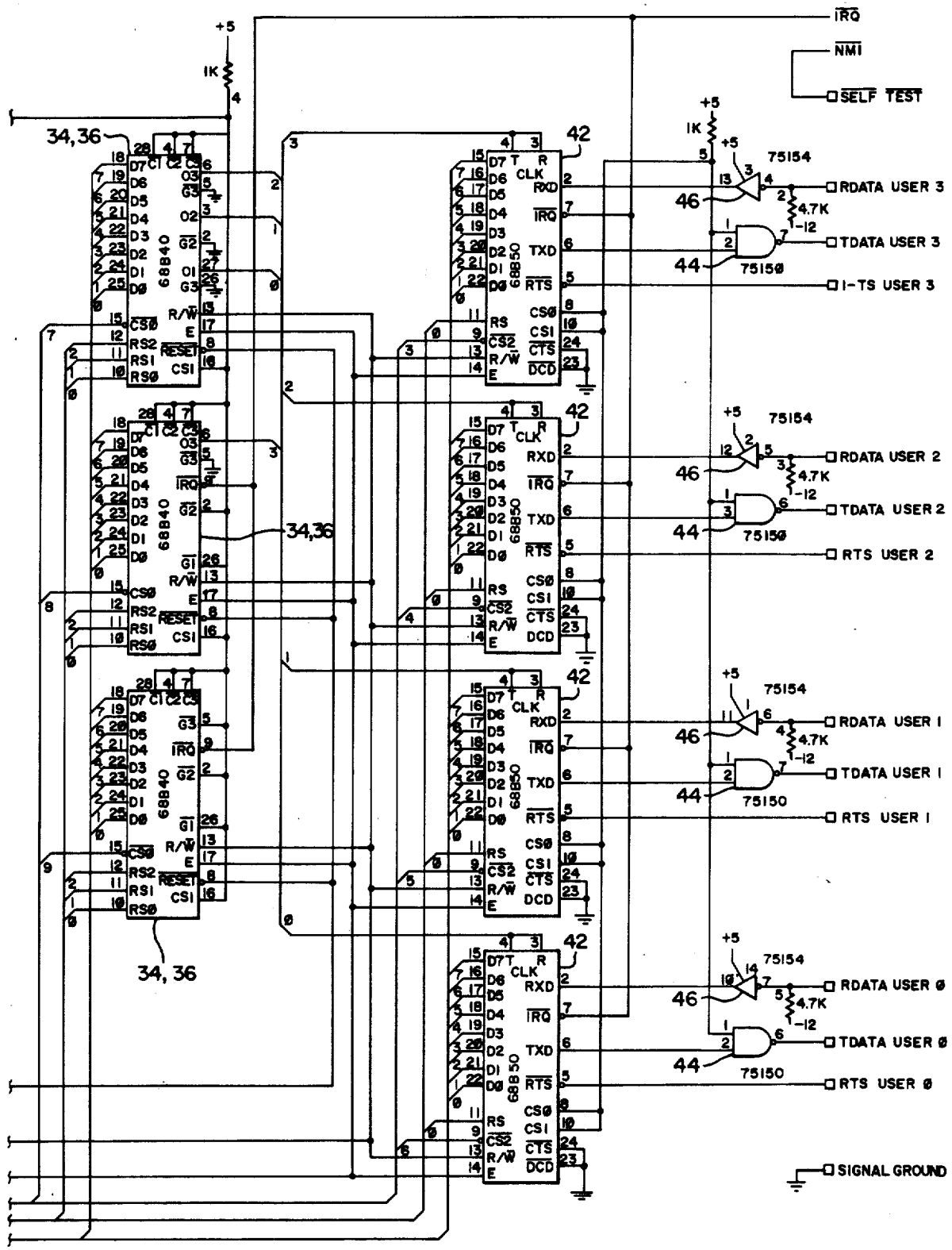

If a normal data character output operation is detected by address decoder 20 then its output lines TBUFA and TBUFB are both set high. After presenting the data and address information, the host computer issues a MSYN strobe pulse to indicate that the information on the data and address lines has stabilized and may be latched into a register. The MSYN strobe pulse causes the data character to be latched from transceivers 84 into TBUF 18. At the same time the TBUFA and TBUFB outputs of address decoder 20 are latched into flip-flop 56 (FIG. 4) which outputs, on lines $\overline{\text{OUT11}}$, $\overline{\text{ATT11}}$, and $\overline{\text{PORT11}}$, a one-of-three signal uniquely identifying which of the three possible data output operations is in progress. The $\overline{\text{OUT11}}$ line is low if a normal data character output operation is in progress. The $\overline{\text{ATT11}}$ line is low if an attribute code output operation is in progress. The $\overline{\text{PORT11}}$ line is low if a channel control information output operation is in progress.

The $\overline{\text{OUT11}}$, $\overline{\text{ATT11}}$, and $\overline{\text{PORT11}}$ output signals of flip-flop 56 are fed into interrupt controller 22. Latching of these signals into interrupt controller 22 causes the $\overline{\text{IRQ}}$ output line of interrupt controller 22 to go low which, in turn, signals an FIRQ interrupt request to microprocessor 24. Microprocessor 24 then transfers control to an appropriate firmware FIRQ interrupt service routine.

Interrupt controller 22 is conventionally used to generate "IRQ" type interrupt requests. However, in the preferred embodiment, interrupt controller 22 is adapted so as to generate "FIRQ" type interrupt requests. EPROM 38 (FIG. 2) contains tables of pointers to IRQ and FIRQ interrupt service routines. The lower four bits of the base address of the table of IRQ interrupt service routine addresses are conventionally fed directly into interrupt controller 22 (FIG. 4) which offsets those address bits to point into the table at the location containing the address of the appropriate IRQ interrupt service routine. Exclusive OR gates 64 perform an additional, preliminary offset of those address bits so that the base address presented to interrupt controller 22 points to the beginning of the table of addresses of FIRQ interrupt service routines, not to the beginning of the table of addresses of IRQ interrupt service routines. Interrupt controller 22 thus presents microprocessor 24 with a vector which points to the address of the appropriate FIRQ interrupt service routine.

Figure 3A:
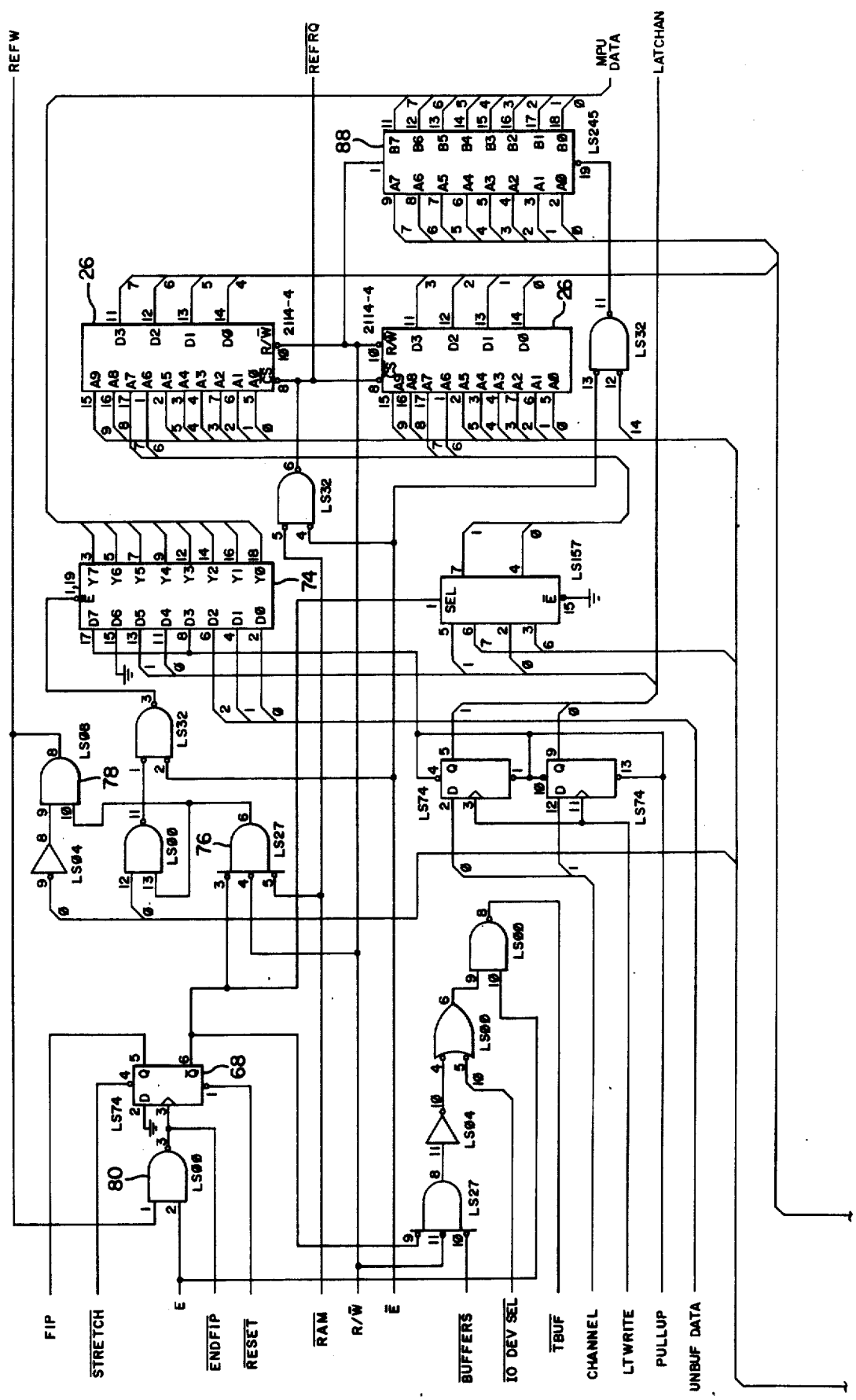
FIGS. 3A and 3B (hereinafter collectively called "FIG. 3") are alignable such that they together comprise an electronic circuit schematic diagram of the random access memory ("RAM") and RAM control microcircuitry of the preferred embodiment.
Figure 3B:
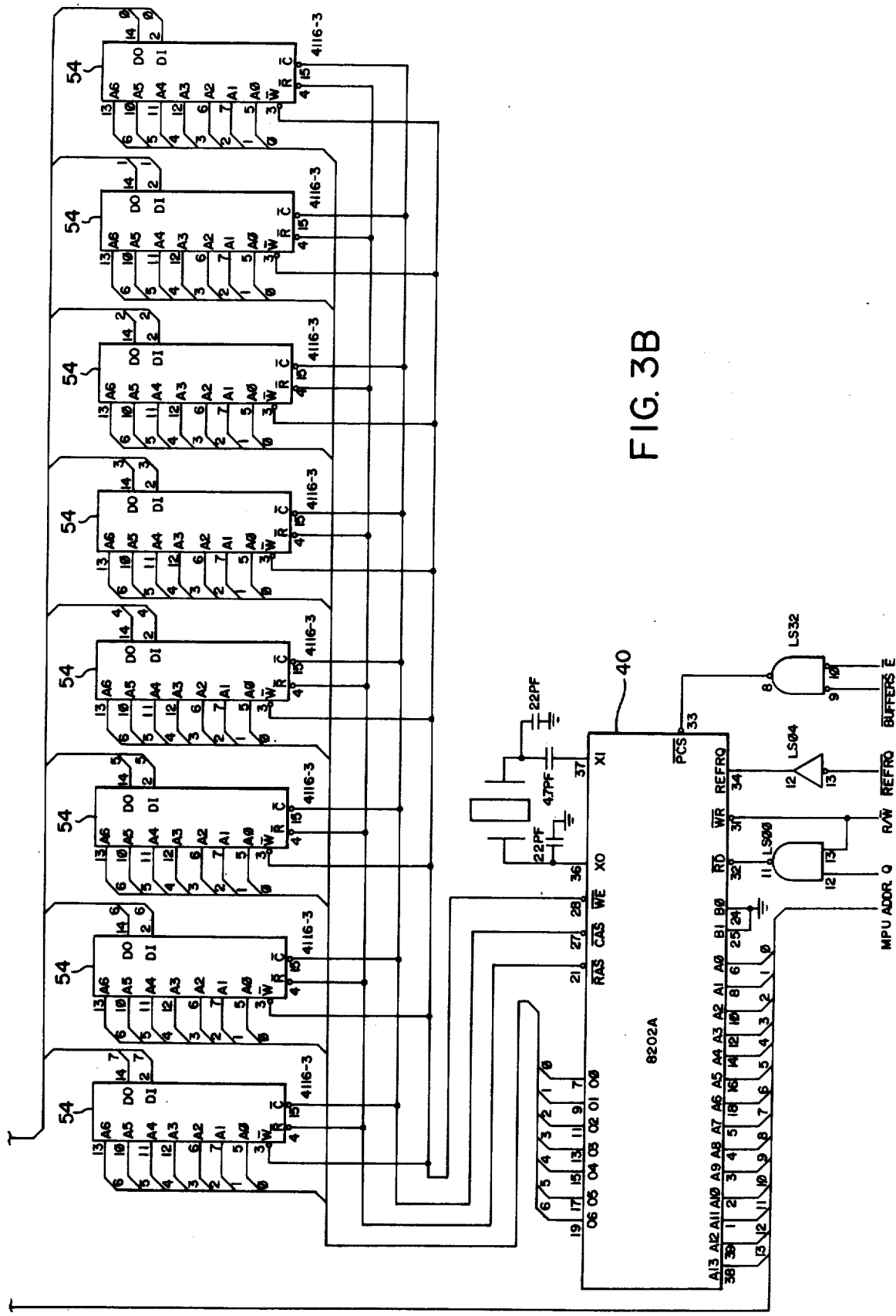

As microprocessor 24 signals its readiness to service the FIRQ interrupt, the $\overline{\text{STRETCH}}$ output line of interrupt controller 22 goes low, causing flip-flop 68 (FIG. 3) to be set. When set, flip-flop 68 indicates that an FIRQ interrupt is in progress.

RAM 26 contains tables of addresses which point to the next available sequential storage locations in each of OUTBUFs 28, the location of the "oldest" data character in each of OUTBUFs 28 which has not yet been outputted to the associated output device, and corresponding pointers to each of INBUFs 48. The microprocessor firmware FIRQ interrupt service routine to which control is transferred by microprocessor 24 obtains from RAM 26 the output buffer address of the next available sequential storage location which is to receive the data character held in TBUF 18. The A6 and A7 address lines of RAM 26 receive a two-bit signal which indicates which of the four output channels serviced by the communications interface is to receive the data character. An immediate offset into the proper output channel address pointer table within RAM 26 is thus obtained. Microprocessor 24 then attempts to write a data character into the addressed output buffer location. However, octal bus transceiver 72 (FIG. 2), which controls the transmission of data from microprocessor 24 onto the microprocessor bus, is disabled while an FIRQ interrupt is in progress. Thus, although microprocessor 24 attempts to write a data character into the output buffer, that character is not actually written into the output buffer. Instead, TBUF register 18 is enabled and the data character therein is transferred directly onto the microprocessor bus and into the output buffer storage location addressed by microprocessor 24. The hardware just described eliminates the need for intermediate read/write operations in transferring the data character from TBUF 18 into the appropriate output buffer storage location. Thus, a single flip-flop (18) and a single FIRQ interrupt service routine suffice to service the four output channels.

The microprocessor firmware FIRQ interrupt service routine then increments the output buffer address pointer by two so that the pointer points to the next sequentially available data storage location in the output buffer. (As previously explained, an attribute code is stored in the output buffer with each data character. Thus, two output buffer storage locations are consumed for each data character and the pointer must therefore be incremented by two.) Two write operations are required to place the incremented pointer in RAM 26 (because the address is 16 bits long, but may be written only eight bits at a time). Before the upper eight bits of the address pointer are written into RAM 26, they are adjusted by octal bus driver 74 to point back to the beginning of the output buffer, if the pointer has been incremented beyond the address of the last available sequential storage location in the output buffer. This may be accomplished because OUTBUFs 28 are located in known portions of microprocessor 24's address space. In the preferred embodiment, octal bus driver 74 substitutes "10CC1XXX" (binary) for the upper eight bits of the address pointer before those bits are written into RAM 26. The letters "CC" denote the number of the output channel currently being serviced by the communications interface and the letters "XXX" denote the lower three bits of the address, which remain unchanged.

The lower eight bits of the address pointer are then written "as is" into RAM 26. As the lower eight bits are written, flip-flop 68 is cleared to signal completion of the FIRQ interrupt. The completion signal is produced by AND gates 76 and 78 and NAND gate 80. Specifically, the output of AND gate 76 is high when flip-flop 68 is set (i.e. an FIRQ interrupt is in progress), a data output operation is in progress (i.e. the R/W line is low) and information is being written into RAM 26 (i.e. line $\overline{RAM}$ is low). The output of AND gate 76 is fed into AND gate 78. The other input of AND gate 78 is an inversion of bit 0 of the microprocessor address line. Thus, if the location of RAM 26 addressed by microprocessor 24 is even, the output of AND gate 78 will be high. The output of AND gate 78 is in turn fed into NAND gate 80 which is strobed by microprocessor 24, thereby turning off flip-flop 68 which, in turn, turns off AND gate 76 to prevent resetting of flip-flop 68.

OUTBUFs 28 are cyclical, and, in the preferred embodiment, each comprise 2,048 bytes of contiguous address space within dynamic RAM 54. The address pointer tables stored in static RAM 26 include pointers to the address of the next sequentially available storage location in each output buffer (i.e. the buffer "start" address) and to the address of the "oldest" data character stored in each output buffer which has not yet been output to the output device serviced by the channel associated with the particular output buffer (i.e. the buffer "end" address). The "end" address pointer is incremented by two each time a character stored in an output buffer is transmitted to its associated output device, thereby indicating that an output buffer data storage location has been freed to accept a fresh data character.

As previously described, octal bus driver 74 ensures that the output buffer address pointers stored in RAM 26 "wrap around" to point back to the beginning of the buffer if the pointer address is incremented beyond the address of the last data storage location in the output buffer. However, care must also be taken to ensure that the output buffers are not overflowed by storing new data in buffer storage locations which contain data that has not yet been transferred to an output device. This is accomplished with the aid of ripple counters 32 (FIG. 5).

The firmware which controls the operation of microprocessor 24 may, by comparing the output buffer "start" and "end" address pointers stored in RAM 26, determine whether a particular output buffer has enough room to store at least 128 additional data characters. If the buffer has room for 128 additional data characters then the ripple counter associated with that buffer is cleared. Otherwise, the counter (which is clocked by decoder 82 each time a data character is stored in TBUF 18) is allowed to continue counting. The counter overflows if the count reaches 128. The counter output constitutes the TRDY flag, which is cleared if the counter overflows, to signal the host computer that additional data characters should not be transmitted to the associated output channel. The firmware controlling the operation of microprocessor 24 does not clear counter 32 (thereby raising the TRDY flag to signal the host computer that fresh data may be output to the associated channel) until at least 128 locations in the associated output buffer have been freed.

Microprocessor 24 transfers the data from OUTBUFs 28 to the output devices associated therewith in routine fashion via a conventional IRQ firmware interrupt service routine. Specifically, microprocessor 24 transfers a data character from RAM 54 (in which the output buffers are maintained) to whichever of ACIAs 42 is associated with the output device which is to receive the data character. Octal bus transceiver 88 (FIG. 3) boosts the output drive capability of RAM 54. ACIA 42 converts the data character from parallel to serial format for subsequent transmission to the output device via line driver 44 which converts the data to RS232C levels.

III (c)(ii). Output of Data Attribute Information

Each data character output by the host computer may be preceded by a one-byte attribute code. Before the data character is transferred to the output device, the attribute code is deciphered by the microprocessor firmware, which then takes appropriate action. Typical attributes may include, for example, time delay codes to specify that microprocessor 24 should wait some selected time interval before transmitting the next data character to the output device, a data repeat code to indicate that the particular data character should be repeatedly transmitted to the output device, etc. Appendix A particularizes the attribute codes utilized in the preferred embodiment.

Address decoder 20 signals that a data attribute write operation is in progress by setting its TBUFB output line high and its TBUFA output line low. The attribute code is then latched into TBUF 18 as though it were a normal data character. The $\overline{ATT11}$ output of flip-flop 56 is set low to signal interrupt controller 22 that an attribute write operation is in progress. Interrupt controller 22 then causes an FIRQ interrupt of microprocessor 24 and provides it with a vector address to an appropriate FIRQ interrupt service routine. The FIRQ interrupt service routine obtains from RAM 26 the address of the output buffer location which is to receive the attribute code and then stores the attribute code in that location by direct transfer from TBUF 18 as described above.

The output buffer address pointer in RAM 26 is not updated after the attribute code has been stored in the output buffer. The reason is that the host computer transmits the attribute code before transmitting the data character associated with the attribute code. The output buffer address pointer in RAM 26 must therefore not be updated until after the data character has been received from the host computer and stored in the output buffer.

To signal completion of the FIRQ interrupt, the FIRQ interrupt service routine does a dummy write operation into an even-addressed scratch location of RAM 26, thereby causing AND gates 76 and 78 and NAND gate 80 to reset flip-flop 68 as previously described, clearing the FIRQ interrupt status.

Programmable timers 34 (FIG. 4) are used by the microprocessor firmware to time the delay of any data output which may be specified via the attribute code. The timers are started by loading them with a delay code specified in the attribute code. When the timers time out, operation of microprocessor 24 is interrupted and the next data character may be outputed.

III (c)(iii). Output of Channel Control Information

The third type of data output operation is the transmission, by the host computer, of channel control information. Such information is interpreted by the microprocessor firmware which may, in turn, adjust the characteristics of the particular channel in some appropriate fashion. Typical channel characteristics which might be controlled could include the channel data transmission rates (which, in the preferred embodiment, may be varied between 150 baud and 19,200 baud), a capability to clear the contents of the input and/or output buffers, and a "flagged input" facility for terminating input device data transmission if the associated INBUF 48 is full. Appendix A particularizes the channel characteristics which may be controlled in the preferred embodiment.

Address decoder 20 signals that the host computer is transmitting channel control information by setting its output line TBUFB low and its output line TBUFA high. One byte of channel control information transmitted by the host computer is then latched into TBUF 18. As previously described, flip-flop 56 sets its $\overline{\text{PORT11}}$ output line low, thereby signaling interrupt controller 22 that a channel control data output operation is in progress. Interrupt controller 22, in turn, causes a vectored FIRQ interrupt whereby microprocessor 24 transfers control to an appropriate firmware interrupt service routine. That interrupt service routine disables the FIRQ hardware (thereby disabling further FIRQ interrupts) and then directly reads the contents of TBUF 18 to obtain the channel control information, decodes the information, and executes the appropriate channel control commands as defined by the firmware programming. The FIRQ hardware is then re-enabled and the interrupt service routine terminates.

Programmable timers 36 are the same devices as timers 34 which enable delayed output of successive data characters. Timers 36 are loaded with predefined codes (supplied by the host computer via the PCTR registers) which control the frequency of a square wave output by the timer. The square wave is used to clock to associated ACIA 42, thereby determining the rate at which data is transferred by the particular input/output channel.

III (d). Data Input From Input Device to Host Computer

Up to four input devices may be serviced by the communications interface of the preferred embodiment. The input devices present input data in serial fashion via line receivers 46 (one per input channel) which convert from RS232C to TTL voltage levels and transmit the data into the associated ACIAs 42. The receiving ACIA converts the serial input data to parallel form and generates an IRQ interrupt signal to interrupt the operation of microprocessor 24. Microprocessor 24 then polls each of ACIAs 42 to determine which of those four devices caused the interrupt (i.e. to determine which channel received the data character). Once that determination has been made microprocessor 24 obtains from RAM 26 the address of the next sequentially available input buffer storage location which is to receive the input character, stores the input character into that address and then increments the address pointer in RAM 26. If the input buffer is full then the data character is discarded and bit 5 of the associated PSTAT 14 is set for interrogation by the host computer, thereby informing the host computer that the data character has been lost.

Microprocessor 24 regularly examines the input buffer address pointers to determine whether there is any data in any of INBUFs 48 awaiting transmission to the host computer. If a non-empty input buffer is detected then the "oldest" data character in that buffer which has not yet been transmitted to the host computer is extracted from the buffer and written into the associated RBUF 49. RBUF 49 comprises two microcircuit registers (49) which together provide four eight-bit registers, one for each of the four input channels. Presentation of input data to the host computer via RBUFs 49 ensures that the host computer does not have to wait for the input character to be retrieved from the storage buffer when the host is eventually signaled that input data is waiting. The host computer may rapidly extract the data character from RBUFs 49 via bi-directional transceivers 84, thereby minimizing the time taken to complete the data input operation.

When a data character is stored in a particular RBUF 49, the RRDY flag associated therewith is set to signal the host computer that the data character is waiting in RBUF 49 and may be read therefrom by the host computer.

If the host computer receiver interrupts are enabled for a particular input channel, then setting of the RRDY flag for that channel automatically interrupts the host computer, which then transfers control to an appropriate interrupt service routine which reads the data character from RBUF 49. If the host computer receiver interrupts are disabled then the host computer must periodically examine the RRDY flags maintained in RCSRs 10 to determine that a data character is waiting in RBUF 49 for input to the host computer.

Address decoder 20 determines that the host computer has read the data character from RBUF 49 by detecting the RBUF register address presented by the host computer. Upon such detection, decoder 20 clears the associated RRDY flag by clearing one of the four latches comprising quad latch 70. The four output lines of latch 70 constitute inversions of the RRDY flags for each input channel.

Address decoder 20 also sets its $\overline{\text{RBUFR}}$ output line low to signal that the host computer has read the data character from RBUF 49. The $\overline{\text{RBUFR}}$ signal causes the FINT input of flip-flop 56 (FIG. 4) to go high which, in turn, enables two-to-four line decoder 60 which then provides a one-of-four signal to interrupt controller 22 representative of the particular channel from which the input character was initially received. Interrupt controller 22 then generates an FIRQ interrupt, causing microprocessor 24 to vector to an appropriate firmware interrupt service routine. That routine clears a firmware replica RRDY flag which is maintained at an even address in RAM 26. Therefore updating of the replica RRDY flag terminates the FIRQ servicing mode by causing flip-flop 68 to reset as previously explained.

Component values for the microcircuitry and other electronic components included in the communications interface of the preferred embodiment are specified in FIGS. 2-5.

Appendix B is a listing of the microcode which programs the operation of address decoder 20 (a field programmable ROM patch microcircuit) in the preferred embodiment.

As will be apparent to those skilled in the art, the preferred embodiment hereinbefore described is merely representative of one particular way in which the invention may be reduced to practice. Those skilled in the art may prefer alternate microcircuitry configurations for achieving the objects of the invention. Similarly, the firmware which programs the operation of microprocessor 24 may be adapted in many ways to suit the needs of any particular environment in a manner which is well understood by those skilled in the art. Thus, the foregoing description of the preferred embodiment is not to be taken as limiting the invention defined in the appended claims.

APPENDIX A

```
. TITLE LTDRIV LT-11 QUAD COMMUNICATIONS INTERFACE DR
. IDENT /V6.0/    ; (SAME AS 'IDENT'. 'MOD' BELOW)  25-MAY-82

; COPYRIGHT (C) 1981, BY TEKTRONIX, INC.
; ALL RIGHTS RESERVED

; THIS SOFTWARE PRODUCT IS THE PROPERTY OF TEKTRONIX, INC.
; AND IS PROTECTED UNDER UNITED STATES FEDERAL COPYRIGHT LAW
; AS AN UNPUBLISHED WORK.  THIS SOFTWARE MAY NOT BE USED,
; COPIED, OR MODIFIED IN ANY MANNER OUTSIDE OF TEKTRONIX,  IN
; WITHOUT THE EXPRESS WRITTEN CONSENT OF TEKTRONIX, INC.

; TEKTRONIX, INC.
; P.O. BOX 500
; BEAVERTON, OREGON  97077  U.S.A.

; WRITTEN BY LANNIE J. TIERNEY
; . IDENT AND 'IDENT'. 'MOD' CONTAINS THE CURRENT VERSION NUMB
; THE VERSION IS DISPLAYED DYNAMICALLY IN SELF TEST START-UP

; VERSION 5.0 WAS THE FIRST OFFICIALLY RELEASED VERSION OF T
; FIRMWARE (11-NOV-81)

; VERSION 5.1 CONTAINED THE FOLLOWING ENHANCEMENTS:
;       HOLD MODE               ALLOWS BLOCK MOVES OF INPUT
;       RELOAD HOST INPUT       RELOADS LAST VALID HOST INPU
;       FLAGGED INPUT           XON/XOFF CONTROL TO PREVENT
;       LOCAL ECHO              REMOVED
;       TERMINAL INPUT STATUS   IS NOW CLEARED AFTER INPUT R
;       BREAK GENERATION        ADDED

; VERSIONS 5.2 - 5.9 CLEANED UP PROBLEMS WITH VERSION 5.1
; VERSION 6.0 CHANGED THE PORT CONTROL REQUEST PROTOCOL

; THIS IS THE SYSTEM FIRMWARE FOR THE LT-11 QUAD COMMUNICATI
; FACE, RESIDING IN A SINGLE ROM ON THE BOARD.  MOST OF THE
; SPENT SERVICING INTERRUPTS.  HOST DATA TRANSFERS ARE DONE
; VIA FIRQ INTERRUPT ROUTINES, ALONG WITH SPECIAL EXPEDITING
; TERMINAL I/O IS DONE THROUGH IRQ INTERRUPT ROUTINES.  THE
; IS USED TO START EVENTS.  A 2K BYTE INPUT BUFFER AND A 2K
; OUTPUT/ATTRIBUTE BUFFER FOR EACH OF THE FOUR CHANNELS IS U
; STORING INPUT AND OUTPUT CHARACTERS.

; SPECIAL HARDWARE CONSIDERATIONS:
; THE BUFFER MEMORY IS MADE UP OF 16K OF DYNAMIC RAM.  TO IN
; READ/WRITE ACCESS IS NOT MADE DURING A REFRESH CYCLE, A RE
; MUST BE REQUESTED IMMEDIATELY PRIOR TO READING OR WRITING.
; DONE BY DOING A SCRATCH RAM (ADDRESSES 0000-03FF) ACCESS.
; BUFFER READ/WRITE REQUEST MUST BE MADE WITHIN 20 USEC FOLL
; THIS REQUIREMENT ALLOWED FOR A SIMPLER HARDWARE DESIGN WIT
; SIGNIFICANT PERFORMANCE DEGRADATION.
```

```
; A  D, A BUFFER MEMORY READ/WRITE REQUEST MAY TAKE LONGER T
; CYCLE, SO 16 BIT READ/WRITES TO BUFFER MEMORY ARE NOT PERF
; L  , STD, LDX, STX).  OTHER INSTRUCTIONS THAT DO READ/MODI
; r ERATIONS, SUCH AS NEG, COM, CLR, ETC. CAN CAUSE AMBIGUOU
; P0 LEMS AND ARE AVOIDED WHEN READING OR WRITING BUFFER ME
;ASSEMBLY INSTRUCTIONS UNDER RT-11
;         R 6809
;         LTDRIV=LTDRIV
;         ^C
;         R CLNK
;         LTDRIV=LTDRIV/L
;         ^C
;         R PROMPV
;         LTDRIV.ROM/M/C:4096./L:4096.=LTDRIV.LDA    (RSTS RT-1
;         LTDRIV.ROM/M/C!4096/L!4096=LTDRIV.LDA      (RT-11 V2B
;         ^C

.RADIX 16

.ASECT

.SBTTL SPECIAL CONSTANTS
IDENT=6             ;PROGRAM VERSION NUMBER
MOD=0               ;PROGRAM MODIFICATION LEVEL

IMASK=10            ;IRQ INTERRUPT MASK
FMASK=40            ;FIRQ INTERRUPT MASK
IFMASK=50           ;IRQ/FIRQ INTERRUPT MASK
MRESET=3            ;ACIA MASTER RESET CONSTANT
TXON=0B5            ;TERMINAL TRANSMIT INTERRUPTS ENABLE CONSTAN
                    ;8 BITS + 1 STOP BIT, RECEIVE AND TRANSMIT I
                    ;RTS=LOW
TXOFF=95            ;TERMINAL TRANSMIT INTERRUPTS DISABLE CONSTA
                    ;8 BITS + 1 STOP BIT, RECEIVE INTERRUPT ON,
                    ;TRANSMIT INTERRUPT OFF, RTS=LOW
TXROFF=15           ;TERMINAL TRANSMIT/RECEIVE INTERRUPTS CONSTA
                    ;8 BITS DATA + 1 STOP BIT, NO INTERRUPTS, RT
BREAK=0F5           ;BREAK GENERATION/RECEIVE INTERRUPTS CONSTAN
                    ;8 BITS DATA + 1 STOP BIT, RECEIVE INTERRUPT
FSHOT=82            ;PTM CONTINUOUS TIMER OUTPUT CONSTANT
SSHOT=0E2           ;PTM SINGLE-SHOT TIMER OUTPUT CONSTANT
MSHOT=00            ;PTM MASKED INTERRUPT CONSTANT
MAXRM=20            ;MAXIMUM SPACE IN INPUT BUFFER BEFORE SENDIN

;ASCII CONTROL CHARACTER DEFINITIONS
NUL=00              ;NULL
SOH=01              ;CTRL A
ETX=03              ;CTRL C
LF=0A               ;LINEFEED
CR=0D               ;CARRIAGE RETURN
SI=0F               ;CTRL O
XON=11              ;CTRL Q
XOFF=13             ;CTRL S
CAN=18              ;CTRL X
ESC=01B             ;ESCAPE
SPACE=20            ;SPACE
```

```
.SBTTL BAUD RATE CONSTANTS
;FOR PTM SETTING
B150=0FF          ;150   BAUD
B300=7F           ;300   BAUD
B600=3F           ;600   BAUD
B1200=1F          ;1200  BAUD
B2400=0F          ;2400  BAUD
B4800=07          ;4800  BAUD
B9600=03          ;9600  BAUD
B19200=01         ;19200 BAUD

.SBTTL HARDWARE ADDRESSES
PTM0=4202         ;CHANNEL 0 PROGRAMMABLE INTERRUPT TIMER LATC
CLOCK0=4602       ;CHANNEL 0 TERMINAL BAUD RATE LATCH ADDRESS
ACIA0=4800        ;CHANNEL 0 TERMINAL PORT
HWCLR0=5000       ;CHANNEL 0 TRANSMIT COUNTER CLEAR
PSTR0=6000        ;CHANNEL 0 PORT STATUS REGISTER
RBUF0=7000        ;CHANNEL 0 HOST INPUT REGISTER

PTM1=4204         ;CHANNEL 1 PROGRAMMABLE INTERRUPT TIMER LATC
CLOCK1=4604       ;CHANNEL 1 TERMINAL BAUD RATE LATCH ADDRESS
ACIA1=4A00        ;CHANNEL 1 TERMINAL PORT
HWCLR1=5001       ;CHANNEL 1 TRANSMIT COUNTER CLEAR
PSTR1=6001        ;CHANNEL 1 PORT STATUS REGISTER
RBUF1=7001        ;CHANNEL 1 HOST INPUT REGISTER

PTM2=4402         ;CHANNEL 2 PROGRAMMABLE INTERRUPT TIMER LATC
CLOCK2=4606       ;CHANNEL 2 TERMINAL BAUD RATE LATCH ADDRESS
ACIA2=4C00        ;CHANNEL 2 TERMINAL PORT
HWCLR2=5002       ;CHANNEL 2 TRANSMIT COUNTER CLEAR
PSTR2=6002        ;CHANNEL 2 PORT STATUS REGISTER
RBUF2=7002        ;CHANNEL 2 HOST INPUT REGISTER

PTM3=4404         ;CHANNEL 3 PROGRAMMABLE INTERRUPT TIMER LATC
CLOCK3=4406       ;CHANNEL 3 TERMINAL BAUD RATE LATCH ADDRESS
ACIA3=4E00        ;CHANNEL 3 TERMINAL PORT
HWCLR3=5003       ;CHANNEL 3 TRANSMIT COUNTER CLEAR
PSTR3=6003        ;CHANNEL 3 PORT STATUS REGISTER
RBUF3=7003        ;CHANNEL 3 HOST INPUT REGISTER

PICON=0FFE0       ;PROGRAMMABLE INTERRUPT CONTROLLER ENABLE AD
PICOFF=0FFFE      ;PROGRAMMABLE INTERRUPT CONTROLLER DISABLE A
TBUF=4000         ;HOST OUTPUT REGISTER
```

-39-

```
.SBTTL RAM AREA

.SBTTL   CHANNEL 0 POINTER TABLE
;CONTAINS BUFFER POINTERS, HARDWARE POINTERS, AND FLAGS

;SPECIAL NOTES:
;STAT0 MUST BE THE FIRST ENTRY IN THE TABLE
;THE TOP BYTE OF PUSH00 MUST BE AT AN ODD ADDRESS
;INFLG0 AND HOLD0 MUST BE AT EVEN ADDRESSES
;THESE RESTRICTIONS ARE DUE TO SPECIAL FIRQ HARDWARE
```

```
. =0000
STATO:   .BLKB 1    ;PORT TERMINAL INPUT STATUS BYTE
PUSHOO:  .BLKB 2    ;OUTPUT BUFFER WRITE POINTER
POPOO:   .BLKB 2    ;OUTPUT BUFFER READ POINTER
PUSHIO:  .BLKB 2    ;INPUT BUFFER WRITE POINTER
POPIO:   .BLKB 2    ;INPUT BUFFER READ POINTER
OTFLGO:  .BLKB 1    ;OUTPUT IN PROGRESS FLAG (NOT ZERO=T
INFLGO:  .BLKB 1    ;INPUT WAITING FOR HOST FLAG (NOT ZE
CCFLGO:  .BLKB 1    ;CONTROL C RECEIVED FLAG (NOT ZERO=T
HOLDO:   .BLKB 1    ;HOLD MODE FLAG (NOT ZERO=TRUE, MINU
LOOPO:   .BLKB 2    ;REPEAT MODE LOOP STARTING ADDRESS A
GOFLGO:  .BLKB 1    ;FLAG FOR ENABLING OUTPUT TO TERMINA
TPORTO:  .BLKB 2    ;TERMINAL PORT ADDRESS
TTCSRO:  .BLKB 2    ;TERMINAL PORT CONTROL/STATUS REGIST
INPUTO:  .BLKB 2    ;CONTAINS POINTER TO TERMINAL INPUT
OUTPTO:  .BLKB 2    ;CONTAINS POINTER TO TERMINAL OUTPUT
HRBUFO:  .BLKB 2    ;HOST INPUT REGISTER ADDRESS
PSTATO:  .BLKB 2    ;PORT STATUS REGISTER ADDRESS
TTCLRO:  .BLKB 2    ;TRANSMIT COUNTER CLEAR ADDRESS
PTCTLO:  .BLKB 2    ;INTERRUPT TIMER CONTROL REGISTER AD
TIMERO:  .BLKB 2    ;INTERRUPT TIMER ADDRESS
PTMONO:  .BLKB 1    ;INTERRUPT TIMER ENABLE CONSTANT
PTMSKO:  .BLKB 1    ;INTERRUPT TIMER DISABLE CONSTANT
RATEO:   .BLKB 2    ;TERMINAL BAUD RATE LATCH ADDRESS
POINTO:  .BLKB 2    ;POINTER TABLE STARTING ADDRESS
ATTRO:   .BLKB 1    ;LAST READ OUTPUT ATTRIBUTES
RLOADO:  .BLKB 1    ;INTERRUPT TIMER RELOAD COUNT
KILLIO:  .BLKB 2    ;KILL INPUT BUFFER FLAG/ADDRESS (MIN
KILLOO:  .BLKB 2    ;KILL OUTPUT BUFFER FLAG/ADDRESS (MI
QUEUEO:  .BLKB 1    ;QUEUED PORT CONTROL REQUEST (NOT ZE
SPEEDO:  .BLKB 1    ;TERMINAL BAUD RATE VALUE
MARKO:   .BLKB 1    ;CONTAINS CHANNEL INDICATOR BIT IN L
PRIVO:   .BLKB 1    ;PRIVILEGED USER FLAG (NOT ZERO=TRUE
OBOTO:   .BLKB 2    ;CONTAINS POINTER TO START OF OUTPUT
NSFLGO:  .BLKB 1    ;NON-TERMINAL INPUT STATUS IN HW STA
FROZO:   .BLKB 1    ;XOFF SENT TO TERMINAL FLAG (NOT ZER
SHIFTO:  .BLKB 1    ;ROTATING BIT PATTERN FOR HOST-INITI
ECHOO:   .BLKB 1    ;ECHO-BACK FLAG FOR SELF TEST (NOT Z
FLAGDO:  .BLKB 1    ;FLAGGED INPUT MODE FLAG (NOT ZERO=T
CLONEO:  .BLKB 1    ;RELOAD HOST INPUT DATA FLAG (NOT ZE
OLDINO:  .BLKB 1    ;LAST VALID HOST INPUT DATA
LASTO:   .BLKB 1    ;LAST VALID TERMINAL INPUT STATUS WR

. =003E
NOFIPO:  .BLKB 1    ;DUMMY LOCATION FOR ENDFIP

.SBTTL  CHANNEL 1 POINTER TABLE
;CONTAINS BUFFER POINTERS, HARDWARE POINTERS, AND FLAGS

;SPECIAL NOTES:
;STAT1 MUST BE THE FIRST ENTRY IN THE TABLE
;THE TOP BYTE OF PUSHO1 MUST BE AT AN ODD ADDRESS
;INFLG1 AND HOLD1 MUST BE AT EVEN ADDRESSES
;THESE RESTRICTIONS ARE DUE TO SPECIAL FIRQ HARDWARE

. =0040
```

```
STAT1:   .BLKB 1      ;PORT TERMINAL INPUT STATUS BYTE
PUSHO1:  .BLKB 2      ;OUTPUT BUFFER WRITE POINTER
POPO1:   .BLKB 2      ;OUTPUT BUFFER READ POINTER
PUSHI1:  .BLKB 2      ;INPUT BUFFER WRITE POINTER
POPI1:   .BLKB 2      ;INPUT BUFFER READ POINTER
OTFLG1:  .BLKB 1      ;OUTPUT IN PROGRESS FLAG (NOT ZERO=T
INFLG1:  .BLKB 1      ;INPUT WAITING FOR HOST FLAG (NOT ZE
CCFLG1:  .BLKB 1      ;CONTROL C RECEIVED FLAG (NOT ZERO=T
HOLD1:   .BLKB 1      ;HOLD MODE FLAG (NOT ZERO=TRUE, MINU
LOOP1:   .BLKB 2      ;REPEAT MODE LOOP STARTING ADDRESS A
GOFLG1:  .BLKB 1      ;FLAG FOR ENABLING OUTPUT TO TERMINA
TPORT1:  .BLKB 2      ;TERMINAL PORT ADDRESS
TTCSR1:  .BLKB 2      ;TERMINAL PORT CONTROL/STATUS REGIST
INPUT1:  .BLKB 2      ;CONTAINS POINTER TO TERMINAL INPUT
OUTPT1:  .BLKB 2      ;CONTAINS POINTER TO TERMINAL OUTPUT
HRBUF1:  .BLKB 2      ;HOST INPUT REGISTER ADDRESS
PSTAT1:  .BLKB 2      ;PORT STATUS REGISTER ADDRESS
TTCLR1:  .BLKB 2      ;TRANSMIT COUNTER CLEAR ADDRESS
PTCTL1:  .BLKB 2      ;INTERRUPT TIMER CONTROL REGISTER AD
TIMER1:  .BLKB 2      ;INTERRUPT TIMER ADDRESS
PTMON1:  .BLKB 1      ;INTERRUPT TIMER ENABLE CONSTANT
PTMSK1:  .BLKB 1      ;INTERRUPT TIMER DISABLE CONSTANT
RATE1:   .BLKB 2      ;TERMINAL BAUD RATE LATCH ADDRESS
POINT1:  .BLKB 2      ;POINTER TABLE STARTING ADDRESS
ATTR1:   .BLKB 1      ;LAST READ OUTPUT ATTRIBUTES
RLOAD1:  .BLKB 1      ;INTERRUPT TIMER RELOAD COUNT
KILLI1:  .BLKB 2      ;KILL INPUT BUFFER FLAG/ADDRESS (MIN
KILLO1:  .BLKB 2      ;KILL OUTPUT BUFFER FLAG/ADDRESS (MI
QUEUE1:  .BLKB 1      ;QUEUED PORT CONTROL REQUEST (NOT ZE
SPEED1:  .BLKB 1      ;TERMINAL BAUD RATE VALUE
MARK1:   .BLKB 1      ;CONTAINS CHANNEL INDICATOR BIT IN L
PRIV1:   .BLKB 1      ;PRIVILEGED USER FLAG (NOT ZERO=TRUE
OBOT1:   .BLKB 2      ;CONTAINS POINTER TO START OF OUTPUT
NSFLG1:  .BLKB 1      ;NON-TERMINAL INPUT STATUS IN HW STA
FROZ1:   .BLKB 1      ;XOFF SENT TO TERMINAL FLAG (NOT ZER
SHIFT1:  .BLKB 1      ;ROTATING BIT PATTERN FOR HOST-INITI
ECHO1:   .BLKB 1      ;ECHO-BACK FLAG FOR SELF TEST (NOT Z
FLAGD1:  .BLKB 1      ;FLAGGED INPUT MODE FLAG (NOT ZERO=T
CLONE1:  .BLKB 1      ;RELOAD HOST INPUT DATA FLAG (NOT ZE
OLDIN1:  .BLKB 1      ;LAST VALID HOST INPUT DATA
LAST1:   .BLKB 1      ;LAST VALID TERMINAL INPUT STATUS WR

. =007E
NOFIP1:  .BLKB 1      ;DUMMY LOCATION FOR ENDFIP
        .SBTTL   CHANNEL 2 POINTER TABLE
;CONTAINS BUFFER POINTERS, HARDWARE POINTERS, AND FLAGS

;SPECIAL NOTES:
;STAT2 MUST BE THE FIRST ENTRY IN THE TABLE
;THE TOP BYTE OF PUSHO2 MUST BE AT AN ODD ADDRESS
;INFLG2 AND HOLD2 MUST BE AT EVEN ADDRESSES
;THESE RESTRICTIONS ARE DUE TO SPECIAL FIRQ HARDWARE

. =0080
STAT2:   .BLKB 1      ;PORT TERMINAL INPUT STATUS BYTE
PUSHO2:  .BLKB 2      ;OUTPUT BUFFER WRITE POINTER
POPO2:   .BLKB 2      ;OUTPUT BUFFER READ POINTER
```

```
PUSHI2:  .BLKB 2      ; INPUT BUFFER WRITE POINTER
POPI2:   .BLKB 2      ; INPUT BUFFER READ POINTER
OTFLG2:  .BLKB 1      ; OUTPUT IN PROGRESS FLAG (NOT ZERO=T
INFLG2:  .BLKB 1      ; INPUT WAITING FOR HOST FLAG (NOT ZE
CCFLG2:  .BLKB 1      ; CONTROL C RECEIVED FLAG (NOT ZERO=T
HOLD2:   .BLKB 1      ; HOLD MODE FLAG (NOT ZERO=TRUE, MINU
LOOP2:   .BLKB 2      ; REPEAT MODE LOOP STARTING ADDRESS A
GOFLG2:  .BLKB 1      ; FLAG FOR ENABLING OUTPUT TO TERMINA
TPORT2:  .BLKB 2      ; TERMINAL PORT ADDRESS
TTCSR2:  .BLKB 2      ; TERMINAL PORT CONTROL/STATUS REGIST
INPUT2:  .BLKB 2      ; CONTAINS POINTER TO TERMINAL INPUT
OUTPT2:  .BLKB 2      ; CONTAINS POINTER TO TERMINAL OUTPUT
HRBUF2:  .BLKB 2      ; HOST INPUT REGISTER ADDRESS
PSTAT2:  .BLKB 2      ; PORT STATUS REGISTER ADDRESS
TTCLR2:  .BLKB 2      ; TRANSMIT COUNTER CLEAR ADDRESS
PTCTL2:  .BLKB 2      ; INTERRUPT TIMER CONTROL REGISTER AD
TIMER2:  .BLKB 2      ; INTERRUPT TIMER ADDRESS
PTMON2:  .BLKB 1      ; INTERRUPT TIMER ENABLE CONSTANT
PTMSK2:  .BLKB 1      ; INTERRUPT TIMER DISABLE CONSTANT
RATE2:   .BLKB 2      ; TERMINAL BAUD RATE LATCH ADDRESS
POINT2:  .BLKB 2      ; POINTER TABLE STARTING ADDRESS
ATTR2:   .BLKB 1      ; LAST READ OUTPUT ATTRIBUTES
RLOAD2:  .BLKB 1      ; INTERRUPT TIMER RELOAD COUNT
KILLI2:  .BLKB 2      ; KILL INPUT BUFFER FLAG/ADDRESS (MIN
KILLO2:  .BLKB 2      ; KILL OUTPUT BUFFER FLAG/ADDRESS (MI
QUEUE2:  .BLKB 1      ; QUEUED PORT CONTROL REQUEST (NOT ZE
SPEED2:  .BLKB 1      ; TERMINAL BAUD RATE VALUE
MARK2:   .BLKB 1      ; CONTAINS CHANNEL INDICATOR BIT IN L
PRIV2:   .BLKB 1      ; PRIVILEGED USER FLAG (NOT ZERO=TRUE
OBOT2:   .BLKB 2      ; CONTAINS POINTER TO START OF OUTPUT
NSFLG2:  .BLKB 1      ; NON-TERMINAL INPUT STATUS IN HW STA
FROZ2:   .BLKB 1      ; XOFF SENT TO TERMINAL FLAG (NOT ZER
SHIFT2:  .BLKB 1      ; ROTATING BIT PATTERN FOR HOST-INITI
ECHO2:   .BLKB 1      ; ECHO-BACK FLAG FOR SELF TEST (NOT Z
FLAGD2:  .BLKB 1      ; FLAGGED INPUT MODE FLAG (NOT ZERO=T
CLONE2:  .BLKB 1      ; RELOAD HOST INPUT DATA FLAG (NOT ZE
OLDIN2:  .BLKB 1      ; LAST VALID HOST INPUT DATA
LAST2:   .BLKB 1      ; LAST VALID TERMINAL INPUT STATUS WR

.=OOBE
NOFIP2:  .BLKB 1      ; DUMMY LOCATION FOR ENDFIP

.SBTTL   CHANNEL 3 POINTER TABLE
; CONTAINS BUFFER POINTERS, HARDWARE POINTERS, AND FLAGS

; SPECIAL NOTES:
; STAT3 MUST BE THE FIRST ENTRY IN THE TABLE
; THE TOP BYTE OF PUSHO3 MUST BE AT AN ODD ADDRESS
; INFLG3 AND HOLD3 MUST BE AT EVEN ADDRESSES
; THESE RESTRICTIONS ARE DUE TO SPECIAL FIRQ HARDWARE

.=OOCO
STAT3:   .BLKB 1      ; PORT TERMINAL INPUT STATUS BYTE
PUSHO3:  .BLKB 2      ; OUTPUT BUFFER WRITE POINTER
POPO3:   .BLKB 2      ; OUTPUT BUFFER READ POINTER
```

```
PUSHI3:   .BLKB 2        ; INPUT BUFFER WRITE POINTER
POPI3:    .BLKB 2        ; INPUT BUFFER READ POINTER
OTFLG3:   .BLKB 1        ; OUTPUT IN PROGRESS FLAG (NOT ZERO=T
INFLG3:   .BLKB 1        ; INPUT WAITING FOR HOST FLAG (NOT ZE
CCFLG3:   .BLKB 1        ; CONTROL C RECEIVED FLAG (NOT ZERO=T
HOLD3:    .BLKB 1        ; HOLD MODE FLAG (NOT ZERO=TRUE, MINU
LOOP3:    .BLKB 2        ; REPEAT MODE LOOP STARTING ADDRESS A
GOFLG3:   .BLKB 1        ; FLAG FOR ENABLING OUTPUT TO TERMINA
TPORT3:   .BLKB 2        ; TERMINAL PORT ADDRESS
TTCSR3:   BLKB 2         ; TERMINAL PORT CONTROL/STATUS REGIST
INPUT3:   .BLKB 2        ; CONTAINS POINTER TO TERMINAL INPUT
OUTPT3:   .BLKB 2        ; CONTAINS POINTER TO TERMINAL OUTPUT
HRBUF3:   .BLKB 2        ; HOST INPUT REGISTER ADDRESS
PSTAT3:   .BLKB 2        ; PORT STATUS REGISTER ADDRESS
TTCLR3:   .BLKB 2        ; TRANSMIT COUNTER CLEAR ADDRESS
PTCTL3:   .BLKB 2        ; INTERRUPT TIMER CONTROL REGISTER AD
TIMER3:   .BLKB 2        ; INTERRUPT TIMER ADDRESS
PTMON3:   .BLKB 1        ; INTERRUPT TIMER ENABLE CONSTANT
PTMSK3:   .BLKB 1        ; INTERRUPT TIMER DISABLE CONSTANT
RATE3:    .BLKB 2        ; TERMINAL BAUD RATE LATCH ADDRESS
POINT3:   .BLKB 2        ; POINTER TABLE STARTING ADDRESS
ATTR3:    .BLKB 1        ; LAST READ OUTPUT ATTRIBUTES
RLOAD3:   .BLKB 1        ; INTERRUPT TIMER RELOAD COUNT
KILLI3:   .BLKB 2        ; KILL INPUT BUFFER FLAG/ADDRESS (MIN
KILLO3:   .BLKB 2        ; KILL OUTPUT BUFFER FLAG/ADDRESS (MI
QUEUE3:   .BLKB 1        ; QUEUED PORT CONTROL REQUEST (NOT ZE
SPEED3:   .BLKB 1        ; TERMINAL BAUD RATE VALUE
MARK3:    .BLKB 1        ; CONTAINS CHANNEL INDICATOR BIT IN L
PRIV3:    .BLKB 1        ; PRIVILEGED USER FLAG (NOT ZERO=TRUE
OBOT3:    .BLKB 2        ; CONTAINS POINTER TO START OF OUTPUT
NSFLG3:   .BLKB 1        ; NON-TERMINAL INPUT STATUS IN HW STA
FROZ3:    .BLKB 1        ; XOFF SENT TO TERMINAL FLAG (NOT ZER
SHIFT3:   .BLKB 1        ; ROTATING BIT PATTERN FOR HOST-INITI
ECHO3:    .BLKB 1        ; ECHO-BACK FLAG FOR SELF TEST (NOT Z
FLAGD3:   .BLKB 1        ; FLAGGED INPUT MODE FLAG (NOT ZERO=T
CLONE3:   .BLKB 1        ; RELOAD HOST INPUT DATA FLAG (NOT ZE
OLDIN3:   .BLKB 1        ; LAST VALID HOST INPUT DATA
LAST3:    .BLKB 1        ; LAST VALID TERMINAL INPUT STATUS WR

.SBTTL  SPECIAL STORAGE LOCATIONS
        .=00FC
ENDFIP:  .BLKB 1         ; DUMMY LOCATION, WHEN WRITTEN TO, CA
                         ; SPECIAL INTERRUPT HARDWARE.  THIS LOCATION
                         ; MUST RESIDE AT AN EVEN ADDRESS
        .SBTTL  SCRATCH LOCATIONS FOR OPEN MODE AND SELF TES
        .=0100
IORATE:
                         ; SELF TEST TERMINAL BAUD COUNT FOR ERRORS
OPEFLG:  .BLKB 1         ; OPEN MODE LOCATION OPEN FLAG (NOT Z
OPEPNT:
                         ; OPEN MODE INPUT BUFFER POINTER OFFSET
CLKPNT:  .BLKB 2         ; CONTAINS POINTER TO NEXT BAUD RATE
TRACE:
                         ; CONTAINS IRQ INTERRUPT STATUS FOR SELF TEST
OPEBUF:  .BLKB 2         ; OPEN MODE INPUT BUFFER FOR ADDRESS
EXPDAT:
```

```
                            ;CONTAINS EXPECTED DATA FOR SELF TEST
BLANK:   .BLKB 1             ;OPEN MODE SCRATCH LOCATION FOR INPU
RECDAT:
                            ;CONTAINS RECEIVED DATA FOR SELF TEST
OPEDAT:  .BLKB 1             ;OPEN MODE INPUT BUFFER FOR DATA SPE
IOCHAN:  .BLKB 1             ;CURRENT CHANNEL BEING TESTED FOR SE
IOATT:   .BLKB 1             ;ATTRIBUTE STORAGE FOR SELF TEST I/O
ERRFMT:  .BLKB 1             ;ERROR FORMAT FOR SELF TEST I/O ERRO
ENDRAM=.

.SBTTL   STACK
.=0400
STACK:   .BLKB 1             ;STACK MOVES TOWARDS LOW MEMORY FROM
.SBTTL POINTER TABLE OFFSETS
STATX=STATO-STATO            ;POINTS TO PORT TERMINAL INPUT STATU
PUSHOX=PUSHOO-STATO          ;POINTS TO OUTPUT BUFFER WRITE POINT
POPOX=POPOO-STATO            ;POINTS TO OUTPUT BUFFER READ POINTE
PUSHIX=PUSHIO-STATO          ;POINTS TO INPUT BUFFER WRITE POINTE
POPIX=POPIO-STATO            ;POINTS TO INPUT BUFFER READ POINTER
OTFLGX=OTFLGO-STATO          ;POINTS TO OUTPUT IN PROGRESS FLAG
INFLGX=INFLGO-STATO          ;POINTS TO INPUT WAITING FOR HOST FL
CCFLGX=CCFLGO-STATO          ;POINTS TO CONTROL C RECEIVED FLAG
HOLDX=HOLDO-STATO            ;POINTS TO HOLD MODE FLAG
LOOPX=LOOPO-STATO            ;POINTS TO REPEAT MODE LOOP STARTING
GOFLGX=GOFLGO-STATO          ;POINTS TO TERMINAL ENABLE OUTPUT FL
TPORTX=TPORTO-STATO          ;POINTS TO ADDRESS OF TERMINAL PORT
TTCSRX=TTCSRO-STATO          ;POINTS TO ADDRESS OF TERMINAL CONTR
INPUTX=INPUTO-STATO          ;POINTS TO TERMINAL INPUT SERVICE RO
OUTPTX=OUTPTO-STATO          ;POINTS TO TERMINAL OUTPUT SERVICE R
HRBUFX=HRBUFO-STATO          ;POINTS TO ADDRESS OF HOST INPUT REG
PSTATX=PSTATO-STATO          ;POINTS TO ADDRESS OF PORT STATUS RE
TTCLRX=TTCLRO-STATO          ;POINTS TO ADDRESS OF TRANSMIT COUNT
PTCTLX=PTCTLO-STATO          ;POINTS TO TIMER CONTROL REGISTER AD
TIMERX=TIMERO-STATO          ;POINTS TO ADDRESS OF INTERRUPT TIME
PTMONX=PTMONO-STATO          ;POINTS TO INTERRUPT TIMER ENABLE CO
PTMSKX=PTMSKO-STATO          ;POINTS TO INTERRUPT TIMER DISABLE C
RATEX=RATEO-STATO            ;POINTS TO ADDRESS OF TERMINAL BAUD
POINTX=POINTO-STATO          ;POINTS TO START OF TABLE POINTER AD
ATTRX=ATTRO-STATO            ;POINTS TO LAST READ OUTPUT ATTRIBUT
RLOADX=RLOADO-STATO          ;POINTS TO INTERRUPT TIMER RELOAD CO
KILLIX=KILLIO-STATO          ;POINTS TO KILL INPUT BUFFER FLAG/AD
KILLOX=KILLOO-STATO          ;POINTS TO KILL OUTPUT BUFFER FLAG/A
QUEUEX=QUEUEO-STATO          ;POINTS TO QUEUED PORT CONTROL REQUE
SPEEDX=SPEEDO-STATO          ;POINTS TO TERMINAL BAUD RATE VALUE
MARKX=MARKO-STATO            ;POINTS TO CHANNEL INDICATOR
PRIVX=PRIVO-STATO            ;POINTS TO PRIVILEGED USER FLAG
OBOTX=OBOTO-STATO            ;POINTS TO START OF OUTPUT BUFFER PO
NSFLGX=NSFLGO-STATO          ;POINTS TO HW STATUS HOLDS NON-TERMI
FROZX=FROZO-STATO            ;POINTS TO XOFF SENT TO TERMINAL FLA
SHIFTX=SHIFTO-STATO          ;POINTS TO ROTATING BIT PATTERN FOR
ECHOX=ECHOO-STATO            ;POINTS TO SELF TEST ECHO-BACK FLAG
FLAGDX=FLAGDO-STATO          ;POINTS TO FLAGGED INPUT MODE FLAG
CLONEX=CLONEO-STATO          ;POINTS TO RELOAD HOST INPUT DATA FL
OLDINX=OLDINO-STATO          ;POINTS TO LAST VALID HOST INPUT DAT
LASTX=LASTO-STATO            ;POINTS TO LAST VALID TERMINAL INPUT

.SBTTL MISCELLANEOUS OFFSETS
```

```
CLKMAX=MAXTBL-CLKTBL    ;POINTS TO CORRECT POSITION IN BAUD
CLKMIN=MINTBL-CLKTBL    ;POINTS TO CORRECT POSITION IN BAUD
        .SBTTL INPUT AND OUTPUT BUFFERS
;ALL BUFFERS ARE CIRCULAR
.=8000
INBUF0: .BLKB 800       ;CHANNEL 0 INPUT BUFFER
OTBUF0: .BLKB 800       ;CHANNEL 0 OUTPUT BUFFER

;9000
INBUF1: .BLKB 800       ;CHANNEL 1 INPUT BUFFER
OTBUF1: .BLKB 800       ;CHANNEL 1 OUTPUT BUFFER

;0A000
INBUF2: .BLKB 800       ;CHANNEL 2 INPUT BUFFER
OTBUF2: .BLKB 800       ;CHANNEL 2 OUTPUT BUFFER

;0B000
INBUF3: .BLKB 800       ;CHANNEL 3 INPUT BUFFER
OTBUF3: .BLKB 800       ;CHANNEL 3 OUTPUT BUFFER
        .=0F000
;THIS WORD CONTAINS THE CHECKSUM FOR THE ENTIRE ROM
;PROMPV PUTS IT HERE

VERIFY:
    .WORD 0             ;CHECKSUM FOR THIS ROM

.SBTTL PROGRAM STARTING POINT
;THE POINTER TABLE FOR EACH CHANNEL IS INITIALIZED IN TURN,
;ALONG WITH ACIA'S AND PTM'S

;SWI2 INTERRUPT COMES HERE TOO

START:
    LDS #STACK          ;INITIALIZE STACK POINTER FOR NMI RECOGNITIO
    STA PICOFF          ;DISABLE PROGRAMMABLE INTERRUPT CONTROLLER
    LBSR INIT           ;INITIALIZE POINTER TABLE AND HARDWARE REGIS

RSTART:
    STA PICON           ;DUMMY WRITE TO ENABLE PROGRAMMABLE INTERRUP

.SBTTL MAINLINE
;THE MAINLINE IS USED MAINLY FOR STARTING EVENTS AND IS NOT
;FOR REAL TIME EVENT CONTROL.  THIS SECTION RUNS ONLY WHEN I
;ARE NOT BEING SERVICED.

;IT TAKES 4 COMPLETE PASSES OF THE MAINLINE IN ORDER TO SERV
;ALL 4 CHANNELS (ONE PASS PER CHANNEL)

PATROL:
    LDX #STAT3          ;PRESET CHANNEL TABLE POINTER

NEXTCH:
    TFR X,D             ;MOVE POINTER TO CHANNEL TABLE POINTER TO AC
    ADDB #40            ;AND POINT TO NEXT CHANNEL TO BE SERVICED
    TFR D,X             ;RETURN VALUE TO X

ACTIVE:
```

```
    TST  \QUEUEX,X     ;ANY PORT CONTROL REQUEST WAITING?
    LBNE COMPLY        ;YES, SERVICE IT
    LDY  \KILLIX,X     ;HAS KILL INPUT BUFFER REQUEST BEEN MADE?
    BPL  ENABLE        ;NO, GO ON
    STY  \\POPIX,X     ;YES, STORE NEW INPUT BUFFER READ POINTER
    CLR  \\INFLGX,X    ;IGNORE ANY CURRENTLY WAITING CHAR
    CLR  \KILLIX,X     ;ACKNOWLEDGE KILL INPUT REQUEST

;SECTION TO ENABLE SUSPENDED TERMINAL TO HOST INPUT

ENABLE:
    TST  \FROZX,X      ;IS TERMINAL INPUT SUSPENDED?
    BLE  PROMPT        ;NO, TAKE NO ACTION (MINUS=QUEUED)
    LDD  \\POPIX,X     ;YES, LOAD INPUT BUFFER READ POINTER
    SUBD \\PUSHIX,X    ;DETERMINE NUMBER OF FREE INPUT BUFFER LOCAT
    ANDA #7            ;ONLY LOOK AT 11 BITS (2K)
    CMPD #<MAXRM*2>    ;RE-ENABLE INPUT?
    BLS  PROMPT        ;NO, MAYBE LATER
    LDA  #XON!80       ;YES, QUEUE XON
    STA  \FROZX,X

;SECTION TO CONTROL HOLD MODE
;WARNING - USE OF DELAY BITS IN ATTRIBUTE BYTE (HOST OUTPUT)
;          CAN CAUSE UNPREDICTABLE EVENTS TO OCCUR

PROMPT:
    LDB  \\HOLDX,X     ;IS HOLD MODE IN EFFECT?
    BEQ  INCHEK        ;NO, USE NORMAL INPUT PROCESSING
    BPL  1$            ;YES, FIRST CHARACTER IS ALREADY IN
    LDY  \\PUSHIX,X    ;HAS FIRST CHARACTER ARRIVED?
    CMPY \\POPIX,X
    BEQ  PRIMER        ;NO, CHECK AGAIN LATER
    ANDB #0F           ;YES, INDICATE
    STB  \\HOLDX,X     ;BY CLEARING MSB
    ANDB #3            ;ONLY LOOK AT COUNTDOWN TIME BITS
    BEQ  INCHEK        ;NO DELAY REQUESTED, SWITCH TO NORMAL INPUT
    LBSR SETOFF        ;START COUNTDOWN.
    BRA  ACTIVE        ;CHECK FOR MORE ACTIVITY FOR THIS CHANNEL

1$:
    BITB #3            ;IS TIMEOUT HOLD MODE IN EFFECT?
    BEQ  INCHEK        ;NO, PROCESS INPUT
    TST  \RLOADX,X     ;IS COUNTDOWN TIMER ARMED?
    BNE  PRIMER        ;YES, INPUT IS STILL ACTIVE

;SECTION TO PROCESS NORMAL INPUT BETWEEN INPUT BUFFER AND
;HOST INPUT REGISTER

INCHEK:
    TST  \CLONEX,X     ;RELOAD HOST INPUT DATA?
    BNE  2$            ;YES, DO IT
    TST  \\INFLGX,X    ;NO, IS THERE INPUT WAITING FOR HOST?
    BNE  PRIMER        ;YES, GO ON
    CLR  \LASTX,X      ;ASSUME OLD STATUS ALREADY READ
    LDY  \\POPIX,X     ;DOES INPUT READ POINTER EQUAL WRITE?
    CMPY \\PUSHIX,X
```

```
        BEQ PRIMER          ;YES, INPUT BUFFER IS EMPTY
        TST \NSFLGX,X       ;IS NON-TERMINAL INPUT STATUS IN HW STATUS R
        BNE 1$              ;YES, DON'T CHANGE HW PORT STATUS
        ORCC #IMASK         ;MAKE SURE STATUS DOESN'T CHANGE
        LDA \\STATX,X       ;GET LATEST STATUS
        STA \LASTX,X        ;SAVE AS LAST VALID PORT STATUS REFLECTED TO
        STA [\PSTATX,X]     ;AND TRANSFER TO HW PORT STATUS REGISTER
        CLR \\STATX,X       ;START ON NEW STATUS
        ANDCC #^CIMASK      ;RE-ENABLE IRQ INTERRUPTS

1$:
        CLR \TDFLGX,X       ;MAKE SURE THAT NEXT READ REFLECTS TERMINAL
        LDA ,Y+             ;FETCH NEXT CHAR TO INPUT TO HOST
        STA \CLTNX,X        ;SAVE AS LAST LOADED HOST INPUT DATA
        TFR Y,D             ;MOVE UPDATED READ POINTER TO AC
        ANDA #3             ;TAKE CARE OF ANY WRAP-AROUND
        STD \\POPIX,X       ;SAVE NEW POINTER

2$:
        INC \\INFLGX,X      ;SET INPUT WAITING FOR HOST FLAG
        LDA \OLDINX,X       ;LOAD DATA
        STA [\HRBUFX,X]     ;AND MOVE TO HARDWARE REGISTER
        CLR \CLONEX,X       ;ASSUME RELOAD COMPLETE
        LBRA ACTIVE         ;CHECK FOR MORE ACTION ON THIS CHANNEL

PRIMER:
        LDY \\PUSHOX,X      ;SAVE CURRENT OUTPUT WRITE POINTER FOR LATER
        LDD \\POPOX,X       ;TIME TO CLEAR HARDWARE CHAR COUNTER?
        SUBD \\PUSHOX,X
        BEQ 1$              ;ZERO MEANS LOTS OF ROOM
        ANDA #7             ;ONLY LOOK AT LOWER 11 BITS OF DIFFERENCE (2
        CMPD #200           ;ROOM FOR MORE THAN 512 BYTES?
        BHI 1$              ;YES, RESET HARDWARE COUNTER
        CMPD #104           ;NO, ROOM FOR MORE THAN 256 BYTES (POSSIBLY
        BLS 2$              ;NO, GO ON
        ORCC #IFMASK        ;NO INTERRUPTIONS FOR THIS STEP
        CMPY \\PUSHOX,X     ;HAVE WE HAD HOST OUTPUT VERY RECENTLY?
        BNE 2$              ;YES, MAYBE WE SHOULD RE-EVALUATE...LATER

1$:
        STA [\TTCLRX,X]     ;RESET HARDWARE OUTPUT COUNTER

2$:
        ANDCC #^CIFMASK     ;RE-ENABLE INTERRUPTS
        TST \\OTFLGX,X      ;IS THERE OUTPUT IN PROGRESS?
        LBNE NEXTCH         ;YES, SERVICE NEXT CHANNEL
        LDY \\POPOX,X       ;NO, FETCH BUFFER READ POINTER
        LDD \KILLOX,X       ;HAS KILL OUTPUT BUFFER REQUEST BEEN MADE?
        BPL 5$              ;NO, GO ON
        STD \\POPOX,X       ;YES, UPDATE BUFFER READ POINTER
        CLRA                ;CLEAR DATA TO BE USED
        TST \\LOOPX,X       ;IS LOOP MODE ENABLED?
        BPL 3$              ;NO, USE CURRENT READ POINTER AND PLAY CATCH
        LDY \\LOOPX,X       ;YES, USE START OF LOOP POINTER
        CLR \\LOOPX,X       ;CLEAR LOOP MODE FLAG

3$:
```

```
        TST  \STATO          ; DUMMY READ TO REFRESH BUFFER MEMORY
        STA  \\1,Y           ; CLEAR ATTRIBUTE LOCATION
        CMPY \KILLOX,X       ; CLEARED ALL ATTRIBUTE LOCATIONS?
        BEQ  4$              ; YES, GO ON
        EXG  Y,D             ; NO, UPDATE POINTER
        ANDA #^CB            ; MAKE ROOM FOR ANY OVERFLOW
        ADDD #2              ; 2 BYTES TO NEXT ATTRIBUTE
        ORA  #8              ; RESTORE BUFFER ADDRESS BIT
        EXG  D,Y             ; MOVE BACK TO Y
        BRA  3$              ; CLEAR NEXT LOCATION

4$:
        CLR  \KILLOX,X       ; ACKNOWLEDGE KILL OUTPUT BUFFER REQUEST

5$:
        CMPY \\PUSHOX,X      ; IS OUTPUT BUFFER EMPTY?
        BNE  6$              ; NO, INITIATE OUTPUT
        TST  \FROZX,X        ; IS XON QUEUED?
        LBPL NEXTCH          ; NO, SERVICE NEXT CHANNEL

6$:
        TST  \\GOFLGX,X      ; IS TERMINAL OUTPUT INHIBITED?
        LBNE NEXTCH          ; YES, SERVICE NEXT CHANNEL

SEND:
        LDA  #TXON           ; ENABLE OUTPUT INTERRUPTS
        STA  \\OTFLGX,X      ; SET OUTPUT IN PROGRESS FLAG
        STA  [\TTCSRX,X]     ; REST IS AUTOMATIC
        LBRA ACTIVE          ; CHECK FOR MORE ACTION ON THIS CHANNEL
; SECTION TO SERVICE QUEUED PORT CONTROL REQUESTS
; THE MOST SIGNIFICANT BIT OF THE HW PORT STATUS REGISTER IS
; COMPLETION (EXCEPT FOR RETURN TERMINAL INPUT STATUS)
; THE 'PORT11' ROUTINE EXPLAINS REQUESTS IN DETAIL

COMPLY:
        CLRB                 ; PREPARE FOR REQUEST CLEAR
        ORCC #IFMASK         ; NO INTERRUPTIONS FOR NEXT STEP
        LDA  \QUEUEX,X       ; FETCH QUEUED REQUEST
        STB  \QUEUEX,X       ; CLEAR QUEUE REQUEST FLAG ('STB' IS FASTER T
        ANDCC #^CIFMASK      ; RESTORE INTERRUPT MONITORING
        CMPA #1A             ; RETURN TERMINAL INPUT STATUS?
        BNE  1$              ; NO, GO ON
        LDB  \\STATX,X       ; LOAD VERY LATEST STATUS
        ANDB #40             ; BUT, ONLY DOUBLE <CTRL C> BIT FOR NOW
        ORB  \LASTX,X        ; ADD IN LAST REFLECTED TERMINAL INPUT STATUS
        BRA  SIGNAL          ; COPY TO PORT STATUS REGISTER

1$:
        LDB  #80             ; PRESET FINAL DATA FOR HW STATUS REGISTER
        CMPA #0D0            ; IS SPECIAL MODE REQUEST?
        BHS  MODE            ; YES, TAKE CARE OF IT
        TSTA                 ; KILL BUFFER REQUEST?
        BMI  ZERO            ; YES, PROCESS
        ASLA                 ; IS BUFFER EMPTY REQUEST?
        LBMI UPDATE          ; YES, GO DO IT
        ANDA #<7*2>          ; ONLY LOOK AT BAUD BITS
        LDY  #CLKTBL         ; POINT TO START OF BAUD RATE TABLE
```

```
        LDY A,Y            ;FETCH NEW BAUD RATE
        STY [\RATEX,X]     ;AND TRANSFER TO HARDWARE
        ASLA               ;MOVE BAUD BITS TO UPPER HALF OF BYTE
        ASLA
        ASLA
        STA \SPEEDX,X      ;AND STORE INTO POINTER TABLE
        BRA SIGNAL         ;INDICATE REQUEST COMPLETED

;THIS SECTION HANDLES SPECIAL MODE SELECTIONS
;SUCH AS BINARY, PRIVILEGED USER, HOLD, RELOAD HOST INPUT DA
;AND FLAGGED INPUT MODES
;THIS IS PART OF THE 'COMPLY' SECTION

MODE:
        CMPA #ODE          ;BINARY/NON-BINARY INPUT MODE REQUEST?
        BHS CHANGE         ;YES, GO ON
        BITA #8            ;IS THIS A HOLD MODE REQUEST?
        BEQ 4$             ;NO, GO ON
        BITA #4            ;CANCEL HOLD MODE?
        BNE 2$             ;YES, DO IT
        TST \\INFLGX,X     ;NO, IS FIRST CHARACTER ALREADY WAITING?
        BEQ 1$             ;NO, GO ON
        LDA #40            ;YES, INDICATE BY CLEARING MSB AND COUNTDOWN

1$:
        STA \\HOLDX,X      ;SET HOLD MODE
        BRA SIGNAL         ;REQUEST SERVICED

2$:
        LDA \\HOLDX,X      ;IS TIMEOUT HOLD MODE IN EFFECT?
        BITA #3
        BEQ 3$             ;NO, LEAVE TIMER ALONE
        LDA \PTMSKX,X      ;LOAD MASK TO STOP TIMER (WHETHER OR NOT STA
        STA [\PTCTLX,X]    ;AND STOP IT
        CLR \RLOADX,X      ;INDICATE COUNTDOWN COMPLETE

3$:
        CLR \\HOLDX,X      ;INDICATE HOLD MODE CANCELED
        CLR \\INFLGX,X     ;IGNORE ANY WAITING INPUT
        BRA SIGNAL         ;REQUEST SERVICED

4$:
        BITA #4            ;RELOAD HOST INPUT DATA?
        BEQ 5$             ;NO, GO ON
        STA \CLONEX,X      ;YES, QUEUE
        BRA SIGNAL         ;REQUEST SERVICED

5$:
        BITA #2            ;FLAGGED INPUT REQUEST?
        BEQ 6$             ;NO, MUST BE PRIVILEGED USER REQUEST
        ANDA #1            ;REVEAL INDICATED STATE
        STA \FLAGDX,X      ;AND SAVE
        BRA SIGNAL         ;REQUEST SERVICED

6$:
        ANDA #1            ;REVEAL INDICATED PRIVILEGED USER STATE
        STA \PRIVX,X       ;AND SAVE
```

```
        BRA SIGNAL          ;REQUEST SERVICED

CHANGE:
        LDY #HOSTIN         ;DEFAULT INPUT ROUTINE FOR NON-BINARY MODE
        BITA #1             ;SET BINARY INPUT MODE?
        BNE 1$              ;NO, NON-BINARY
        CLR \\GOFLGX,X      ;YES, MAKE SURE OUTPUT CONTROL FLAG IS CLEAR
        LDY #LTREAD         ;CHANGE TO BINARY INPUT ROUTINE

1$:
        STY \INPUTX,X       ;SAVE INPUT ROUTINE POINTER

SIGNAL:
        STB \NSFLGX,X       ;SAVE NON-TERMINAL INPUT STATUS IN HW STATUS
        STB [\PSTATX,X]     ;INDICATE REQUEST COMPLETED
        LBRA ACTIVE         ;AND CHECK FOR MORE ACTION

;SECTION TO KILL INPUT AND/OR OUTPUT BUFFER
;THIS IS PART OF THE 'COMPLY' SECTION
;BIT 3 OF REQUEST BYTE SET, ZEROES THE OUTPUT BUFFER
;BIT 2 OF REQUEST BYTE SET, ZEROES THE INPUT BUFFER
;BIT 1 OF REQUEST BYTE SET, ZEROES THE TERMINAL INPUT STATUS

;SPECIAL NOTE:   THE HOST INPUT REGISTER MAY CONTAIN A WAITIN
;                EVEN THOUGH THE INPUT BUFFER IS ZEROED

ZERO:
        BITA #8             ;KILL OUTPUT BUFFER?
        BEQ 1$              ;NO, MAYBE INPUT BUFFER
        ORCC #IMASK         ;NO IRQ INTERRUPTS FOR NEXT STEP
        LDY \\PUSHOX,X      ;FETCH OUTPUT WRITE POINTER
        STY \\POPOX,X       ;AND STORE AS NEW OUTPUT READ POINTER
        ANDCC #^CIMASK      ;RE-ENABLE IRQ INTERRUPT MONITORING
        LBSR CLRATT         ;MAKE SURE THAT ALL ATTRIBUTE BYTES ARE CLEA

1$:
        BITA #4             ;KILL INPUT BUFFER?
        BEQ 2$              ;NO, PROBABLY ZERO TERMINAL INPUT STATUS
        ORCC #IMASK         ;NO IRQ INTERRUPTS FOR NEXT STEP
        LDY \\PUSHIX,X      ;FETCH CURRENT INPUT BUFFER WRITE POINTER
        STY \\POPIX,X       ;AND SAVE AS NEW INPUT BUFFER READ POINTER
        ANDCC #^CIMASK      ;RE-ENABLE IRQ INTERRUPT MONITORING

2$:
        BITA #2             ;ZERO TERMINAL INPUT STATUS?
        BEQ SIGNAL          ;NO, REQUEST COMPLETE
        ORCC #IMASK         ;YES, DON'T LET STATUS CHANGE
        CLR \\STATX,X       ;ZERO LATEST STATUS
        CLR \LASTX,X        ;AND THAT LAST REFLECTED
        ANDCC #^CIMASK      ;RE-ENABLE INTERRUPTS
        BRA SIGNAL          ;ALL DONE

;SECTION TO RETURN LT-11 STATUS
;BIT 3 OF REQUEST BYTE SET, RETURNS BUFFER EMPTY STATUS IN B
;       6 AND 7 OF THE HARDWARE PORT STATUS REGISTER ('PSTR')
;       PRIVILEGE STATUS IN BIT 5.
```

```
;BIT 1 SET, WITH BITS 2 AND 3 CLEARED, RETURNS THE CURRENT P
;        TO THE HARDWARE PORT STATUS REGISTER
;BIT 0 SET, WITH BITS 1, 2, AND 3 CLEARED, RETURNS THE CURRE
;        NUMBER TO THE HOST INPUT REGISTER
;THIS IS PART OF THE 'COMPLY' SECTION

UPDATE:
BITA #<8*2>         ;BUFFER EMPTY STATUS REQUEST?
BEQ BAUD            ;NO, GO ON
TST \PRIVX,X        ;IS USER PRIVILEGED?
BEQ 1$              ;NO, NON-PRIVILEGED
ORB #10             ;YES, INDICATE

1$:
LDY \\PUSHOX,X      ;FETCH OUTPUT BUFFER WRITE POINTER
CMPY \\POPOX,X      ;IS OUTPUT BUFFER EMPTY?
BNE 2$              ;NO, CHECK INPUT BUFFER
TST \\OTFLGX,X      ;MAYBE, IS CHAR IN PROGRESS?
BNE 2$              ;YES, BUFFER IS NOT EMPTY
TST \KILLOX,X       ;IS KILL OUTPUT BUFFER REQUEST STILL QUEUED?
BMI 2$              ;YES, BUFFER IS NOT EMPTY
ORB #40             ;INDICATE OUTPUT BUFFER EMPTY

2$:
LDY \\PUSHIX,X      ;FETCH INPUT BUFFER WRITE POINTER
CMPY \\POPIX,X      ;IS INPUT BUFFER EMPTY?
BNE SIGNAL          ;NO, WRITE TO HARDWARE
TST \\INFLGX,X      ;MAYBE, IS CHAR WAITING FOR HOST?
BNE SIGNAL          ;YES, INPUT IS NOT EMPTY
ORB #20             ;INDICATE INPUT BUFFER EMPTY
BRA SIGNAL          ;COPY TO HARDWARE STATUS REGISTER

BAUD:
BITA #<1*2>         ;RETURN FIRMWARE VERSION NUMBER?
BNE FWVER           ;YES, DO IT
ORB \SPEEDX,X       ;FETCH BAUD RATE FOR THIS PORT
BRA SIGNAL          ;AND WRITE TO HARDWARE PORT STATUS REGISTER

FWVER:
LDA #<<IDENT*10>+MOD>;YES, LOAD FIRMWARE VERSION NUMBER
INC \\INFLGX,X      ;SET CHARACTER WAITING FOR HOST FLAG
STA [\HRBUFX,X]     ;AND WRITE TO RECEIVER REGISTER
BRA SIGNAL          ;DONE

.SBTTL FIRQ INTERRUPT SERVICE ROUTINES

.SBTTL  HOST DATA INPUT INTERRUPT SERVICE ROUTINE
;PROGRAM CONTROL COMES HERE AFTER THE HOST READS A CHARACTER
;HOST INPUT REGISTER (176XX2)
;THIS ROUTINE IS COMMON FOR ALL FOUR CHANNELS
;THE HARDWARE AUTOMATICALLY REFERENCES THE CORRECT POINTER T

IN11:
TST \HOLDO          ;IS HOLD MODE IN EFFECT?
BEQ 1$              ;NO, GO ON
CLR \HOLDO          ;INDICATE HOLD MODE COMPLETE AND CANCEL SPEC
RTI                 ;AND RETURN
```

```
1$:
CLR  \INFLGO         ;CLEAR INPUT FLAG AND CANCEL SPECIAL HARDWAR
RTI                  ;AND RETURN

.SBTTL  HOST DATA OUTPUT INTERRUPT SERVICE ROUTINE
;THIS ROUTINE IS COMMON FOR ALL FOUR CHANNELS
;THE HARDWARE AUTOMATICALLY TAKES CARE OF STORING CHARACTER
;AND HANDLES WRAP-AROUND OF NEW BUFFER WRITE POINTER
;CONTROL COMES HERE ON WRITE TO ADDRESS 176XX6
;REGISTER U IS RESERVED FOR FIRQ INTERRUPTS AND SELF TEST ST

OUT11:
LDU  \PUSHOO         ;FETCH OUTPUT BUFFER WRITE POINTER
STA  ,U++            ;LET HARDWARE TRANSFER DATA TO OUTPUT BUFFER
STU  \PUSHOO         ;SAVE NEW POINTER
RTI                  ;HARDWARE DESERVES MOST OF CREDIT

.SBTTL  HOST DATA ATTRIBUTE OUTPUT INTERRUPT SERVICE ROUTINE
;THIS ROUTINE IS COMMON FOR ALL FOUR CHANNELS
;THE HARDWARE AUTOMATICALLY STORES BYTE PROPERLY
;REGISTER U IS RESERVED FOR FIRQ INTERRUPTS AND SELF TEST ST
;        76543210              FUNCTION                    HEX
;        00100000         NO OPERATION                     [20]
;        XX10X001         2   MSEC DELAY                   [21]
;        XX10X010         4   MSEC DELAY                   [22]
;        XX10X011         50  MSEC DELAY                   [23]
;        XX10X100         500 MSEC DELAY                   [24]
;        XX10X101         1   SEC  DELAY                   [25]
;        XX10X110         2   SEC  DELAY                   [26]
;        XX10X111         5   SEC  DELAY                   [27]
;        XX101XXX         INHIBIT OUTPUT                   [28]
;        X110XXXX         END OF HW REPEAT                 [60]
;        1X10XXXX         START OF HW REPEAT               [A0]
;        11101000         BREAK OUTPUT OF FEW USEC         [E8]
;        11101001         BREAK OUTPUT OF 2    MSEC        [E9]
;        11101010         BREAK OUTPUT OF 4    MSEC        [EA]
;        11101011         BREAK OUTPUT OF 50   MSEC        [EB]
;        11101100         BREAK OUTPUT OF 500  MSEC        [EC]
;        11101101         BREAK OUTPUT OF 1    SEC         [ED]
;        11101110         BREAK OUTPUT OF 2    SEC         [EE]
;        11101111         BREAK OUTPUT OF 5    SEC         [EF]
;BIT 5 IS ALWAYS SET
;BIT 4 IS ALWAYS CLEARED
;BITS MAY BE OR'D TO ALLOW MULTIPLE REQUESTS (EXCEPT FOR BRE

;** CAUTION ***************************************************
;     THE CHARACTER IN THE BUFFER IMMEDIATELY FOLLOWING A BRE
;     BE LOST, UNLESS DELAY BITS ARE SPECIFIED FOR THAT CHARA
;**************************************************************

;CONTROL COMES HERE ON WRITE TO ADDRESS 176XX4 (IF DATA BIT

ATT11:
LDU  \PUSHOO         ;FETCH OUTPUT BUFFER WRITE POINTER
STA  \\1,U           ;LET HARDWARE STORE DATA ATTRIBUTES INTO BUF
```

```
STA \ENDFIP      ;CANCEL SPECIAL HARDWARE
RTI              ;DONE
        .SBTTL  HOST PORT CONTROL INTERRUPT SERVICE ROUTINE
;THIS ROUTINE IS COMMON FOR ALL FOUR CHANNELS
;REGISTER U IS RESERVED FOR FIRQ INTERRUPTS AND SELF TEST ST

;PORT CONTROL REQUESTS ARE AS FOLLOWS:
;       76543210                FUNCTION                HEX
;       00010000        150     BAUD                    [10]
;       00010001        300     BAUD                    [11]
;       00010010        600     BAUD                    [12]
;       00010011        1200    BAUD                    [13]
;       00010100        2400    BAUD                    [14]
;       00010101        4800    BAUD                    [15]
;       00010110        9600    BAUD                    [16]
;       00010111        19200   BAUD                    [17]
;       00011010        RETURN TERMINAL INPUT STATUS    [1A]
;       00011011        VIRTUAL SELF TEST               [1B]
;       00011100        DOWNLOAD MODE                   [1C]
;       00011101        OPEN LOCATION MODE              [1D]
;       00011110        SELF TEST MODE                  [1E]
;       00011111        RESTART                         [1F]
;       010100X1        RETURN FIRMWARE VERSION NUMBER  [51]
;       01010010        RETURN CURRENT BAUD RATE        [52]
;       01011XXX        RETURN BUFFER EMPTY STATUS      [58]
;       100100XX        NO OPERATION (EXCEPT DONE)      [90]
;       1001XX1X        CLEAR TERMINAL INPUT STATUS     [92]
;       1001X1XX        KILL INPUT BUFFER               [94]
;       1001X11X        KILL INPUT BUFFER AND STATUS    [96]
;       10011XXX        KILL OUTPUT BUFFER              [98]
;       100111XX        KILL OUTPUT AND INPUT BUFFERS   [9C]
;       1001111X        KILL BOTH BUFFERS AND STATUS    [9E]
;       11010000        SET NON-PRIV. USER STATUS       [D0]
;       11010001        SET PRIVILEGED USER STATUS      [D1]
;       11010010        CLEAR FLAGGED INPUT MODE        [D2]
;       11010011        SET FLAGGED INPUT MODE          [D3]
;       110101XX        RELOAD HOST INPUT DATA          [D4]
;       11011000        HOLD MODE, NO COUNTDOWN         [D8]
;       11011001        HOLD MODE, 2   MSEC COUNTDOWN   [D9]
;       11011010        HOLD MODE, 4   MSEC COUNTDOWN   [DA]
;       11011011        HOLD MODE, 50  MSEC COUNTDOWN   [DB]
;       11011100        CLEAR HOLD MODE                 [DC]
;       11011110        BINARY INPUT MODE               [DE]
;       11011111        NON-BINARY INPUT MODE           [DF]
;BIT 5 IS ALWAYS CLEARED
;BIT 4 IS ALWAYS SET
;RETURNS (EXCEPT FIRMWARE VERSION NUMBER) ARE VIA THE UPPER
;PORT STATUS REGISTER ('PSTR').

;NORMAL INPUT STATUS INFORMATION RETURNED IN HARDWARE PORT S
;       76543210        STATUS          HEX     OCTAL   DECIM
;       00001111        NO ERRORS       [0F]    ( 17)   < 15
;       0XX11111        FRAMING ERROR   [1F]    ( 37)   < 31
;       0X1X1111        INPUT OVERRUN   [2F]    ( 57)   < 47
;       01XX1111        2 CTRL C'S      [4F]    (117)   < 79
```

```
;       BIT 7 IS CLEARED
;       BIT 6 SET, INDICATES THAT 2 CTRL C'S IN SUCCESSION W
;       BIT 5 SET, INDICATES THAT A DATA OVERRUN WAS DETECTE
;       BIT 4 SET, INDICATES THAT A FRAMING ERROR WAS DETECT
;       BITS 3,2,1, AND 0 ARE ALWAYS SET
;       BITS MAY BE OR'D FOR MULTIPLE INDICATION

;       ** CAUTION ****************************************
;           TERMINAL INPUT STATUS IS ONLY VALID IMMEDIATELY
;           OF THE HOST INPUT REGISTER
;       ***************************************************

;BUFFER EMPTY STATUS INFORMATION RETURNED IN HARDWARE PORT S
;       76543210        STATUS     HEX    OCTAL   DECIM
;       100X1111      NONE TRUE    [8F]   (217)   <143
;       1XX11111      PRIV. USER   [9F]   (257)   <175
;       1X1X1111      INPUT EMPTY  [AF]   (257)   <175
;       11XX1111      OUTPUT EMPTY [CF]   (317)   <207
;       BIT 7 IS SET
;       BIT 6 SET, INDICATES THAT THE INPUT BUFFER IS EMPTY
;       BIT 5 SET, INDICATES THAT THE OUTPUT BUFFER IS EMPTY
;       BIT 4 SET, INDICATES THAT USER IS PRIVILEGED
;       BITS 3,2,1 AND 0 ARE ALWAYS SET
;       BITS MAY BE OR'D FOR MULTIPLE INDICATION
;CURRENT BAUD RATE INFORMATION RETURNED IN HARDWARE PORT STA
;       76543210        RATE       HEX    OCTAL   DECIM
;       10001111      150  BAUD   [FF]   (217)   <143
;       10011111      300  BAUD   [9F]   (237)   <159
;       10101111      600  BAUD   [AF]   (257)   <175
;       10111111      1200 BAUD   [BF]   (277)   <191
;       11001111      2400 BAUD   [CF]   (317)   <207
;       11011111      4800 BAUD   [DF]   (337)   <223
;       11101111      9600 BAUD   [EF]   (357)   <239
;       11111111     19200 BAUD   [FF]   (377)   <255

;THE FIRMWARE VERSION NUMBER IS RETURNED IN THE HOST INPUT (
;OF THE PORT STATUS REGISTER.  THE UPPER 4 BITS OF THE DATA
;IDENTIFICATION NUMBER ('IDENT') AND THE LOW 4 BITS CONTAINS
;LEVEL ('MOD').  ANY DATA CURRENTLY RESIDING IN THE HOST INP

;DOWNLOAD MODE, OPEN MODE, SELF TEST MODE, RESTART, RETURN T
;STATUS, AND VIRTUAL SELF TEST REQUESTS ARE SERVICED IMMEDIA
;REQUESTS ARE ONLY QUEUED, AND ARE SERVICED BY THE MAINLINE

;THE MOST SIGNIFICANT BIT OF THE CHANNEL'S HW PORT STATUS RE
;UPON COMPLETION OF QUEUED REQUESTS

;INTENDED APPLICATION OF THIS ROUTINE FOR QUEUED REQUESTS IS
;       1) HOST CHECKS THAT MSB OF PORT STATUS IS ZERO
;       2) IF NOT ZERO, THEN HOST REQUESTS RETURN TERMINAL I
;          AND TESTS MSB OF HW PORT STATUS REGISTER UNTIL BI
;       3) HOST MAKES REQUEST
;       4) HOST PROGRAM TESTS MSB OF HW PORT STATUS REGISTER
;       5) HOST PROGRAM READS PERTINENT STATUS BITS OF REGIS
```

```
;           6) HOST PROGRAM ISSUES A RETURN TERMINAL INPUT STATU
;           7) HOST PROGRAM TESTS MSB OF HW PORT STATUS REGISTER

;BINARY/NON-BINARY INPUT MODES:
;           BINARY INPUT MODE PASSES ALL 8 BITS OF INCOMING CHAR
;           TERMINAL) TO HOST.
;           NON-BINARY INPUT MODE SUPPORTS XON/XOFF TO CONTROL O
;           KILLS THE INPUT BUFFER, AND <CTRL C> AND <CTRL O> KI
;           BUFFER

;FLAGGED INPUT MODE:
;           ALLOWS XON/XOFF CONTROL OF INPUT.  WHEN INPUT BUFFER
;           XOFF IS SENT TO THE TERMINAL TO STOP INPUT.  XON IS
;           SPACE IS MADE AVAILABLE.

;RELOAD HOST INPUT DATA:
;           THE MOST RECENT CHARACTER LOADED INTO THE HOST INPUT
;           IN CONJUNCTION WITH HOLD MODE, THIS CAN BE USED TO O
;           AN INPUT CHARACTER IS WAITING.  THE SAME CHARACTER B
;           TWICE, CAN BE IGNORED ON THE FIRST READ.  THE WAIT F
;           IS THUS REDUCED.
;           INTENDED APPLICATION:
;           1) THE HOST PROGRAM DISABLES RECEIVER INTERRUPTS
;           2) THE HOST PROGRAM REQUESTS HOLD MODE
;           3) THE HOST PROGRAM ENABLES RECEIVER INTERRUPTS
;           4) THE FIRST CHARACTER RECEIVED IS LOADED INTO THE H
;              REGISTER AND INTERRUPTS THE HOST COMPUTER
;           5) THE HOST READS THE CHARACTER.  (THE FOLLOWING CHA
;              LOADED INTO THE HOST INPUT REGISTER UNTIL THE HOS
;              IS AGAIN READ, UNLESS A RELOAD REQUEST IS MADE. )
;           6) THE HOST MAKES A RELOAD REQUEST.  THIS RELOADS TH
;              THOUGH FOR THE FIRST TIME.

;           NOTE: HOLD MODE IS AUTOMATICALLY RESET AFTER READING
;                 HOWEVER, THE FIRMWARE THINKS THAT THE FIRST CH
;                 BE READ, UNLESS A RELOAD IS REQUESTED.

;HOLD MODE:
;           THIS MODE PROVIDES THE CAPABILITY OF BLOCK INPUT REA
;           INTERRUPTING THE HOST COMPUTER FOR EVERY CHARACTER.
;           INPUT BURDEN IS REDUCED.

;           INTENDED APPLICATION:
;           1) THE HOST DISABLES RECEIVER INTERRUPTS
;           2) THE HOST REQUESTS HOLD MODE WITH SPECIFIED COUNTD
;           3) THE HOST ENABLES RECEIVER INTERRUPTS
;           4) THE FIRST CHARACTER RECEIVED IS LOADED INTO THE H
;              REGISTER AND INTERRUPTS THE HOST COMPUTER
;           5) THE HOST READS THE CHARACTER.  (THE FOLLOWING CHA
;              LOADED INTO THE HOST INPUT REGISTER UNTIL THE HOS
;              IS AGAIN READ (BLINDLY THIS TIME). )
```

```
;       6) THE HOST DISABLES RECEIVER INTERRUPTS AND WAITS A
;          BEFORE DOING THE BLIND READ.  (THE FIRST CHARACTE
;          BE AVAILABLE DURING THE BLIND READ.)
;       7) THE HOST THEN DOES NORMAL READS WITH INTERRUPTS D
;          THE INPUT BUFFER IS EMPTIED

;       NOTE: HOLD MODE IS AUTOMATICALLY RESET AFTER READING
;             HOWEVER, THE FIRMWARE THINKS THAT THE FIRST CH
;             BE READ.

;       OPTIONALLY, THE FIRST CHARACTER INTERRUPT MAY BE HEL
;                   NO INPUT IS RECEIVED FOR UP TO 50 MSEC O
;                   BUFFER FILLS.  THIS WOULD ALLOW A STEADY
;                   SAY, 2000 CHARACTERS TO BE INPUT BEFORE
;                   INTERRUPTED.  THIS IS DONE BY SPECIFYING
;                   (TIMEOUT) VALUE.

;WARNING - USE OF DELAY BITS IN ATTRIBUTE BYTE (HOST OUTPUT)
;          CAN CAUSE UNPREDICTABLE EVENTS TO OCCUR, SINCE BO
;          HARDWARE TIMER

;CONTROL COMES HERE ON WRITE TO ADDRESS 176XX4 (IF DATA BIT
;IRQ AND FIRQ INTERRUPTS ARE DISABLED FOR THIS ENTIRE ROUTIN

PORT11:
        LDU \POINTO     ;POINT TO START OF CHANNEL POINTER TABLE
        STA \ENDFIP     ;CANCEL SPECIAL HARDWARE
        PSHS A          ;MAKE SOME WORKING SPACE
        LDA TBUF        ;INPUT PORT CONTROL
        CMPA #1B        ;PORT CONTROL REQUEST?
        BLO 1$          ;YES, QUEUE IT
        LBEQ TESTME     ;NO, START VIRTUAL SELF TEST
        CMPA #1F        ;PORT CONTROL MODE REQUEST?
        BHI 1$          ;YES, QUEUE IT
        LBEQ START      ;NO, RESTART
        CMPA #1C        ;ENTER DOWNLOAD MODE?
        BEQ DOWNLD      ;YES, ENTER DOWNLOAD MODE
        CMPA #1D        ;OPEN MODE REQUEST?
        LBEQ OPEN       ;YES, ENTER OPEN MODE
        LBRA QUERY      ;MUST BE NORMAL SELF TEST MODE REQUEST

1$:
        STA \QUEUEX,U   ;QUEUE REQUEST

DONE11:
        PULS A          ;RESTORE A
        RTI             ;AND RETURN
        .SBTTL  DOWNLOAD MODE SECTION
;THIS SECTION ALLOWS DOWNLOADING AND EXECUTION OF HOST PROGR
;DIAGNOSTICS MAY BE DOWNLOADED AS CAN SPECIAL APPLICATION PR
;LOCATIONS 0000-03F0 ARE AVAILABLE AS DOWNLOAD RUNABLE SPACE
;IN ADDITION, BUFFER MEMORY LOCATIONS 8000-BFFF MAY BE USED
;TABLE AREA (NON-RUNABLE DUE TO REFRESH MEMORY RESTRICTIONS)
;PROGRAMS STARTING AT 'ENDRAM' OR HIGHER WILL NOT DISTURB PO
;OR OPEN LOCATION MODE STORAGE LOCATIONS.
;'INPUTX' AND 'OUTPTX' ENTRIES IN POINTER TABLE MAY BE USED
```

;PROGRAM TO INTERCEPT TERMINAL I/O INTERRUPTS
;DOWNLOAD FORMAT IS DEC PDP-11 .LDA FORMAT
;THE DATA IS EXPECTED TO BE IN THE LOW 4 BITS OF THE PORT CO
;OF THE CHANNEL WHICH INITIATED THE DOWNLOAD.  IT TAKES TWO
;BYTES TO RECONSTRUCT THE 8 BIT .LDA DATA BYTE.  THE FIRST P
;CONTAINS THE LOW 4 BITS OF THE .LDA DATA BYTE, AND THE SECO
;BYTE CONTAINS THE HIGH 4 BITS OF THE .LDA DATA BYTE.

;PORT CONTROL BIT VALUES ARE AS FOLLOWS:
;       BIT 7 SET, INDICATES THAT DATA NIBBLE IS HIGH 4 BITS
;       BIT 6 SET, INDICATES THAT DATA NIBBLE IS LOW 4 BITS
;       BIT 5 IS ALWAYS CLEARED
;       BIT 4 IS ALWAYS SET
;       BITS 3-0 CONTAIN DATA NIBBLE

;IN ADDITION, THE FOLLOWING PORT CONTROL COMMANDS ARE STILL
;       76543210            FUNCTION              HEX    OCTA
;       00011011         VIRTUAL SELF TEST        [1B]   (033
;       00011100         DOWNLOAD MODE            [1C]   (034
;       00011101         OPEN LOCATION MODE       [1D]   (035
;       00011110         SELF TEST MODE           [1E]   (036
;       00011111         RESTART                  [1F]   (037

;WHEN A PORT CONTROL BYTE IS WRITTEN, THE PORT STATUS REGIST
;AFTER THE BYTE HAS BEEN PROCESSED, BIT 7 OF THE PORT STATUS
;SET AND BITS 6-4 CONTAIN SUCCESS/FAIL INDICATION.  THE HOST
;READ AND DECODE THE SUCCESS/FAIL INDICATION PRIOR TO WRITIN
;CONTROL BYTE.

;SUCCESS/FAIL STATUS IS AS FOLLOWS:
;       76543210            INDICATION            HEX    OCTA
;       00001111         DATA BEING PROCESSED     [0F]   ( 17
;       10001111         VALID DATA               [8F]   (217
;       10011111         SUCCESSFUL DOWNLOAD      [9F]   (237
;       11001111         BAD CHECKSUM             [CF]   (317
;       11011111         BAD DATA NIBBLE          [DF]   (337
;       11101111         DATA TIMEOUT             [EF]   (357
;       11111111         BAD .LDA FORMAT          [FF]   (377

;NO RETURN IS MADE IF AN ERROR OCCURS (FIRQ INTERRUPTS ARE E
;THE SUCCESSFULLY DOWNLOADED PROGRAM IS AUTOMATICALLY STARTE
;THE ADDRESS AT WHICH IT IS STARTED IS DETERMINED BY ADDRESS
;THE '.END NNNN' STATEMENT AT THE END OF THE SOURCE CODE.
;FOR EXAMPLE, IF 'START' IS THE LABEL THAT INDICATES THE STA
;            OF THE PROGRAM, THEN THE PROGRAM SHOULD END WI

;.LDA FORMAT:
;       1ST BYTE OF EACH BLOCK = 01
;       2ND BYTE = 00
;       3RD BYTE = BLOCK BYTECOUNT
;       4TH BYTE = 00
;       5TH BYTE = LOW BITS LOADING ADDRESS

```
;           6TH BYTE = HIGH BITS LOADING ADDRESS
;           7TH THROUGH BYTECOUNT-6 = DATA
;           LAST BYTE = CHECKSUM (NEGATED SUM OF ALL BYTES)

;         IF BYTECOUNT = 6 THEN NO MORE BLOCKS WILL
;         FOLLOW, AND LOADING ADDRESS BECOMES STARTING ADDRESS

DOWNLD:
    LDS #STACK          ;ZERO STACK
    ANDCC #^CFMASK      ;ENABLE FIRQ INTERRUPTS

1$:
    BSR WAIT8           ;FETCH INPUT
    BEQ 1$              ;IGNORE NULLS BETWEEN BLOCKS
    CMPA #SOH           ;IS START OF BLOCK?
    BNE BADF            ;NO, BAD FORMAT ERROR
    LDY #0000           ;INITIALIZE CHECKSUM TO ZERO
    BSR WAIT8           ;FETCH NEXT BYTE
    BNE BADF            ;IF NOT ZERO, THEN BAD FORMAT
    BSR WAIT8           ;FETCH BYTECOUNT
    PSHS A              ;SAVE FOR LAST BLOCK CHECK
    TFR A,B             ;MOVE TO B
    SUBB #5             ;SUBTRACT HEADER BYTECOUNT BUT NOT CHECKSUM
    PSHS B              ;SAVE AS DATA BYTECOUNT
    BSR WAIT8           ;FETCH NEXT BYTE
    BNE BADF            ;IF NOT ZERO, THEN BAD FORMAT
    BSR WAIT8           ;GET LOW BYTE OF STARTING ADDRESS
    TFR A,B             ;TEMP SAVE
    BSR WAIT8           ;GET HIGH BYTE OF STARTING ADDRESS
    TFR D,X             ;MOVE STARTING ADDRESS TO X
    PULS B              ;RESTORE DATA BYTECOUNT

2$:
    BSR WAIT8           ;FETCH DATA BYTE
    DEC B               ;END OF THIS BLOCK?
    BEQ 3$              ;YES, CHECK CHECKSUM
    STA ,X              ;NO, STORE IT
    LDA ,X+             ;AND READ BACK TO CHECK IT
    BRA 2$              ;GET REST OF BLOCK

3$:
    LEAY A,Y            ;TEST CHECKSUM
    TFR Y,D
    TSTB                ;LOW BYTE SHOULD BE 00
    BNE BADC            ;BAD CHECKSUM
    PULS A              ;RESTORE INITIAL BYTECOUNT
    CMPA #6             ;WAS 6?
    BNE 1$              ;NO, READY FOR NEXT BLOCK
    LDA #90             ;INDICATE SUCCESSFUL DOWNLOAD
    BRA REPLY           ;AND WRITE TO PORT STATUS REGISTER

BADF:
    LDA #0F0            ;LOAD ERROR TYPE FOR BAD FORMAT
    BRA LDAERR          ;AND WRITE TO HOST INPUT REGISTER
```

```
BADC:
LDA #OCO            ;LOAD ERROR TYPE FOR BAD CHECKSUM

LDAERR:
LDX #HALT           ;LOAD JUMP ADDRESS FOR FATAL ERROR

REPLY:
STA [\PSTATX,U]     ;SEND RESULTS TO PORT STATUS REGISTER

HALT:
JMP ,X              ;JUMP TO START OF NEWLY LOADED PROGRAM

;ROUTINE TO GET INPUT FOR DOWNLOAD
;CHECKSUM IN REGISTER Y IS UPDATED
;REGISTER A CONTAINS PREVIOUSLY RECEIVED BYTE
;REGISTER A WILL CONTAIN NEW INPUT
;IF NO INPUT IS RECEIVED WITHIN APPROX. 10 SECONDS, A TIMEOU
;NO OTHER REGISTERS ARE AFFECTED

WAITB:
LEAY A,Y            ;ADD PREVIOUS BYTE TO CHECKSUM
PSHS X,Y,B          ;TEMP SAVE X,Y, AND B

1$:
CLR \QUEUEX,U       ;CLEAR FUTURE DATA BYTE
LDA #80             ;INDICATE READY FOR NEXT DOWNLOAD BYTE
STA [\PSTATX,U]
LDA #0A             ;PRESET MAX. COUNT FOR TIMEOUT
LDX #0000           ;CLEAR X FOR TIMEOUT

2$:
LDB \QUEUEX,U       ;ANY HOST INPUT?
BNE 3$              ;YES, PROCESS
LEAX \\-1,X         ;NO, INNER LOOP TIMEOUT (1.12 SEC.)?
BNE 2$              ;NO, CONTINUE
DEC A               ;YES, MAX. TIMEOUT?
BNE 2$              ;NO, CONTINUE
LDA #OEO            ;LOAD TIMEOUT (EXPIRATION) ERROR
BRA LDAERR          ;AND DISPLAY ERROR INDICATION

3$:
BMI 6$              ;HIGH NIBBLE, GO ON
BITB #40            ;CORRECT LOW NIBBLE INDICATION?
BNE 5$              ;YES, PROCESS

4$:
LDA #OBO            ;NO, INDICATE ERROR
BRA LDAERR

5$:
ANDB #OF            ;MASK OFF ALL BUT DATA NIBBLE
TFR D,Y             ;AND SAVE FOR LATER
BRA 1$              ;READY FOR HIGH NIBBLE

6$:
BITB #40            ;CORRECT HIGH NIBBLE INDICATION?
```

```
BNE 4$                  ;NO, ERROR
ASLB                    ;MOVE DATA NIBBLE TO UPPER BITS
ASLB
ASLB
ASLB
LEAY B,Y                ;AND ADD TO LOW NIBBLE
TFR Y,D                 ;MOVE TO A
TFR B,A
PULS B,Y,X              ;RESTORE B,Y, AND X
TSTA                    ;CONDITION CODES SHOULD REFLECT DATA
RTS                     ;RETURN
        .SBTTL  OPEN LOCATION MODE SECTION
;THIS SECTION ALLOWS MEMORY LOCATIONS TO BE OPENED FOR EXAMI
;AND DEPOSIT OF NEW CONTENTS
;SLASH ('/') WITH A VALID ADDRESS PRECEDING, OPENS THAT LOCA
;SLASH ONLY, OPENS THE CURRENT LOCATION
;RETURN CLOSES THE CURRENT LOCATION
;LINEFEED CLOSES THE CURRENT LOCATION AND OPENS THE NEXT
;UP-ARROW ('^') CLOSES THE CURRENT LOCATION AND OPENS PREVIO
;'G' LOADS THE PROGRAM COUNTER WITH THE CURRENT ADDRESS AND
;IRQ AND FIRQ INTERRUPT MONITORING IS DISABLED THROUGHOUT TH
;ESCAPE OR CTRL C EXIT OPEN LOCATION MODE

;START AND MAINLINE OF THE OPEN MODE SECTION

OPEN:
PSHS B,X                ;INCREASE WORKING SPACE
LDX #0000               ;DEFAULT TO ADDRESS 0

NEWLOC:
CLR OPEBUF              ;CLEAR INPUT ADDRESS BUFFER
CLR OPEBUF+1
CLR OPEFLG              ;CLEAR LOCATION OPEN FLAG
CLR OPEPNT              ;CLEAR OFFSET LOCATION
LBSR CRLF               ;PRINT CR/LF

FETCH:
LBSR GETC               ;GET INPUT FROM TERMINAL
CMPB #ESC               ;IS INPUT AN ESCAPE?
BEQ WINDUP              ;YES, EXIT OPEN MODE
CMPB #ETX               ;NO, IS INPUT A CTRL C?
BEQ WINDUP              ;YES, EXIT OPEN MODE
CMPB #CR                ;NO, IS INPUT A RETURN?
BEQ OPERET              ;YES, TAKE CARE OF IT
CMPB #LF                ;NO, IS INPUT A LINEFEED?
BEQ OPELF               ;YES, TAKE CARE OF IT
CMPB #'^                ;NO, IS INPUT AN UP-ARROW?
LBEQ ARROW              ;YES, TAKE CARE OF IT
CMPB #SPACE             ;NO, IS LESS THAN A SPACE?
BLO FETCH               ;YES, IGNORE IT
LBSR PUTC               ;NO, ECHO IT
CMPB #'/                ;IS INPUT A SLASH?
LBEQ SLASH              ;YES, TAKE CARE OF IT
CMPB #'G                ;NO, IS A 'G'?
LBEQ GOMAN              ;YES, PROCEED TO EXECUTION MODE
SUBB #30                ;NO, IS LESS THAN '0'?
```

```
        LBLO OPERR          ;YES, ERROR
        CMPB #9             ;IS BETWEEN '0' AND '9'?
        BLS 1$              ;YES, GOOD DIGIT
        SUBB #11            ;NO, IS LESS THAN 'A'?
        LBLO OPERR          ;YES, ERROR
        CMPB #5             ;NO, IS BETWEEN 'A' AND 'F'?
        LBHI OPERR          ;NO, ERROR
        ADDB #0A            ;YES, MAKE INTO A HEX NUMBER

1$:
        LDA OPEPNT          ;FETCH INPUT POINTER OFFSET
        TST OPEFLG          ;IS LOCATION OPEN?
        BNE 2$              ;YES, MUST BE DATA
        CMPA #4             ;NO, ADDRESS BUFFER OVERFLOW?
        LBEQ OPERR          ;YES, ERROR
        PSHS X              ;NO, SAVE CONTENTS OF X
        LDX #OPEBUF         ;POINT TO START OF ADDRESS BUFFER
        BRA PACK            ;AND STORE INPUT

2$:
        CMPA #6             ;DATA BUFFER OVERFLOW?
        LBEQ OPERR          ;YES, ERROR
        PSHS X              ;NO, SAVE CONTENTS OF X
        LDX #OPEDAT-1       ;POINT TO START OF DATA BUFFER-1
        CMPA #4             ;IS THIS THE FIRST DIGIT OF DATA?
        BNE PACK            ;NO, GO ON
        CLR OPEDAT          ;YES, ZERO DATA IN CASE ONLY 1 DIGIT

PACK:
        LDA #4              ;4 SHIFTS TO DO

1$:
        ASL \\1,X           ;SHIFT LOW ORDER BYTE LEFT
        ROL ,X              ;MOVE ANY OVERFLOW INTO HIGH ORDER BYTE
        DECA                ;DONE SHIFTING?
        BNE 1$              ;NO
        ORB \\1,X           ;OR IN LATEST NUMBER FROM KEYBOARD
        STB \\1,X           ;AND STORE INTO LOW ORDER BYTE
        PULS X              ;RESTORE X
        INC OPEPNT          ;INCREMENT INPUT POINTER OFFSET
        BRA FETCH           ;READY FOR MORE INPUT

WINDUP:
        LBSR CRLF           ;SEND FINAL CR/LF
        PULS X,B            ;RESTORE X AND B
        LBRA DONE11         ;ALL DONE, RETURN TO NORMAL

;SECTION TO HANDLE CARRIAGE RETURN FOR OPEN MODE
;CARRIAGE RETURN WRITES OUT THE CURRENT DATA AND CLOSES LOCA

OPERET:
        LBSR CLOSE          ;CLOSE LOCATION, IF OPEN
        LBRA NEWLOC         ;DONE

;SECTION TO HANDLE LINEFEED FOR OPEN MODE
;LINEFEED WRITES OUT THE CURRENT DATA, CLOSES THE CURRENT LO
;AND OPENS THE NEXT LOCATION
```

```
OPELF:
    LBSR CLOSE          ;CLOSE CURRENT LOCATION, IF OPEN
    LEAX \\1,X          ;INCREMENT ADDRESS COUNTER

OPELOC:
    CLR OPEFLG          ;INDICATE LOCATION NOT YET OPEN
    LBSR CRLF           ;PRINT CR/LF
    TFR X,D             ;FETCH NEW ADDRESS
    PSHS B              ;SAVE B FOR LATER
    LBSR UNPACK         ;PRINT LEADING 2 DIGITS
    PULS A              ;RESTORE LOWER 2 DIGITS
    LBSR UNPACK         ;AND PRINT
    LDB #'/             ;LOAD A SLASH
    BSR PUTC            ;AND PRINT
    LDB #SPACE          ;LOAD A SPACE
    BSR PUTC            ;AND PRINT AND REFRESH BUFFER MEMORY
    LDA ,X              ;FETCH CURRENT DATA
    STA OPEDAT          ;STORE IN POINTER TABLE
    BSR UNPACK          ;AND PRINT
    LDB #SPACE          ;LOAD ANOTHER SPACE
    BSR PUTC            ;AND PRINT
    LDB #4              ;LOAD OFFSET POINTER FOR READING DATA
    STB OPEPNT
    STB OPEFLG          ;INDICATE THAT LOCATION IS OPEN
    LBRA FETCH          ;DONE, GET NEXT INPUT

;SECTION TO HANDLE UP-ARROW FOR OPEN MODE
;UP-ARROW WRITES OUT THE CURRENT DATA, CLOSES THE CURRENT LO
;AND OPENS THE PREVIOUS LOCATION

ARROW:
    LBSR CLOSE          ;CLOSE CURRENT LOCATION IF OPEN
    LEAX \\-1,X         ;DECREMENT ADDRESS COUNTER
    BRA OPELOC          ;AND OPEN NEW LOCATION
;SECTION TO HANDLE SLASH FOR OPEN MODE
;SLASH OPENS THE CURRENT LOCATION
;IF THE LOCATION IS ALREADY OPEN, IT IS CLOSED FIRST

SLASH:
    TST OPEFLG          ;IS LOCATION OPEN?
    BEQ 1$              ;NO, GO ON
    BSR CLOSE           ;YES, CLOSE
    BRA 2$              ;AND REOPEN LOCATION

1$:
    LDA OPEPNT          ;FETCH INPUT OFFSET
    BEQ 2$              ;NO CHANGE IN ADDRESS, SO OPEN AS IS
    LDX OPEBUF          ;LOAD NEW ADDRESS

2$:
    BRA OPELOC          ;OPEN LOCATION

;SECTION TO START EXECUTION FROM CURRENT ADDRESS
;STACK IS ZEROED AND FIRQ INTERRUPTS ARE ENABLED PRIOR TO EX

GOMAN:
```

```
TST OPEFLG         ;IS LOCATION OPEN?
BNE OPERR          ;YES, NOT ALLOWED!
LDB #NUL           ;PRINT EXTRA CHAR TO FLUSH OUTPUT BUFFER
BSR PUTC           ;SO THAT 'G' IS ECHOED
BSR PUTC           ;(OUTPUT IS DOUBLE-BUFFERED)
LDS #STACK         ;ZERO STACK TO REDUCE CHANCE OF STACK OVERFL
TST OPEPNT         ;USE CONTENTS OF X AS STARTING ADDRESS?
BEQ 1$             ;NO CHANGE IN ADDRESS, SO USE X
LDX OPEBUF         ;LOAD NEW STARTING ADDRESS

1$:
ANDCC #^CFMASK     ;RE-ENABLE FIRQ INTERRUPTS
JMP ,X             ;START EXECUTION

;SECTION TO HANDLE INVALID INPUT FROM TERMINAL
;A '?' IS PRINTED AND THE CURRENT ADDRESS AND DATA IS IGNORE
;IF A LOCATION IS ALREADY OPEN, IT IS CLOSED AND REOPENED

OPERR:
LDB #'?            ;LOAD A '?'
BSR PUTC           ;AND PRINT
TST OPEFLG         ;IS LOCATION OPEN?
BNE OPELOC         ;YES, REOPEN
LBRA NEWLOC        ;NO, IGNORE COMMAND

;ROUTINE TO GET INPUT FROM TERMINAL FOR OPEN MODE
;REGISTER U POINTS TO THE RELEVANT POINTER TABLE
;REGISTER B WILL CONTAIN THE INPUT CHARACTER ON RETURN

GETC:
LDB [\TTCSRX,U]    ;FETCH ACIA STATUS
BITB #1            ;INPUT?
BEQ GETC           ;NO, NOT YET
LDB [\TPORTX,U]    ;YES, READ CHARACTER
ANDB #7F           ;MASK OFF BIT 8
RTS
;ROUTINE TO OUTPUT TO TERMINAL FOR OPEN MODE
;REGISTER U POINTS TO THE RELEVANT POINTER TABLE
;REGISTER B CONTAINS THE CHARACTER TO BE OUTPUT

PUTC:
PSHS B             ;TEMP SAVE CHARACTER TO BE OUTPUT

1$:
LDB [\TTCSRX,U]    ;FETCH ACIA STATUS
BITB #2            ;OK TO OUTPUT?
BEQ 1$             ;NO, CHECK AGAIN
PULS B             ;YES, RESTORE OUTPUT CHAR
STB [\TPORTX,U]    ;AND OUTPUT
RTS

;ROUTINE TO PRINT CARRIAGE RETURN/LINEFEED FOR OPEN MODE
;THE CONTENTS OF REGISTER B IS DESTROYED

CRLF:
LDB #CR            ;LOAD CARRIAGE RETURN
```

```
BSR PUTC         ; AND OUTPUT
LDB #LF          ; LOAD LINEFEED
BSR PUTC         ; AND OUTPUT
RTS

; ROUTINE TO OUTPUT CONTENTS OF REGISTER A AS TWO HEX DIGITS
; THE CONTENTS OF REGISTER B IS DESTROYED
; FOR OPEN LOCATION MODE

UNPACK:
TFR A,B          ; DUPLICATE
LSRB             ; SHIFT TO GET FIRST DIGIT
LSRB
LSRB
LSRB
ADDB #'0         ; MAKE INTO A NUMBER
CMPB #'9         ; IS GREATER THAN '9'?
BLS 1$           ; NO, LEAVE AS IS
ADDB #'A-'9-1    ; YES, MAKE INTO A LETTER 'A'-'F'

1$:
BSR PUTC         ; AND PRINT
TFR A,B          ; NOW FOR SECOND DIGIT
ANDB #0F         ; MASK OFF UPPER BITS
ADDB #'0         ; MAKE INTO A NUMBER
CMPB #'9         ; IS GREATER THAN '9'?
BLS 2$           ; NO, LEAVE AS IS
ADDB #'A-'9-1    ; YES, MAKE INTO A LETTER 'A'-'F'

2$:
BSR PUTC         ; AND PRINT
RTS              ; DONE

; ROUTINE TO CLOSE CURRENT LOCATION IF OPEN
; DATA IS NOT WRITTEN IF NO NEW DATA WAS SPECIFIED
; REGISTERS A AND B ARE USED AS SCRATCH
CLOSE:
TST OPEFLG       ; IS LOCATION OPEN?
BEQ 1$           ; NO, RETURN
LDA OPEDAT       ; GET ANY NEW DATA
LDB OPEPNT       ; IS THERE ANY NEW DATA?
CMPB #4
BLS 1$           ; NO, SKIP IT
STA ,X           ; YES, WRITE NEW DATA

1$:
RTS              ; RETURN
        .SBTTL   SELF TEST SECTION
; SELF TEST MAY BE USER-INITIATED OR HOST-INITIATED.
; USER-INITIATED SELF TEST IS VIA NMI (NONmMASKABLE INTERRUPT
; SELF TEST REQUEST BY HOST.
; HOST-INITIATED SELF TEST IS VIA PORT CONTROL (ADDRESS 176XX
; A COMPLETE SELF TEST REQUIRES HOST ASSISTANCE. HOWEVER, MA
; BE CHECKED OUT WITHOUT AID OF A HOST - SUCH AS ROM INTEGRIT

.SBTTL       HOST-ASSISTED SECTION
; IT TAKES 4 COMPLETE PASSES OF THE MAINLINE IN ORDER TO SERV
```

```
;(ONE PASS PER CHANNEL)
;NORMAL FIRQ INTERRUPT ROUTINES ARE USED
;IRQ INTERRUPTS ARE NOT ENABLED
;SPECIAL HOST CONTROL COMMANDS ARE STORED IN THE 'QUEUE' ENT

;POINTER TABLE AND ARE AS FOLLOWS:
;       BIT 7 SET, INITIATES UNAIDED SELF TEST (ROM, RAM, I/
;       BIT 6 IS ALWAYS SET
;       BIT 5 IS ALWAYS CLEARED
;       BIT 4 IS ALWAYS SET
;       BIT 3 SET, ZEROES CHANNEL BUFFERS AND SPECIAL FLAGS
;       BIT 2 SET, ENABLES ECHO-BACK
;       BIT 1 SET, DISABLES ECHO-BACK
;       BIT 0 SET, SHIFTS BIT ONE POSITIONS LEFT IN UPPER 4
;                   REGISTER.
;MULTIPLE REQUESTS MAY BE PROCESSED (IN ABOVE ORDER) IN ONE
;WRITE, ALONG AS BIT 7 IS CLEARED.
;UNAIDED SELF TEST MAY ALSO BE STARTED VIA HOST REQUEST, BUT
;REQUEST (VIRTUAL SELF TEST).

;COMMAND SUMMARY:
;       76543210           FUNCTION            HEX    OCTA
;       0101XXX1       SHIFT PORT STATUS BIT   [51]   (121
;       0101XX1X       DISABLE ECHO-BACK       [52]   (122
;       0101X10X       ENABLE ECHO-BACK        [54]   (124
;       01011XX0       CLEAR TRANSMIT COUNTER  [58]   (130
;       01011XX1       ZERO BUFFERS AND FLAGS  [59]   (131
;       1101XXXX       UNAIDED SELF TEST       [D0]   (320

;IN ADDITION, THE FOLLOWING PORT CONTROL COMMANDS ARE STILL
;       76543210           FUNCTION            HEX    OCTA
;       00011011       VIRTUAL SELF TEST       [1B]   (033
;       00011100       DOWNLOAD MODE           [1C]   (034
;       00011101       OPEN LOCATION MODE      [1D]   (035
;       00011110       SELF TEST MODE          [1E]   (036
;       00011111       RESTART                 [1F]   (037

;IF ECHO-BACK IS ENABLED, THE FOLLOWING IS TRUE:
;       1) THE LOWER FOUR BITS OF ANY ATTRIBUTE BYTE WILL BE
;          FOUR BITS OF THE HARDWARE STATUS REGISTER OF THE
;       2) IF THE INPUT BUFFER CONTAINS ANY CHARACTERS (STOR
;          DISABLE), THEN THESE ARE AVAILABLE FOR READING UN
;          OR A HOST DATA OUTPUT OCCURS.  EACH CHARACTER MUS
;          THE NEXT ONE IS MADE AVAILABLE.
;       3) EACH CHARACTER OUTPUT BY THE HOST IS COPIED TO TH
;          ('RBUF') WITHOUT REGARD TO THE CURRENT DATA READY
;       4) THE TRANSMIT COUNTER ('HWCLR') IS CLEARED AFTER E

;IF ECHO-BACK IS DISABLED, THE FOLLOWING IS TRUE:
;       1) EACH CHARACTER OUTPUT BY THE HOST IS STORED IN TH
;       2) THE UPPER BYTE OF THE OUTPUT BUFFER WRITE POINTER
;          CHANNEL 0 HOST INPUT REGISTER ('RBUF0') FOLLOWING
```

```
;       3) THE LOWER BYTE OF THE OUTPUT BUFFER WRITE POINTER
;          CHANNEL 1 HOST INPUT REGISTER ('RBUF1') FOLLOWING
;       4) THE UPPER BYTE OF THE INPUT BUFFER WRITE POINTER
;          CHANNEL 2 HOST INPUT REGISTER ('RBUF2') FOLLOWING
;       5) THE LOWER BYTE OF THE INPUT BUFFER WRITE POINTER
;          CHANNEL 3 HOST INPUT REGISTER ('RBUF3') FOLLOWING
;       6) THE TRANSMIT COUNTER ('HWCLR') IS NEVER CLEARED.

QUERY:
        LDS #STACK          ;ZERO STACK
        LBSR INIT           ;INITIALIZE POINTER TABLES

HOSTED:
        STA PICON           ;DUMMY WRITE TO ENABLE PROGRAMMABLE INTERRUP
        LDX #STAT3          ;PRESET CHANNEL POINTER TABLE POINTER

ADJUST:
        TFR X,D             ;MOVE CHANNEL TABLE POINTER TO AC
        ADDB #40            ;AND POINT TO NEXT CHANNEL TO BE SERVICED
        TFR D,X             ;RETURN VALUE TO X

LOCKON:
        ANDCC #^CFMASK      ;ENABLE FIRQ INTERRUPT MONITORING
        LDA \QUEUEX,X       ;LOAD LATEST PORT CONTROL REQUEST
        BEQ ECOBAK          ;NOTHING, CHECK ON ECHO-BACK/NO ECHO-BACK
        ORCC #FMASK         ;DISABLE INTERRUPT MONITORING
        BPL 1$              ;NOT UNAIDED SELF TEST REQUEST, GO ON
        LDU #4080           ;INDICATE ROM TEST AND HOST-INITIATED
        LBRA GUIDE          ;START UNAIDED SELF TEST

1$:
        CLR \QUEUEX,X       ;CLEAR REQUEST
        ANDA #0F            ;ONLY LOOK AT LOW 4 BITS
        BITA #8             ;ZERO BUFFERS AND SPECIAL FLAGS (OR TRANSMIT
        BEQ 2$              ;NO, GO ON
        STA [\TTCLRX,X]     ;RESET TRANSMIT COUNTER
        BITA #1             ;CLEAR ONLY TRANSMIT COUNTER?
        BEQ LOCKON          ;YES, CHECK FOR MORE ACTION ON THIS CHANNEL
        LDD \OBOTX,X        ;LOAD POINTER TO START OF OUTPUT BUFFER
        STD \\PUSHOX,X      ;AND STORE AS NEW OUTPUT BUFFER WRITE POINTE
        STD \\POPOX,X       ;AND SAVE AS NEW OUTPUT BUFFER READ POINTER
        STD RBUF0           ;AND COPY TO CHANNEL 0 AND 1 HOST INPUT REGI
        ANDA #^C8           ;CONVERT TO START OF INPUT BUFFER POINTER
        STD \\PUSHIX,X      ;AND STORE AS NEW INPUT BUFFER WRITE POINTER
        STD \\POPIX,X       ;AND STORE AS NEW INPUT BUFFER READ POINTER
        STD RBUF2           ;AND COPY TO CHANNEL 2 AND 3 HOST INPUT REGI
        LBSR CLRATT         ;CLEAR ALL ATTRIBUTE BYTES IN OUTPUT BUFFER
        CLR \\INFLGX,X      ;CLEAR INPUT WAITING FOR HOST FLAG
        CLR \ECHOX,X        ;CLEAR ECHO-BACK INDICATION
        BRA NEWBIT          ;INITIALIZE ROTATING STATUS

2$:
        BITA #4             ;ENABLE ECHO-BACK?
        BEQ 3$              ;NO, GO ON
        LDA #80             ;YES, MARK
        STA \ECHOX,X
```

```
3$:
BITA #2            ;DISABLE ECHO-BACK?
BEQ 4$             ;NO, GO ON
ANDA #^C80         ;CLEAR ANY ECHO-BACK ENABLE INDICATION
STA \ECHOX,X       ;MARK

4$:
BITA #1            ;ROTATING STATUS REQUEST?
BEQ LOCKON         ;NO, CHECK FOR MORE ACTION

ROTATE:
ASL \SHIFTX,X      ;SHIFT CURRENT ROTATING STATUS
LDA \SHIFTX,X      ;AND FETCH
BCC OLDBIT         ;OK AS IS

NEWBIT:
LDA #8             ;RE-INITIALIZE ROTATING STATUS
STA \SHIFTX,X      ;AND SAVE FOR NEXT TIME

OLDBIT:
STA [\PSTATX,X]    ;COPY UPPER 4 BITS TO PORT STATUS REGISTER
BRA LOCKON         ;CHECK FOR MORE ACTION ON THIS CHANNEL

ECOBAK:
TST \ECHOX,X       ;IS ECHO-BACK ENABLED OR DISABLED?
BEQ ADJUST         ;NEITHER, TRY NEXT CHANNEL
BPL QUIET          ;DISABLED, GO ON
LDY \\POPOX,X      ;LOAD OUTPUT BUFFER READ POINTER
LDA \\1,Y          ;HAS ATTRIBUTE BYTE BEEN WRITTEN?
BEQ 1$             ;NO, CHECK FOR INPUT
ASLA               ;YES, MOVE LOW 4 BITS TO UPPER 4 BITS
ASLA
ASLA
ASLA
STA [\PSTATX,X]    ;AND WRITE TO HARDWARE PORT STATUS REGISTER
CLRA               ;CLEAR ATTRIBUTE BYTE
STA \\1,Y          ;CLR INSTRUCTION IS NOT ALLOWED!
BRA LOCKON         ;CHECK FOR MORE ACTION ON THIS CHANNEL
1$:
TST \\INFLGX,X     ;IS INPUT ALREADY WAITING FOR HOST?
BNE 2$             ;YES, GO ON
LDY \\POPIX,X      ;LOAD INPUT BUFFER READ POINTER
CMPY \\PUSHIX,X    ;IS INPUT BUFFER EMPTY?
BEQ 2$             ;YES, GO ON
LDA ,Y+            ;FETCH NEXT INPUT CHARACTER
INC \\INFLGX,X     ;SET INPUT WAITING FOR HOST FLAG
STA [\HRBUFX,X]    ;AND COPY CHARACTER TO HARDWARE REGISTER
TFR Y,D            ;MOVE READ POINTER TO AC
ANDA #^C8          ;TAKE CARE OF ANY WRAP-AROUND
STD \\POPIX,X      ;SAVE NEW POINTER
LBRA LOCKON        ;CHECK FOR MORE ACTION ON THIS CHANNEL

2$:
LDY \\POPOX,X      ;LOAD OUTPUT BUFFER READ POINTER
CMPY \\PUSHOX,X    ;IS OUTPUT BUFFER EMPTY?
LBEQ ADJUST        ;YES, CHECK NEXT CHANNEL
```

```
LDA ,Y              ;FETCH OUTPUT CHARACTER
STA [\HRBUFX,X]     ;COPY IMMEDIATELY TO HARDWARE RECEIVER REGIS
TFR Y,D             ;MOVE POINTER TO AC FOR UPDATING
ANDA #^CB           ;MAKE ROOM FOR ANY OVERFLOW
ADDD #2             ;2 BYTES PER OUTPUT
ORA #8              ;RESTORE BUFFER ADDRESS BIT
STD \\POPOX,X       ;STORE NEW OUTPUT BUFFER READ POINTER
STA [\TTCLRX,X]     ;RESET TRANSMIT COUNTER
LDY \\PUSHIX,X      ;KILL INPUT BUFFER
STY \\POPIX,X
CLR \\INFLGX,X      ;CLEAR INPUT WAITING FOR HOST FLAG
LBRA LOCKON         ;CHECK FOR MORE ACTION ON THIS CHANNEL

QUIET:
LDY \\POPOX,X       ;LOAD OUTPUT BUFFER READ POINTER
CMPY \\PUSHOX,X     ;IS OUTPUT BUFFER EMPTY?
LBEQ ADJUST         ;YES, CHECK NEXT CHANNEL
LDA ,Y              ;FETCH OUTPUT CHARACTER
PSHS A              ;TEMP SAVE
TFR Y,D             ;MOVE POINTER TO AC FOR UPDATING
ANDA #^CB           ;MAKE ROOM FOR ANY OVERFLOW
ADDD #2             ;2 BYTES PER OUTPUT
ORA #8              ;RESTORE BUFFER ADDRESS BIT
STD \\POPOX,X       ;STORE NEW OUTPUT POINTER
LDY \\PUSHIX,X      ;LOAD INPUT BUFFER WRITE POINTER
PULS A              ;RESTORE OUTPUT CHARACTER
STA ,Y+             ;AND STORE IN INPUT BUFFER
TFR Y,D             ;MOVE POINTER TO AC
ANDA #^CB           ;CLEAR ANY OVERFLOW
STD \\PUSHIX,X      ;SAVE NEW POINTER
STY RBUF2           ;AND COPY TO CHANNEL 2 AND 3 HOST INPUT REGI
LDY \\PUSHOX,X      ;LOAD OUTPUT BUFFER WRITE POINTER
STY RBUFO           ;AND COPY TO CHANNEL 0 AND 1 HOST INPUT REGI
LBRA LOCKON         ;CHECK FOR MORE ACTION ON THIS CHANNEL
     .SBTTL                 UNAIDED SELF TEST SECTION
;TEST MESSAGES AND ERRORS ARE PRINTED THROUGH CHANNEL 0 TERM
;AT 2400 BAUD IF THE SELF TEST WAS USER-INITIATED.
;THE RAM AND ROM TESTS ARE WRITTEN SUCH THAT NO SCRATCH RAM
;IS REQUIRED.  THIS MAKES THE TEST RESULTS SOMEWHAT RELIABLE
;THE RAM UNDER TEST IS NOT USED IN THE TESTING AND REPORTING
;REGISTER U IS USED FOR SELF TEST STATUS AS FOLLOWS:
;         BIT 15 SET, INDICATES THAT UNAIDED SELF TEST IS FINI
;         BIT 14 SET, INDICATES THAT A ROM ERROR OCCURRED (OR
;         BIT 13 SET, INDICATES THAT A RAM ERROR OCCURRED (OR
;         BIT 12 SET, INDICATES THAT AN I/O ERROR OCCURRED (OR
;         BIT  7 SET, INDICATES THAT SELF TEST WAS HOST INITIA
;                     OR VIRTUAL SELF TEST REQUEST (VIA HOST)
;         BIT  3 SET, INDICATES THAT A CHANNEL 3 I/O ERROR OCC
;         BIT  2 SET, INDICATES THAT A CHANNEL 2 I/O ERROR OCC
;         BIT  1 SET, INDICATES THAT A CHANNEL 1 I/O ERROR OCC
;         BIT  0 SET, INDICATES THAT A CHANNEL 0 I/O ERROR OCC
;AS EACH TEST IS ENTERED, THE CORRESPONDING TEST IN PROGRESS
;IT IS CLEARED AT THE END OF THE TEST, PROVIDING THAT NO ERR

;IN ADDITION, THE RAM TEST USES THE FOLLOWING REGISTER U BIT
;         BITS 11, 10, 9, AND 8 ARE USED FOR TEMPORARY RAM TES
```

```
;            BIT  6 SET, INDICATES THAT STOP ON ERROR IS IN EFFEC
;            BIT  5 SET, INDICATES THAT LOOP MODE IS IN EFFECT
;THE GLOBAL STATUS BITS 12-15 ARE COPIED INTO THE CHANNEL O
;AT THE BEGINNING OF EACH UNAIDED TEST AND UPON COMPLETION O
;OF SELF TEST.
;THE TERMINAL I/O TEST STATUS BITS 0-3 ARE COPIED INTO THE C
;REGISTER ('PSTR1') UPON COMPLETION OF THE UNAIDED PORTION O

;ENTRY POINT FOR USER INITIATED SELF TEST (SWI3 OR NMI INTER

TESTME:
ORCC #IFMASK        ;MAKE SURE THAT INTERRUPT MONITORING IS DISA
LDU #4000           ;INDICATE ROM TEST, USER-INITIATED SELF TEST
LDA #1              ;POINT TO CHANNEL O PTM CONTROL REGISTER
STA CLOCKO-1
LDA #FSHOT          ;LOAD PTM CONTROL FOR BAUD GENERATION
STA CLOCKO-2        ;WRITE BAUD CLOCK GENERATION CONTROL
LDX DEFALT          ;FETCH DEFAULT BAUD RATE CONSTANT (2400)
STX CLOCKO          ;AND WRITE TO TIMER LATCHES
LDA #MRESET         ;RESET CHANNEL O ACIA
STA ACIAO
LDA #TXROFF         ;SET ACIA PARAMETERS - NO INTERRUPTS
STA ACIAO

;SECTION TO CONTROL SELF TEST

GUIDE:
STA PICOFF          ;DUMMY WRITE TO DISABLE PROGRAMMABLE INTERRU
TFR U,D             ;FETCH CURRENT STATUS BITS
STA PSTRO           ;AND COPY TO CHANNEL O HW REGISTER
CLR PSTR1           ;INDICATE NO I/O ERRORS
LDY #MESG1          ;POINT TO START OF INITIAL MESSAGE
LDS #TEST1          ;LOAD RETURN ADDRESS
LBRA WRITEM         ;WRITE MESSAGE

TEST1:
LDS #TEST2A         ;LOAD RETURN ADDRESS FOR ROM TEST
LBRA ROMTST         ;AND TEST ROM

TEST2A:
TFR U,D             ;FETCH CURRENT SELF TEST STATUS
EORA #60            ;REFLECT ACTUAL ROM TEST ERROR STATUS AND EN
TFR D,U             ;RE-STORE U
STA PSTRO           ;COPY CURRENT STATUS TO CHANNEL O HW REGISTE
LDY #MESG2A         ;POINT TO "RAM" MESSAGE

LOOPT2:
LDS #MPART2         ;LOAD RETURN ADDRESS
LBRA WRITEM         ;AND PRINT FIRST PART OF MESSAGE

MPART2:
LDY #MESG2B         ;POINT TO "[0000-03FF]" MESSAGE
LDX #0000           ;POINT TO START OF SCRATCH RAM
LDS #RAMTST         ;LOAD RETURN ADDRESS
LBRA WRITEM         ;WRITE MESSAGE AND TEST SCRATCH RAM
```

```
TEST2B:
LDY #MESG3         ;POINT TO "[8000-BFFF]" MESSAGE
LDX #8000          ;POINT TO START OF SCRATCH RAM
LDS #RAMTST        ;LOAD RETURN ADDRESS
LBRA WRITEM        ;WRITE MESSAGE AND TEST BUFFER MEMORY

END2:
TFR U,D            ;FETCH CONTENTS OF U
BITB #60           ;IS LOOP MODE IN EFFECT?
BEQ TEST3          ;NO, GO ON TO NEXT TEST
LDY #MESG4         ;POINT TO "LOOPING..." MESSAGE
BRA LOOPT2         ;LOOP

TEST3:
LDS #STACK         ;INITIALIZE STACK POINTER
TFR U,D            ;FETCH CURRENT SELF TEST STATUS
EORA #30           ;REFLECT ACTUAL RAM TEST ERROR STATUS AND EN
TFR D,U            ;RE-STORE U
TSTB               ;WAS SELF TEST HOST-INITIATED?
BPL 1$             ;NO, GO ON
BITA #60           ;YES, ANY RAM OR ROM ERRORS?
BNE FINISH         ;YES, DON'T TRUST MEMORY - END SELF TEST

1$:
STA PSTR0          ;COPY CURRENT SELF TEST STATUS TO CHANNEL 0
LDY #MESG6         ;POINT TO "TERMINAL I/O" MESSAGE
LBSR PRINTM        ;PRINT
LBSR IOTEST        ;AND TEST TERMINAL I/O

FINISH:
LDY #MESG99        ;POINT TO START OF "TEST COMPLETE" MESSAGE
LBSR PRINTM        ;AND PRINT
LBSR INIT          ;INITIALIZE POINTER TABLES
TFR U,D            ;FETCH LATEST STATUS
EORA #90           ;REFLECT ACTUAL I/O TEST ERROR AND SELF TEST
STA PSTR0          ;AND MOVE TO CHANNEL 0 HW PORT STATUS REGIST
ASLB               ;MOVE I/O TEST ERROR STATUS TO UPPER BITS
ASLB
ASLB
ASLB
STB PSTR1          ;AND COPY TO CHANNEL 1 HW REGISTER
TFR U,D            ;FETCH STATUS AGAIN
TSTB               ;WAS SELF TEST HOST-INITIATED?
LBMI HOSTED        ;YES, RETURN TO HOST-INITIATED SELF TEST MAI
LDA #80            ;INDICATE NON-TERMINAL INPUT STATUS IN HW ST
STA \NSFLG0        ;CHANNEL 0
STA \NSFLG1        ;CHANNEL 1
LBRA RSTART        ;RESTART LT-11 WITHOUT AFFECTING HW STATUS
    .SBTTL              ROM CHECKSUM TEST
;THIS CHECKSUM ALGORITHM WAS FIRST USED IN THE TEKTRONIX 466
;PLOTTER.  THE STORED CHECKSUM IS IN THE FIRST 2 LOCATIONS O
;THE ROM AND IS PLACED THERE BY THE ROM FORMATTER PROGRAM -

;THE ALGORITHM GOES AS FOLLOWS:
;       1) INITIALIZE CHECKSUM TO 0000 AND POINT TO FIRST RO
;       2) READ ROM BYTE
```

```
;         3) ADD TO CHECKSUM WITH CARRY
;         4) ROTATE CHECKSUM LEFT 1 WITH CARRY
;         5) POINT TO NEXT ROM LOCATION
;         6) REPEAT STEPS 2-5 UNTIL ALL ROM LOCATIONS ARE READ
;         7) COMPARE CHECKSUM WITH STORED CHECKSUM

;EXCEPTIONS TO THE ABOVE ALGORITHM ARE AS FOLLOWS:
;         1) IF THE ADDRESS IS FFE0-FFE3, FF IS USED AS DATA
;         2) IF THE ADDRESS IS FFF0-FFF9, THEN THE DATA COMES
;         3) IF THE ADDRESS IS NOT INCLUDED IN ABOVE STEP 2, A
;            RANGE FFE4-FFFF AND EITHER ADDRESS BIT 2 OR BIT 3
;            THEN ADDRESS BITS 3, 2, AND 1 ARE COMPLEMENTED
;THESE EXCEPTIONS ARE DUE TO THE PROGRAMMABLE INTERRUPT CONT
;REGISTER S CONTAINS THE RETURN ADDRESS

ROMTST:
        LDD  #0000           ;INITIALIZE CHECKSUM TO 0000
        LDX  #START          ;POINT TO FIRST ROM LOCATION
        LDY  #VECLST         ;LOAD POINTER TO SUBSTITUTE DATA LIST

1$:
        CMPX #0FFE0          ;DOES ADDRESS CONFLICT WITH INTERRUPT CONTRO
        BLO  5$              ;NO, NO SPECIAL HANDLING
        CMPX #0FFE4          ;IS IN RANGE FFE0-FFE3?
        BHS  2$              ;NO, GO ON
        ADDB #0FF            ;YES, USE FF AS DATA BECAUSE CAN'T READ REAL
        BRA  6$

2$:
        CMPX #0FFF0          ;IS ADDRESS IN THE RANGE FFF0-FFF9?
        BLO  3$              ;NO, GO ON
        CMPX #0FFFA          ;MAYBE, CHECK UPPER LIMIT
        BHS  3$              ;NO, GO ON
        ADDB ,Y+             ;YES, USE SHADOW BYTE
        BRA  6$              ;AND GO ON

3$:
        EXG  X,D             ;MOVE ROM ADDRESS POINTER TO ACCUMULATORS
        BITB #4              ;COMPLEMENT ADDRESS BITS 3, 2, AND 1?
        BEQ  4$              ;YES
        BITB #8              ;TEST AGAIN
        BEQ  4$              ;YES, COMPLEMENT
        EXG  X,D             ;NO, USE ADDRESS AS IS
        BRA  5$

4$:
        EORB #0E             ;COMPLEMENT ADDRESS BITS 3, 2, AND 1
        EXG  X,D             ;RETURN X TO X AND D TO D
        ADDB ,X              ;ADD ROM BYTE
        EXG  X,D             ;RESTORE ROM ADDRESS
        EORB #0E
        EXG  X,D
        BRA  6$              ;USE NEW DATA
```

```
5$:
ADDB ,X              ;ADD ROM BYTE

6$:
BCC 7$               ;NO CARRY, GO ON
INCA                 ;ADD IN END CARRY
BNE 7$               ;NO OVERFLOW, GO ON
INCB                 ;ADD IN OVERFLOW CARRY

7$:
ASLB                 ;SHIFT LEFT
ROLA                 ;SHIFT CARRY, IF ANY, INTO HIGH BYTE
BCC 8$               ;NO END AROUND CARRY
INCB                 ;ADD END AROUND CARRY

8$:
LEAX \\1,X           ;END OF ROM?
BNE 1$               ;NO, NEXT LOCATION
CMPD VERIFY          ;YES, DOES CHECKSUM AGREE WITH STORED CHECKS
BEQ 9$               ;YES, NEXT TEST
EXG U,D              ;PREPARE TO REFLECT ERROR IN STATUS
ANDA #^C40           ;INDICATE ROM ERROR
EXG U,D              ;AND WRITE BACK
LDY #ERR1            ;POINT TO START OF "ROM ERROR" MESSAGE
LBRA WRITEM          ;AND WRITE MESSAGE

9$:
JMP ,S               ;RETURN TO MAINLINE
        .SBTTL           RAM TEST
;THIS IS A MODIFIED MARCH TEST WITH COMPLEMENT ADDRESSING
;SCRATCH RAM IS NOT USED BECAUSE IT IS UNDER TEST.
;RETURN ADDRESS FOR SUBROUTINE CALLS IS STORED IN REGISTER S
;(DEPENDING ON THE ROUTINE).
;9 PASSES ARE REQUIRED TO TEST ALL DATA PATTERNS

;THE ALGORITHM USED IS AS FOLLOWS:
;    STARTING WITH TEST DATA=00,
;        1) WRITE TEST DATA TO CONSOLE (CHANNEL 0) PORT
;        2) WRITE LOCATION WITH TEST DATA
;        3) COMPLEMENT ADDRESS AND WRITE WITH TEST DATA
;        4) COMPLEMENT AND INCREMENT ADDRESS AND WRITE WITH T
;        5) REPEAT STEPS 3-4 UNTIL ALL RAM LOCATIONS ARE WRIT
;        6) READ, VERIFY, AND COMPLEMENT THE DATA OF EACH OF
;           LOCATIONS IN ORDER
;        7) DELAY APPROXIMATELY 1 SECOND TO CHECK FOR DROPOUT
;        8) VERIFY THE COMPLEMENTED DATA IN EACH LOCATION WIT
;           COMPLEMENT ADDRESSING SCHEME
;        9) REPEAT STEPS 1-8 WITH TEST DATA OF 01,02,04,08,10
;AN 'S' RECEIVED FROM THE CHANNEL 0 PORT WILL LOOP THIS TEST
;AN 'L' RECEIVED FROM THE CHANNEL 0 PORT WILL LOOP THIS TEST
;AN 'E' RECEIVED FROM THE CHANNEL 0 PORT WILL END THIS TEST

RAMTST:
TFR U,D              ;FETCH STATUS WORD
ANDA #0F0            ;ZERO LOWER 4 BITS OF UPPER BYTE
ADDA #0A             ;INITIALIZE PASS COUNT
```

```
        TFR D,U              ;RETURN TO U

LOOPR:
        TFR U,D              ;FETCH PASS COUNT
        DECA                 ;DONE WITH RAM TEST?
        BITA #0F             ;IT'S IN THE LOWER 4 BITS OF UPPER BYTE
        LBEQ ENDTST          ;YES, DETERMINE WHERE TO RETURN TO
        TFR D,U              ;SAVE UPDATED PASS COUNT
        ANDA #0F             ;ONLY LOOK AT PASS COUNT
        LDB #80              ;NOW FIGURE OUT WHAT TO USE FOR DATA
        ASLB                 ;WILL BE 80,40,20,10,08,04,02,01, OR 00

1$:
        RORB                 ;DEPENDING ON PASS COUNT
        DECA                 ;FINISHED?
        BNE 1$               ;NO
        EXG U,D              ;FETCH CURRENT STATUS
        TSTB                 ;WAS HOST-INITIATED SELF TEST?
        EXG U,D              ;RESTORE U AND D
        BMI WRITE1           ;YES, NO TERMINAL OUTPUT
        TFR D,S              ;TEMP SAVE DATA
        TFR B,A              ;MOVE DATA TO A
        LDY #ENDLNE          ;LOAD RETURN ADDRESS
        LBRA HEXOUT          ;AND DISPLAY IN HEX

ENDLNE:
        LDA ACIA0            ;OK TO SEND SPACE?
        BITA #2
        BEQ ENDLNE           ;NO, CHECK AGAIN
        LDA #SPACE           ;YES, LOAD
        STA ACIA0+1          ;AND WRITE
        TFR S,D              ;RESTORE DATA

WRITE1:
        TST \0000            ;REQUEST REFRESH OF BUFFER MEMORY
        STB ,X               ;STORE DATA
        EXG X,D              ;MOVE ADDRESS POINTER TO D
        COMB                 ;COMPLEMENT LOW BYTE
        COMA                 ;COMPLEMENT HIGH BYTE
        BPL 1$               ;BUFFER MEMORY ADDRESS, GO ON
        ANDA #3              ;SCRATCH RAM IS 10 BITS ONLY
        BRA 2$               ;GO ON

1$:
        ANDA #03F            ;BUFFER MEMORY IS 14 BITS
        ORA #80              ;MAP INTO BUFFER MEMORY SPACE

2$:
        EXG X,D              ;RESTORE D AND X
WRITE2:
        TST \0000            ;REQUEST REFRESH OF BUFFER MEMORY
        STB ,X               ;STORE DATA
        EXG X,D              ;MOVE ADDRESS POINTER TO D
        COMB                 ;COMPLEMENT LOW BYTE
        COMA                 ;COMPLEMENT HIGH BYTE
        BPL 1$               ;BUFFER MEMORY ADDRESS, GO ON
```

```
        ANDA #3              ;SCRATCH RAM IS 10 BITS ONLY
        BRA 2$               ;GO ON

1$:
        ANDA #03F            ;BUFFER MEMORY IS 14 BITS
        ORA #80              ;MAP INTO BUFFER MEMORY SPACE

2$:
        EXG X,D              ;RESTORE D
        LEAX \\1,X           ;POINT TO NEXT ADDRESS

WRITE3:
        CMPX #200            ;WRITTEN ALL SCRATCH RAM LOCATIONS?
        BNE 1$               ;NO, CHECK BUFFER MEMORY
        LDX #0000            ;YES, RESTORE START OF SCRATCH RAM
        BRA RMW1             ;READ, MODIFY, AND WRITE DATA

1$:
        CMPX #0A000          ;WRITTEN ALL BUFFER MEMORY LOCATIONS?
        BNE WRITE1           ;NO, NEXT LOCATION
        LDX #8000            ;YES, RESTORE START OF BUFFER MEMORY

RMW1:
        TST \0000            ;REFRESH BUFFER MEMORY REQUEST
        CMPB ,X              ;DOES DATA VERIFY?
        BEQ ERET1            ;YES, GO ON
        LDS #ERET1           ;ERROR, LOAD RETURN ADDRESS
        LBRA RAMERR          ;AND PRINT ERROR MESSAGE

ERET1:
        COMB                 ;COMPLEMENT DATA
        TST \0000            ;REFRESH BUFFER MEMORY REQUEST
        STB ,X+              ;STORE COMPLEMENTED DATA
        COMB                 ;RESTORE DATA FOR NEXT VERIFY
        CMPX #400            ;END OF SCRATCH RAM?
        BNE 1$               ;NO, GO ON
        LDX #0000            ;YES, RESTORE START OF SCRATCH RAM
        BRA DELAY            ;AND VERIFY COMPLEMENTED DATA

1$:
        CMPX #0C000          ;END OF BUFFER RAM?
        BNE RMW1             ;NO, CHECK NEXT LOCATION
        LDX #8000            ;YES, RESTORE START OF SCRATCH RAM

DELAY:
        LDA #3               ;NUMBER OF OUTSIDE LOOPS FOR 1 SECOND DELAY
        LDY #0000            ;ZERO DELAY COUNTER

1$:
        LEAY \\1,Y           ;INCREMENT COUNT
        BNE 1$               ;INSIDE LOOP NOT FINISHED
        DECA                 ;OUTSIDE LOOP FINISHED?
        BNE 1$               ;NO
        EXG U,D              ;FETCH CURRENT STATUS
        TSTB                 ;WAS HOST-INITIATED SELF TEST?
        EXG U,D              ;RESTORE U AND D
```

```
        BMI FLIP              ;YES, NO TERMINAL OUTPUT
        LDS #FLIP             ;LOAD RETURN ADDRESS
        CLRA                  ;INDICATE COMING FROM 'RAMTST'
        LBRA CHECK            ;CHECK FOR KEYBOARD INPUT

FLIP:
        COMB                  ;COMPLEMENT DATA FOR VERIFY

READ1:
        TST \0000             ;REFRESH BUFFER MEMORY REQUEST
        CMPB ,X               ;DOES DATA VERIFY?
        BEQ ERET2             ;YES, GO ON
        LDS #ERET2            ;ERROR, LOAD RETURN ADDRESS
        BRA RAMERR            ;AND PRINT ERROR MESSAGE

ERET2:
        EXG X,D               ;MOVE ADDRESS POINTER TO D
        COMB                  ;COMPLEMENT LOW BYTE
        COMA                  ;COMPLEMENT HIGH BYTE
        BPL 1$                ;BUFFER MEMORY ADDRESS, GO ON
        ANDA #3               ;SCRATCH RAM IS 10 BITS ONLY
        BRA 2$                ;GO ON

1$:
        ANDA #03F             ;BUFFER MEMORY IS 14 BITS
        ORA #80               ;MAP INTO BUFFER MEMORY SPACE

2$:
        EXG X,D               ;RESTORE D

READ2:
        TST \0000             ;REFRESH BUFFER MEMORY REQUEST
        CMPB ,X               ;DOES DATA VERIFY?
        BEQ ERET3             ;YES, GO ON
        LDS #ERET3            ;LOAD RETURN ADDRESS
        BRA RAMERR            ;AND PRINT ERROR MESSAGE

ERET3:
        EXG X,D               ;MOVE ADDRESS POINTER TO D
        COMB                  ;COMPLEMENT LOW BYTE
        COMA                  ;COMPLEMENT HIGH BYTE
        BPL 1$                ;BUFFER MEMORY ADDRESS, GO ON
        ANDA #3               ;SCRATCH RAM IS 10 BITS ONLY
        BRA 2$                ;GO ON

1$:
        ANDA #03F             ;BUFFER MEMORY IS 14 BITS
        ORA #80               ;MAP INTO BUFFER MEMORY SPACE

2$:
        EXG X,D               ;RESTORE D
        LEAX \\1,X            ;POINT TO NEXT RAM ADDRESS
        CMPX #200             ;VERIFIED ALL SCRATCH RAM LOCATIONS?
        BNE 3$                ;NO, GO ON
        LDX #0000             ;YES, RESTORE START OF SCRATCH RAM POINTER
        BRA 4$                ;AND START NEXT PASS
```

```
3$:
CMPX #0A000          ;VERIFIED ALL BUFFER RAM LOCATIONS?
BNE READ1            ;NO, CHECK NEXT LOCATION
LDX #8000            ;YES, RESTORE START OF BUFFER RAM POINTER

4$:
LBRA LOOPR           ;START NEXT PASS

ENDTST:
CMPX #0000           ;JUST FINISH TESTING SCRATCH RAM?
LBEQ TEST2B          ;YES, RETURN TO CONTROL

GOBACK:
LBRA END2            ;JUST FINISHED BUFFER MEMORY

ABORT:
LBRA TEST3           ;ABORT RAM TEST
;ERROR ROUTINE FOR RAM ERRORS

;THE ERROR MESSAGE IS IN THE FORM:
;   ** RAM ERROR AT ADDRESS XXXX  EX:XX  RE:XX **
;WHERE THE X'S ARE REPLACED BY ERROR DATA
;'EX' IS EXPECTED DATA, 'RE' IS RECEIVED DATA
;REGISTER X POINTS TO ERROR LOCATION
;REGISTER B CONTAINS EXPECTED DATA
;REGISTER S CONTAINS THE RETURN ADDRESS
;REGISTERS A AND Y ARE SCRATCH

RAMERR:
EXG U,D              ;FETCH CURRENT STATUS
TSTB                 ;WAS HOST-INITIATED SELF TEST?
EXG U,D              ;RESTORE U AND D
LBMI SETERR          ;YES, NO TERMINAL OUTPUT
LDY #ERR2A           ;POINT TO START OF ERROR MESSAGE: "RAM ERROR

1$:
LDA ACIA0            ;OK TO PRINT CHARACTER?
BITA #2
BEQ 1$               ;NOT YET
LDA ,Y+              ;FETCH CHARACTER TO BE PRINTED
BEQ 2$               ;DONE WITH THIS PART OF ERROR MESSAGE
STA ACIA0+1          ;PRINT IT
BRA 1$               ;READY FOR NEXT CHARACTER

2$:
TFR B,DP             ;TEMP SAVE B
TFR X,D              ;FETCH ERROR ADDRESS
LDY #PRINT1          ;POINT TO RETURN ADDRESS
LBRA HEXOUT          ;AND OUTPUT UPPER BYTE IN HEX

PRINT1:
TFR X,D              ;RE-FETCH ERROR ADDRESS
TFR B,A              ;PREPARE LOWER BYTE
LDY #PRINT2          ;POINT TO RETURN ADDRESS
LBRA HEXOUT          ;AND OUTPUT LOWER BYTE IN HEX
```

```
PRINT2:
LDY #ERR2B          ;POINT TO "EX: " MESSAGE

1$:
LDA ACIA0           ;OK TO PRINT CHARACTER?
BITA #2
BEQ 1$              ;NOT YET
LDA ,Y+             ;FETCH CHARACTER TO BE PRINTED
BEQ 2$              ;DONE WITH THIS PART OF ERROR MESSAGE
STA ACIA0+1         ;PRINT IT
BRA 1$              ;READY FOR NEXT CHARACTER

2$:
TFR DP,A            ;RESTORE EXPECTED DATA
LDY #PRINT3         ;POINT TO RETURN ADDRESS
LBRA HEXOUT         ;AND OUTPUT DATA IN HEX

PRINT3:
LDY #ERR2C          ;POINT TO "RE: " MESSAGE

1$:
LDA ACIA0           ;OK TO PRINT CHARACTER?
BITA #2
BEQ 1$              ;NOT YET
LDA ,Y+             ;FETCH CHARACTER TO BE PRINTED
BEQ 2$              ;DONE WITH ERROR MESSAGE
STA ACIA0+1         ;PRINT IT
BRA 1$              ;READY FOR NEXT CHARACTER

2$:
TST 03FF            ;REFRESH BUFFER MEMORY REQUEST
LDA ,X              ;FETCH RECEIVED DATA
LDY #PRINT4         ;POINT TO RETURN ADDRESS
LBRA HEXOUT         ;AND OUTPUT DATA IN HEX

PRINT4:
LDY #ERR2D          ;POINT TO END OF ERROR MESSAGE ("**")

1$:
LDA ACIA0           ;OK TO PRINT CHARACTER?
BITA #2
BEQ 1$              ;NOT YET
LDA ,Y+             ;FETCH CHARACTER TO BE PRINTED
BEQ 2$              ;DONE WITH ERROR MESSAGE
STA ACIA0+1         ;PRINT IT
BRA 1$              ;READY FOR NEXT CHARACTER

2$:
TFR DP,B            ;RESTORE DATA
CLRA                ;RESTORE DP
TFR A,DP

SETERR:
EXG U,D             ;FETCH STATUS
ANDA #^C20          ;INDICATE RAM ERROR
BITB #40            ;IS STOP ON ERROR BIT SET?
```

```
BNE 1$                  ;YES, GO ON
EXG U,D                 ;RE-STORE U AND D
CLRA                    ;INDICATE COMING FROM 'RAMTST'
BRA CHECK               ;CHECK FOR KEYBOARD INPUT AND RETURN

1$:
ORA #0A0                ;INDICATE RAM ERROR AND SELF TEST COMPLETE
STA PSTR0               ;AND MOVE TO CHANNEL 0 HW PORT STATUS REGIST
LDY #ERR3               ;POINT TO MESSAGE NOTIFYING USER
LDS #STOP               ;POINT TO RETURN ADDRESS
LBRA WRITEM             ;WRITE MESSAGE

STOP:
LDS #STACK              ;POINT TO VALID STACK IN CASE OF OPEN MODE R
ANDCC #^CFMASK          ;ALLOW FIRQ INTERRUPTS TO SAVE US
STA PICON               ;ENABLE PROGRAMMABLE INTERRUPT CONTROLLER

HANG:
BRA HANG                ;AND HANG

;SECTION TO TEST FOR KEYBOARD INPUT FOR 'RAMTST' AND 'IOTEST
;IF 'S' IS RECEIVED, THEN 'RAMTST' IS LOOPED WITH STOP ON ER
;IF 'L' IS RECEIVED, THEN 'RAMTST' IS LOOPED WITH NO STOP ON
;IF 'E' IS RECEIVED, THEN 'RAMTST' IS ENDED
;<CTRL S> TEMPORARILY STOPS OUTPUT
;<CTRL Q> RESTARTS OUTPUT
;NO KEYBOARD CHECK IS MADE IF SELF TEST WAS HOST-INITIATED
;REGISTER A CONTAINS ORIGINATING ROUTINE INDICATOR (PLUS='RA
;NO 'S', 'L', OR 'E' CHECK IS MADE IF ORIGINATING ROUTINE WA
;REGISTER S CONTAINS THE RETURN ADDRESS
;REGISTER A IS USED AS SCRATCH

CHECK:
EXG U,D                 ;FETCH SELF TEST STATUS
TSTB                    ;WAS SELF TEST HOST INITIATED?
EXG U,D                 ;RESTORE U AND D
BMI 6$                  ;YES, NO KEYBOARD INPUT CHECK
ASLA                    ;SAVE ORIGINATING ROUTINE INDICATOR IN CARRY
LDA ACIA0               ;ANY KEYBOARD INPUT?
BITA #1                 ;(CARRY IS IN USE)
BEQ 6$                  ;NO, RETURN
LDA ACIA0+1             ;YES, READ INPUT
ANDA #7F                ;MASK OFF BIT 8
BCS 4$                  ;NO 'S', 'L', OR 'E' CHECK
CMPA #'S                ;IS INPUT AN 'S'?
BNE 1$                  ;NO, GO ON
EXG U,D                 ;YES, FETCH STATUS WORD
ORB #60                 ;AND SET STOP ON ERROR AND LOOP BITS
EXG U,D                 ;RESTORE U AND D
BRA 2$                  ;START LOOPING

1$:
CMPA #'L                ;IS INPUT AN 'L'?
BNE 3$                  ;NO, GO ON
EXG U,D                 ;YES, FETCH U
ANDB #^C40              ;CLEAR STOP ON ERROR BIT
```

```
            ORB  #20             ;AND SET LOOPING MODE BIT
            EXG  U,D             ;RESTORE
2$:
            LBRA GOBACK          ;START LOOPING

3$:
            CMPA #'E             ;IS INPUT AN 'E'?
            LBEQ ABORT           ;YES, END TEST

4$:
            CMPA #XOFF           ;IS INPUT A <CTRL S>?
            BNE  6$              ;NO, RETURN

5$:
            LDA  ACIA0           ;WAIT FOR MORE INPUT
            LSRA
            BCC  5$              ;NOTHING YET
            LDA  ACIA0+1         ;READ INPUT
            ANDA #7F             ;MASK OFF BIT 8
            CMPA #XON            ;IS <CTRL Q>?
            BNE  5$              ;NO, IGNORE IT

6$:
            JMP  ,S              ;RETURN

;ROUTINE TO OUTPUT CONTENTS OF REGISTER A IN HEX
;REGISTER B IS USED AS SCRATCH
;REGISTER Y CONTAINS THE CALL RETURN ADDRESS
;NO OUTPUT OCCURS IF SELF TEST WAS HOST-INITIATED

HEXOUT:
            EXG  U,D             ;FETCH SELF TEST STATUS
            TSTB                 ;WAS SELF TEST HOST-INITIATED?
            EXG  U,D             ;RESTORE U AND D
            BMI  3$              ;YES, NO OUTPUT
            LDB  ACIA0           ;PRINTER BUFFER EMPTY?
            BITB #2
            BEQ  HEXOUT          ;NOT YET
            TFR  A,B             ;DUPLICATE
            LSRA                 ;MOVE UPPER 4 BITS TO LOWER
            LSRA
            LSRA
            LSRA
            ADDA #'0             ;MAKE INTO AN ASCII NUMBER
            CMPA #'9             ;IS GREATER THAN '9'?
            BLS  1$              ;NO, OUTPUT AS IS
            ADDA #'A-'9-1        ;YES, MAKE INTO HEX NUMBER A-F

1$:
            STA  ACIA0+1         ;OUTPUT
            ANDB #0F             ;NOW LOOK AT LOWER 4 BITS
            ADDB #'0             ;MAKE INTO AN ASCII NUMBER
            CMPB #'9             ;IS GREATER THAN '9'?
            BLS  2$              ;NO, OUTPUT AS IS
            ADDB #'A-'9-1        ;YES, MAKE INTO HEX NUMBER A-F
```

```
2$:
LDA ACIA0          ;OK TO OUTPUT?
BITA #2
BEQ 2$             ;NOT YET
STB ACIA0+1        ;YES, OUTPUT

3$:
JMP ,Y             ;RETURN TO CALLING ROUTINE
      .SBTTL             TERMINAL I/O TEST
;THE POINTER TABLES, ACIA'S, PTM'S AND HARDWARE REGISTERS AR
;THE DATA PATH TO AND FROM EACH TERMINAL IS THEN TESTED (WIT
;INSTALLED ON J50) AT ALL VALID BAUD RATES WITH INTERRUPTS E
;31 CHARACTERS ARE TRANSMITTED THROUGH EACH CHANNEL:   00-0F
;ALSO, EACH PROGRAMMABLE TIMER IS TESTED AT 3 DIFFERENT DELA
;IMMEDIATELY AFTER THE 31ST CHARACTER AT THE HIGHEST (19200)
;INTERRUPT TRACKING IS STORED IN LOCATION 'TRACE'

;BIT VALUES FOR 'TRACE' ARE AS FOLLOWS:
;         BIT 7 SET, INDICATES CHANNEL 3 TIMER INTERRUPT
;         BIT 6 SET, INDICATES CHANNEL 2 TIMER INTERRUPT
;         BIT 5 SET, INDICATES CHANNEL 1 TIMER INTERRUPT
;         BIT 4 SET, INDICATES CHANNEL 0 TIMER INTERRUPT
;         BIT 3 SET, INDICATES CHANNEL 3 ACIA INPUT INTERRUPT
;         BIT 2 SET, INDICATES CHANNEL 2 ACIA INPUT INTERRUPT
;         BIT 1 SET, INDICATES CHANNEL 1 ACIA INPUT INTERRUPT
;         BIT 0 SET, INDICATES CHANNEL 0 ACIA INPUT INTERRUPT
;ALL CHANNELS ARE TESTED IN HOST-INITIATED SELF TEST MODE
;ALL CHANNELS, EXCEPT CHANNEL 0, ARE TESTED IN USER-INITIATE
;THERE IS NO RECOVERY FOR AN UNIDENTIFIED INTERRUPT

IOTEST:
LBSR INIT          ;INITIALIZE POINTER TABLES, ACIA'S, PTM,'S A
TFR U,D            ;RESTORE HW STATUS REGISTER
STA PSTR0          ;DUE TO 'INIT' ROUTINE CLEAR
LDX #INSELF        ;POINT TO SELF TEST INPUT SERVICE ROUTINE
STX \INPUT0        ;SAVE FOR CHANNEL 0
STX \INPUT1        ;AND CHANNEL 1
STX \INPUT2        ;INITIALIZING ALL CHANNELS EARLY
STX \INPUT3        ;IN ORDER TO MONITOR UNEXPECTED INTERRUPTS
LDX #STAT0         ;POINT TO CHANNEL 0 POINTER TABLE
CLR IOCHAN         ;SET INITIAL CHANNEL NUMBER TO 0
TFR U,D            ;FETCH SELF TEST STATUS
TSTB               ;WAS SELF TEST HOST-INITIATED?
BMI IOPREP         ;YES, TEST ALL CHANNELS
LDA #TXROFF        ;NO, DISABLE CHANNEL 0 INTERRUPTS
STA [\TTCSRX,X]    ;SO THAT NORMAL PRINTING CAN BE PERFORMED
LBRA NEWCH         ;SKIP CHANNEL 0 PORTION OF TEST

IOPREP:
CLR IOATT          ;CLEAR THE ATTRIBUTE BYTE
LDA IOCHAN         ;FETCH CURRENT CHANNEL NUMBER
ADDA #'0           ;MAKE CHANNEL NUMBER ASCII
LBSR PRINTC        ;AND DISPLAY
LDY #CLKTBL        ;POINT TO START OF BAUD RATE TABLE
CLR IORATE         ;INITIALIZE RATE COUNT TO 0
```

```
IOLOAD:
LDD ,Y                  ;LOAD NEW BAUD RATE
STD [\RATEX,X]          ;WRITE TO PTM LATCH

PTMPNT:
STY CLKPNT              ;SAVE BAUD RATE POINTER FOR LATER
CLRB                    ;FIRST CHAR IS A NULL

NEWDAT:
STB EXPDAT              ;SAVE EXPECTED DATA
LDY \\PUSHOX,X          ;POINT TO NEXT BUFFER LOCATION
LDA IOATT               ;LOAD ATTRIBUTE BYTE
STA \\1,Y               ;AND STORE
STB ,Y++                ;STORE DATA AND UPDATE POINTER
STY \\PUSHOX,X          ;SAVE NEW OUTPUT POINTER (NO WRAP-AROUND TO
LDA #TXON               ;ENABLE TRANSMIT INTERRUPT
STA [\TTCSRX,X]
ANDCC #^CIMASK          ;ENABLE IRQ INTERRUPT MONITORING
LDY CLKPNT              ;LOAD BAUD RATE TABLE POINTER
LDY \CLKMAX,Y           ;FETCH TIMEOUT CONSTANT

1$:
LDB TRACE               ;FETCH LATEST INTERRUPT STATUS
BNE 3$                  ;GOT INTERRUPT(S), EVALUATE
LEAY \\-1,Y             ;NOTHING, TIMED OUT?
BNE 1$                  ;NO, CHECK AGAIN
ORCC #IMASK             ;DISABLE IRQ INTERRUPT MONITORING
LDB #81.                ;INDICATE TIMEOUT ERROR
TST IOATT               ;TIMER TESTING?
BEQ 2$                  ;NO, GO ON
ANDB #^C80              ;YES, DON'T DISPLAY EXPECTED DATA

2$:
LBSR IOERR              ;AND LOG
BRA 8$                  ;SKIP READ

3$:
ORCC #IMASK             ;DISABLE IRQ INTERRUPT MONITORING
PSHS Y                  ;TEMP SAVE Y
LDY \\PUSHIX,X          ;POINT TO INPUT CHARACTER
LDA ,Y                  ;AND FETCH
PULS Y                  ;RESTORE Y
LDB \MARKX,X            ;FETCH CHANNEL MARKER
TST IOATT               ;TIMER TEST?
BEQ 4$                  ;NO, ACIA TEST
ASLB                    ;YES, SHIFT TO UPPER BITS
ASLB
ASLB
ASLB
CLRA                    ;CLEAR RECEIVED DATA FOR VERIFY

4$:
STA RECDAT              ;SAVE RECEIVED DATA
CMPB TRACE              ;ONE AND ONLY ONE INTERRUPT (AND CORRECT ONE
BEQ 5$                  ;YES, GO ON
LDA EXPDAT              ;TEMP SAVE NORMALLY EXPECTED DATA
```

```
PSHS A
STB EXPDAT        ;SAVE EXPECTED INTERRUPT STATUS FOR ERROR ME
LDB TRACE         ;ALONG WITH RECEIVED INTERRUPT STATUS
STB RECDAT
LDB #0C4          ;IDENTIFY AS UNEXPECTED INTERRUPT ERROR
BRA 6$            ;AND LOG
5$:
EORB TRACE        ;ONLY CLEAR OPERATION THAT CAUSED INTERRUPT
STB TRACE         ;MONITOR INTERRUPTS BETWEEN CHARS
TFR Y,D           ;MOVE TIME SPENT WAITING FOR CHAR
LDY CLKPNT        ;LOAD BAUD RATE CLOCK REFERENCE POINTER
CMPD \CLKMIN,Y    ;WAS MINIMUM CHARACTER TIME REACHED?
BLS 7$            ;YES, CHECK FOR DATA VERIFY
LDB EXPDAT        ;SAVE EXPECTED DATA
PSHS B            ;IN ORDER TO USE COMMON CODE FOLLOWING 'IOER
LDB #0C2          ;INDICATE EARLY INPUT ERROR
TST IOATT         ;TIMER TESTING?
BEQ 6$            ;NO, GO ON
ANDB #^COCO       ;YES, OMIT RECEIVED AND EXPECTED DATA IN ERR

6$:
BSR IOERR         ;AND LOG
LDA #MRESET       ;RESET ACIA
STA [\TTCSRX,X]   ;TO RE-SYNCHRONIZE TO AVOID CAUSING MORE ERR
LDA #TXOFF        ;RESTORE DATA PARAMETERS
STA [\TTCSRX,X]
CLR TRACE         ;CLEAR INTERRUPT STATUS
PULS B            ;RESTORE EXPECTED DATA
BRA 9$            ;SKIP DATA VERIFY

7$:
LDA RECDAT        ;LOAD RECEIVED DATA
CMPA EXPDAT       ;DID INPUT=OUTPUT?
BEQ 8$            ;YES, GO ON
LDB #0C0          ;NO, INDICATE DATA COMPARISON ERROR
BSR IOERR         ;AND LOG

8$:
LDB EXPDAT        ;RESTORE DATA

9$:
TST IOATT         ;TIMER TESTING?
BNE NEWBOD        ;YES, NO DATA UPDATE
INCB              ;INCREMENT DATA
CMPB #10          ;INCREMENTING UPPER 4 BITS?
LBLS NEWDAT       ;NO, USE CURRENT DATA
ADDB #10-1        ;YES, INCREMENT UPPER 4 BITS
LBNE NEWDAT       ;AND OUTPUT

NEWBOD:
LDY CLKPNT        ;LOAD RATE POINTER
LEAY \\2,Y        ;POINT TO NEXT BAUD RATE
INC IORATE        ;INCREMENT RATE COUNT
LDB IORATE        ;FETCH RATE COUNT
CMPB #<<TOPCLK-CLKTBL>/2>  ;TESTED CHANNEL AT ALL BAUD RATES
LBLS IOLOAD       ;NO, ANOTHER TO GO
```

```
LDA IOATT          ;FETCH ATTRIBUTE BYTE
INCA               ;INCREMENT
ORA #8             ;INHIBIT CHARACTER OUTPUT
STA IOATT          ;SAVE NEW ATTRIBUTE BYTE
CMPA #<<<TSTMAX+4-DLYTBL>/4>!8>  ;TESTED ALL DELAY TIMES?
LBLS PTMPNT        ;NO, TEST NEXT DELAY TIME

NEWCH:
LEAX \40,X         ;POINT TO START OF NEXT CHANNEL'S POINTER TA
INC IOCHAN         ;INCREMENT CHANNEL NUMBER
LDA IOCHAN         ;FETCH CHANNEL NUMBER
CMPA #4            ;TESTED ALL CHANNELS?
LBNE IOPREP        ;NO, MORE TO DO
RTS                ;RETURN TO SELF TEST MAINLINE
;ERROR ROUTINE FOR I/O ERRORS

;THE ERROR MESSAGE IS IN THE FORM:
;    ** I/O ERROR ON CHANNEL X - RATE:XX  EX:XX  RE:XX **

;OR:
;    ** I/O ERROR ON CHANNEL X - RATE:XX  EX:XX  RE:XX - UNEXP

;OR:
;    ** I/O ERROR ON CHANNEL X - RATE:XX  EX:XX  RE:XX - EARLY

;OR:
;    ** I/O ERROR ON CHANNEL X - RATE:XX  EX:XX - NO INPUT **
;WHERE THE X'S ARE REPLACED BY ERROR DATA

;RATE IS REFLECTED AS FOLLOWS:
;         00=150    BAUD
;         01=300    BAUD
;         02=600    BAUD
;         03=1200   BAUD
;         04=2400   BAUD
;         05=4800   BAUD
;         06=9600   BAUD
;         07=19200  BAUD
;         08=2      MSEC DELAY
;         09=4      MSEC DELAY
;         0A=50     MSEC DELAY
;'EX' IS EXPECTED DATA, 'RE' IS RECEIVED DATA
;IN THE CASE OF AN UNEXPECTED INTERRUPT ERROR, 'EX' REFLECTS
;INTERRUPT PATTERN AND 'RE' REFLECTS THE RECEIVED INTERRUPT

;THE BIT VALUES FOR 'EX' AND 'RE' IN UNEXPECTED INTERRUPT ER
;       BIT 7 SET, INDICATES CHANNEL 3 ACIA INTERRUPT
;       BIT 6 SET, INDICATES CHANNEL 2 ACIA INTERRUPT
;       BIT 5 SET, INDICATES CHANNEL 1 ACIA INTERRUPT
;       BIT 4 SET, INDICATES CHANNEL 0 ACIA INTERRUPT
;       BIT 3 SET, INDICATES CHANNEL 3 TIMER INTERRUPT
;       BIT 2 SET, INDICATES CHANNEL 2 TIMER INTERRUPT
;       BIT 1 SET, INDICATES CHANNEL 1 TIMER INTERRUPT
;       BIT 0 SET, INDICATES CHANNEL 0 TIMER INTERRUPT

;REGISTER B CONTAINS ERROR PRINTOUT FORMAT INFORMATION AS FO
```

```
;           BIT 7 SET, PRINTS EXPECTED DATA
;           BIT 6 SET, PRINTS RECEIVED DATA
;           BIT 2 SET, PRINTS "UNEXPECTED INTERRUPT" ERROR MESSA
;           BIT 1 SET, PRINTS "EARLY INPUT" ERROR MESSAGE IN PLA
;           BIT 0 SET, PRINTS "NO INPUT" ERROR MESSAGE IN PLACE
;'IOCHAN' CONTAINS CURRENT CHANNEL NUMBER
;'RECDAT' CONTAINS RECEIVED DATA
;'EXPDAT' CONTAINS EXPECTED DATA
;<CTRL S> TEMPORARILY STOPS OUTPUT
;<CTRL Q> RESTARTS OUTPUT
;REGISTER X CONTAINS POINTER TO RELEVANT POINTER TABLE
;CONTENTS OF REGISTERS A AND B ARE DESTROYED
;NO OUTPUT OCCURS IF SELF TEST WAS HOST-INITIATED

IOERR:
STB ERRFMT          ;SAVE ERROR FORMAT
PSHS Y              ;SAVE REGISTER Y
LDY #ERR4A          ;POINT TO "I/O ERROR" PART OF ERROR MESSAGE
LBSR PRINTM         ;AND PRINT
LDA IOCHAN          ;LOAD CHANNEL NUMBER
ADDA #'0            ;MAKE ASCII
BSR PRINTC          ;AND PRINT
LDY #ERR4B          ;POINT TO "RATE" PART OF ERROR MESSAGE
LBSR PRINTM         ;AND PRINT
LDA IORATE          ;FETCH RATE COUNT
LDY #HEXEX          ;LOAD RETURN ADDRESS
LBRA HEXOUT         ;AND OUTPUT IN HEX

HEXEX:
ASL ERRFMT          ;PRINT EXPECTED DATA?
BCC HEXREC          ;NO, GO ON
LDY #ERR2B          ;POINT TO "EX" PART OF ERROR MESSAGE
BSR PRINTM          ;AND PRINT
LDA EXPDAT          ;LOAD EXPECTED DATA
LDY #HEXREC         ;LOAD RETURN ADDRESS
LBRA HEXOUT         ;AND PRINT IN HEX

HEXREC:
ASL ERRFMT          ;DISPLAY RECEIVED DATA?
BCC INTRUP          ;NO, GO ON
LDY #ERR2C          ;POINT TO START OF "RE" MESSAGE
BSR PRINTM          ;AND PRINT
LDA RECDAT          ;LOAD RECEIVED DATA
LDY #INTRUP         ;LOAD RETURN ADDRESS
LBRA HEXOUT         ;AND OUTPUT IN HEX

INTRUP:
LDB ERRFMT          ;FETCH UPDATED ERROR FORMAT
BITB #<4*4>         ;PRINT "UNEXPECTED INTERRUPT" ERROR MESSAGE?
BEQ EARLY           ;NO, GO ON
LDY #ERR4E          ;YES, POINT TO START OF ERROR MESSAGE
BSR PRINTM          ;AND PRINT

EARLY:
BITB #<2*4>         ;PRINT "EARLY INPUT"?
BEQ LOST            ;NO, GO ON
```

```
            LDY #ERR4C          ;YES, POINT TO START OF MESSAGE
            BSR PRINTM          ;AND PRINT

LOST:
            BITB #<1*4>         ;PRINT "NO INPUT"?
            BEQ 1$              ;NO, GO ON
            LDY #ERR4D          ;YES, POINT TO START OF MESSAGE
            BSR PRINTM          ;AND PRINT

1$:
            LDY #ERR2D          ;POINT TO ERROR MESSAGE TERMINATION
            BSR PRINTM          ;AND PRINT
            EXG U,D             ;FETCH SELF TEST STATUS
            ANDA #^C10          ;AND INDICATE I/O ERROR
            ORB \MARKX,X        ;IDENTIFY CHANNEL FOR HOST
            EXG U,D             ;RE-STORE U AND D
            TFR S,Y             ;TEMP SAVE STACK POINTER
            LDS #ENDERR         ;LOAD RETURN ADDRESS
            LDA #80             ;INDICATE COMING FROM 'IOTEST'
            LBRA CHECK          ;CHECK FOR <CTRL S>

ENDERR:
            TFR Y,S             ;RESTORE STACK POINTER
            PULS Y              ;RESTORE Y
            RTS                 ;AND RETURN
;ROUTINE TO OUTPUT CHARACTERS TO PORT 0 TERMINAL AFTER STAC
;REGISTER A CONTAINS THE CHARACTER TO BE OUTPUT
;NO REGISTERS ARE AFFECTED
;NO OUTPUT OCCURS IF SELF TEST WAS HOST-INITIATED

PRINTC:
            EXG U,D             ;FETCH CURRENT STATUS
            TSTB                ;WAS HOST-INITIATED?
            EXG U,D             ;RESTORE U AND D
            BMI 2$              ;YES, NO TERMINAL OUTPUT
            PSHS A              ;TEMP SAVE CHARACTER TO BE OUTPUT

1$:
            LDA ACIA0           ;FETCH I/O STATUS
            BITA #2             ;OK TO OUTPUT?
            BEQ 1$              ;NO, CHECK AGAIN
            PULS A              ;YES, RESTORE OUTPUT CHAR
            STA ACIA0+1         ;AND OUTPUT

2$:
            RTS

;ROUTINE TO PRINT MESSAGES TO PORT 0 TERMINAL AFTER STACK IS
;REGISTER Y POINTS TO START OF MESSAGE
;'!' IN MESSAGE STRING SENDS CR/LF
;NULL IN MESSAGE STRING TERMINATES MESSAGE
;NO REGISTERS ARE AFFECTED
;NO OUTPUT OCCURS IF SELF TEST WAS HOST-INITIATED

PRINTM:
            PSHS A,X            ;SAVE A AND X
```

```
TFR S,X              ;SAVE STACK POINTER
LDS #RETURN          ;LOAD RETURN ADDRESS
BRA WRITEM           ;AND WRITE MESSAGE

RETURN:
TFR X,S              ;RESTORE STACK POINTER
PULS X,A             ;RESTORE A AND X
RTS                  ;AND RETURN

;SECTION TO OUTPUT MESSAGES FOR SELF TEST BEFORE STACK IS IN
;REGISTER Y POINTS TO START OF MESSAGE
;REGISTER A IS USED AS SCRATCH
;'!' IN MESSAGE STRING SENDS CR/LF
;NULL IN MESSAGE STRING TERMINATES MESSAGE
;REGISTER S CONTAINS THE RETURN ADDRESS
;NO OUTPUT OCCURS IF SELF TEST WAS HOST-INITIATED

WRITEM:
EXG U,D              ;FETCH CURRENT STATUS
TSTB                 ;WAS HOST-INITIATED SELF TEST?
EXG U,D              ;RESTORE U AND D
BMI 4$               ;YES, NO TERMINAL OUTPUT

1$:
LDA ACIA0            ;FETCH CHAN 0 TRANSMIT STATUS
BITA #2              ;READY FOR ANOTHER CHARACTER?
BEQ 1$               ;NOT YET
LDA ,Y+              ;YES, FETCH NEXT CHARACTER
BEQ 4$               ;END OF MESSAGE, RETURN
CMPA #'!             ;IS TIME FOR CR/LF?
BNE 3$               ;NO, OUTPUT AS IS
LDA #CR              ;YES, LOAD CR
STA ACIA0+1          ;AND OUTPUT

2$:
LDA ACIA0            ;OUTPUT READY?
BITA #2
BEQ 2$               ;NO, TRY AGAIN
LDA #LF              ;YES, LOAD LF

3$:
STA ACIA0+1          ;PRINT CHARACTER
BRA 1$               ;CHECK FOR MORE CHARACTERS TO PRINT

4$:
JMP ,S               ;RETURN TO CALLING ROUTINE

;ROUTINE TO START PROGRAMMABLE TIMER
;REGISTER B CONTAINS DELAY CONSTANT
;REGISTER X POINTS TO RELEVANT POINTER TABLE
;REGISTERS A,B, AND Y ARE LOST

SETOFF:
LDY #DLYTBL-4        ;POINT TO TOP OF DELAY TABLE-4
ASLB                 ;SHIFT FOR PROPER INDEXING
ASLB
```

```
LDA B,Y              ;FETCH RELOAD COUNT
STA \RLOADX,X        ;AND SAVE
INCB                 ;POINT TO COUNT VALUE
LDD B,Y              ;FETCH IT
STD [\TIMERX,X]      ;AND WRITE TO HARDWARE TIMER
LDA \PTMONX,X        ;FETCH COUNTER ENABLE CONTROL BYTE
STA [\PTCTLX,X]      ;AND ENABLE COUNTER
RTS                  ;RETURN
;INITIALIZATION SECTION FOR PRESETTING THE POINTER TABLES,
;AND HARDWARE REGISTERS
;OUTPUT ATTRIBUTE BYTES ARE ZEROED

INIT:
ORCC #IFMASK         ;DISABLE ANY INTERRUPT MONITORING (SWI2 OR S
LDX #ENDRAM          ;START FROM LAST (NON-STACK) SCRATCH RAM ADD
TFR X,Y              ;USE AS LOCATION COUNTER TOO
1$:
CLR ,-X              ;CLEAR LOCATION-1
LEAY \\-1,Y          ;CLEARED ALL SCRATCH RAM?
BNE 1$               ;NO, IF NOT ZERO
LDX #STAT0           ;POINT TO TOP OF FIRST CHANNEL POINTER TABLE
LDY #INBUF0          ;FETCH START OF FIRST CHANNEL INPUT BUFFER
CLRB                 ;START WITH CHANNEL 0

PRESET:
STX \POINTX,X        ;STORE POINTER TABLE ADDRESS INTO POINTER TA
STY \\PUSHIX,X       ;PRESET INPUT BUFFER POINTERS
STY \\POPIX,X
LEAY 800,Y           ;LOAD THIS CHANNEL'S START OF OUTPUT BUFFER
STY \\PUSHOX,X       ;AND PRESET OUTPUT BUFFER POINTERS
STY \\POPOX,X
STY \OBOTX,X         ;AND STORE IN POINTER TABLE
LBSR CLRATT          ;CLEAR ALL ATTRIBUTE BYTES IN OUTPUT BUFFER
PSHS Y               ;TEMP SAVE Y
LDY #HOSTIN          ;POINT TO POWER-UP TERMINAL INPUT ROUTINE
STY \INPUTX,X        ;AND SAVE IN TABLE
LDY #OUTPUT          ;LOAD POINTER TO TERMINAL OUTPUT ROUTINE
STY \OUTPTX,X        ;AND SAVE IN TABLE
LDY #HWCLR0          ;POINT TO CHANNEL 0'S TRANSMIT COUNTER ADDRE
LEAY B,Y             ;NOW POINT TO CHANNEL CURRENTLY BEING INITIA
STY \TTCLRX,X        ;AND STORE HARDWARE TRANSMIT COUNTER ADDRESS
CLR ,Y               ;ALSO CLEAR COUNTER
LEAY 1000,Y          ;NOW REFLECT THE STATUS REGISTER ADDRESS
STY \PSTATX,X        ;AND SAVE
CLR ,Y               ;ALSO CLEAR STATUS REGISTER
LEAY 1000,Y          ;NEXT IS THE HOST INPUT REGISTER ADDRESS
STY \HRBUFX,X        ;SAVE
LDY #ACIA0           ;POINT TO CHANNEL 0 TERMINAL PORT ADDRESS
CLRA                 ;MAKE SURE A IS ZEROED
EXG A,B              ;UPDATE TO POINT TO CURRENT CHANNEL
ASLA
LEAY D,Y
EXG A,B              ;RESTORE A AND B
STY \TTCSRX,X        ;STORE TERMINAL CONTROL/STATUS REGISTER ADDR
LDA #MRESET          ;LOAD MASTER RESET VALUE
STA ,Y               ;AND WRITE TO ACIA
```

```
        LDA #TXOFF              ;INITIALIZE TERMINAL PORT CONTROL REGISTER
        STA ,Y+                 ;AND REFLECT TERMINAL PORT DATA ADDRESS
        STY \TPORTX,X           ;AND STORE INTO POINTER TABLE
        LDY #CLOCK0             ;POINT TO CHANNEL 0'S BAUD RATE LATCH
        LEAY B,Y                ;NOW POINT TO CURRENT CHANNEL'S BAUD RATE LA
        LSRB                    ;RESTORE B
        CMPB #3                 ;IS THIS CHANNEL 3?
        BNE 1$                  ;NO, CONTINUE
        LDY #CLOCK3             ;YES, THIS ONE IS ODD

1$:
        STY \RATEX,X            ;AND SAVE
        LDY DEFALT              ;FETCH DEFAULT BAUD RATE CONSTANT (2400)
        STY [\RATEX,X]          ;AND SEND TO BAUD GENERATOR
        LDA #<<<DEFALT-CLKTBL>/2>*10>  ;MOVE DEFAULT BAUD VALUE
        STA \SPEEDX,X           ;TO POINTER TABLE
        LDA #SSHOT              ;FETCH TIMER INTERRUPT ENABLE CONSTANT
        BITB #1                 ;IS CHANNEL 1 OR 3?
        BEQ 2$                  ;NO, GO ON
        INCA                    ;YES, ADJUST CONSTANT

2$:
        STA \PTMONX,X           ;STORE INTO POINTER TABLE
        LDA #MSHOT              ;FETCH TIMER INTERRUPT DISABLE CONSTANT
        BITB #1                 ;IS CHANNEL 1 OR 3?
        BEQ 3$                  ;NO, GO ON
        INCA                    ;YES, ADJUST CONSTANT

3$:
        STA \PTMSKX,X           ;STORE INTO POINTER TABLE
        TFR B,A                 ;PREPARE TO SET CHANNEL INDICATOR BIT
        INCA                    ;MAKE SURE THAT AT LEAST ONE BIT IS SET
        CMPA #2                 ;LEAVE IT AT THAT?
        BLS 4$                  ;YES, GO ON
        ANDA #^C1               ;NO CLEAR LSB
        ASLA                    ;AND SHIFT

4$:
        STA \MARKX,X            ;AND SAVE
        LEAX \40,X              ;POINT TO START OF NEXT CHANNEL'S POINTER TA
        PULS Y                  ;RESTORE Y
        LEAY 800,Y              ;POINT TO NEXT CHANNEL'S START OF INPUT BUFF
        INCB                    ;BUMP CHANNEL NUMBER
        CMPB #4                 ;DONE INITIALIZING ALL POINTER TABLES?
        LBNE PRESET             ;NOPE
        LDX #CLOCK0-2           ;POINT TO FIRST BAUD GENERATOR
        LDA #FSHOT              ;CONTINOUS OUTPUT CONSTANT FOR BAUD CLOCKS
        CLR \\1,X               ;POINT TO CHANNEL 2 CONTROL REGISTER
        STA ,X                  ;WRITE CONTROL TO CHANNEL 2 BAUD GENERATOR
        INCA                    ;CHANNEL 0 IS AFTER 1
        STA \\1,X               ;WRITE CONTROL TO CHANNEL 1 BAUD GENERATOR
        DECA                    ;MAKE SURE RESET BIT IS OFF
        STA ,X                  ;WRITE CONTROL TO CHANNEL 0 BAUD GENERATOR
        LDX #CLOCK3-6           ;NOW READY FOR CHANNEL 3
        CLR \\1,X               ;POINT TO CHANNEL 3 CONTROL REGISTER
        STA ,X                  ;WRITE CONTROL TO CHANNEL 3 BAUD GENERATOR
```

```
        LDA #1              ;POINT TO CHANNEL 1 CONTROL REGISTER
        STA \\1,X
        CLR ,X              ;AND CLEAR PTM INTERNAL RESET BIT
        LDX #PTM0-2         ;DO THE SAME FOR CHAN 2,3 PTM
        STA \\1,X
        CLR ,X              ;NEEDED TO ENABLE TIMERS
        LDX #PTM0           ;POINT TO CHANNEL 0 TIMER LATCH ADDRESS
        STX \TIMER0         ;AND STORE IN POINTER TABLE
        LDX #PTM0-2         ;NOW POINT TO CONTROL ADDRESS
        STX \PTCTL0         ;AND ALSO STORE IN POINTER TABLE
        LDX #PTM1           ;POINT TO CHANNEL 1 TIMER LATCH ADDRESS
        STX \TIMER1         ;AND STORE IN POINTER TABLE
        LDX #PTM1-3         ;NOW POINT TO CONTROL ADDRESS
        STX \PTCTL1         ;AND ALSO STORE IN POINTER TABLE
        LDX #PTM2           ;POINT TO CHANNEL 2 TIMER LATCH ADDRESS
        STX \TIMER2         ;AND STORE IN POINTER TABLE
        LDX #PTM2-2         ;NOW POINT TO CONTROL ADDRESS
        STX \PTCTL2         ;AND ALSO STORE IN POINTER TABLE
        LDX #PTM3           ;POINT TO CHANNEL 3 TIMER LATCH ADDRESS
        STX \TIMER3         ;AND STORE IN POINTER TABLE
        LDX #PTM3-3         ;NOW POINT TO CONTROL ADDRESS
        STX \PTCTL3         ;AND ALSO STORE IN POINTER TABLE
        RTS                 ;DONE AT LAST

;ROUTINE TO CLEAR ALL ATTRIBUTE BYTES IN THE OUTPUT BUFFER
;REGISTER X CONTAINS THE POINTER TO THE START OF THE APPROPR
;USER PROGRAM SHOULD ALLOW AT LEAST 20 MSEC (ACTIVE RUN) TIM
;OF THIS ROUTINE
;NO REGISTERS ARE AFFECTED

CLRATT:
        PSHS X,Y,D          ;SAVE X, Y, AND D FOR RETURN
        LDY \OBOTX,X        ;LOAD OUTPUT BUFFER STARTING ADDRESS
        LEAY \\1,Y          ;POINT TO FIRST ATTRIBUTE
        LDX #<<OTBUF0-INBUF0>/2>  ;LOAD BYTE COUNT
        CLRA                ;PREPARE TO CLEAR ATTRIBUTE

1$:
        LDB \STAT0          ;REFRESH BUFFER MEMORY REQUEST
        STA ,Y++            ;CLEAR ATTRIBUTE AND POINT TO NEXT ONE
        LEAX \\-1,X         ;CLEARED ALL ATTRIBUTES FOR THIS CHANNEL?
        BNE 1$              ;NO, KEEP GOING
        PULS D,Y,X          ;YES, RESTORE D, Y, AND X
        CLR \\LOOPX,X       ;MAKE SURE THAT LOOP MODE FLAG IS CLEARED
        RTS                 ;AND RETURN
        .SBTTL IRQ INTERRUPT SERVICE ROUTINES

.SBTTL  IRQ INTERRUPT SERVICE POLLING ROUTINE
;'HUNTER' IS THE POLLING ROUTINE TO DECIDE WHO CAUSED INTERR
;AND WHAT TO DO ABOUT IT
;DUPLICATION OF CODE IS FOR SPEEDY SERVICE
HUNTER:
        LDA ACIA0           ;START WITH CHANNEL 0 TERMINAL INTERRUPT (LD
        BPL LOOK1           ;NO INTERRUPT FROM THIS PORT
        LDX #STAT0          ;YES, POINT TO BOTTOM OF POINTER TABLE
        BITA #21            ;INPUT INTERRUPT?
```

```
        BEQ PUTOUT          ;NO, OUTPUT
        LDB ACIA0+1         ;READ INPUT
        JMP [\INPUTX,X]     ;AND PROCESS

LOOK1:
        LDA ACIA1           ;CHECK CHANNEL 1 TERMINAL PORT (LDD ACIA1 NO
        BPL LOOK2           ;NO INTERRUPT FROM THIS PORT
        LDX #STAT1          ;YES, POINT TO BOTTOM OF POINTER TABLE
        BITA #21            ;INPUT INTERRUPT?
        BEQ PUTOUT          ;NO, OUTPUT
        LDB ACIA1+1         ;READ INPUT
        JMP [\INPUTX,X]     ;AND PROCESS

LOOK2:
        LDA ACIA2           ;CHECK CHANNEL 2 TERMINAL PORT (LDD ACIA2 NO
        BPL LOOK3           ;NO INTERRUPT FROM THIS PORT
        LDX #STAT2          ;YES, POINT TO BOTTOM OF POINTER TABLE
        BITA #21            ;INPUT INTERRUPT?
        BEQ PUTOUT          ;NO, OUTPUT
        LDB ACIA2+1         ;READ INPUT
        JMP [\INPUTX,X]     ;AND PROCESS

LOOK3:
        LDA ACIA3           ;CHECK CHANNEL 3 TERMINAL PORT (LDD ACIA3 NO
        BPL MISS            ;NO, CHECK PTM'S
        LDX #STAT3          ;YES, POINT TO BOTTOM OF POINTER TABLE
        BITA #21            ;INPUT INTERRUPT?
        BEQ PUTOUT          ;NO, OUTPUT
        LDB ACIA3+1         ;READ INPUT
        JMP [\INPUTX,X]     ;AND PROCESS

PUTOUT:
        JMP [\OUTPTX,X]     ;OUTPUT

MISS:
        LDB TRACE           ;LOAD INTERRUPT TRACKING STATUS
        LDA PTM0-1          ;IS IT CHANNEL 0 OR 1 TIMER INTERRUPT?
        BPL 2$              ;NO, GO ON
        BITA #1             ;YES, IS CHANNEL 0?
        BEQ 1$              ;NO, MUST BE CHANNEL 1
        LDX #STAT0          ;YES, POINT TO BOTTOM OF POINTER TABLE
        ORB #10             ;SET INTERRUPT BIT FOR SELF TEST
        BRA 4$              ;AND SERVICE INTERRUPT

1$:
        LDX #STAT1          ;POINT TO BOTTOM OF CHANNEL 1'S POINTER TABL
        ORB #20             ;SET INTERRUPT BIT FOR SELF TEST
        BRA 4$              ;AND SERVICE INTERRUPT

2$:
        LDA PTM2-1          ;IS IT CHANNEL 2 OR 3 TIMER INTERRUPT?
        BPL 5$              ;NO, TRY TO IGNORE IT
        BITA #1             ;YES, IS CHANNEL 2?
        BEQ 3$              ;NO, MUST BE CHANNEL 3
        LDX #STAT2          ;YES, POINT TO BOTTOM OF POINTER TABLE
        ORB #40             ;SET INTERRUPT BIT FOR SELF TEST
```

```
        BRA 4$           ; AND SERVICE INTERRUPT

3$:
LDX #STAT3        ; POINT TO BOTTOM OF CHANNEL 3'S POINTER TABL
ORB #80           ; SET INTERRUPT BIT FOR SELF TEST

4$:
LBRA TYMOUT       ; AND SERVICE INTERRUPT

5$:
RTI               ; TRY TO RETURN FROM UNDEFINED INTERRUPT??
     .SBTTL   TERMINAL INPUT INTERRUPT SERVICE ROUTINE (BI
; THIS ROUTINE CONTAINS NO FRILLS
; BINARY IS ALLOWED
; DOUBLE CTRL C, DATA OVERRUN, AND FRAMING ERROR DETECTION AR
; THIS ROUTINE IS USED WHEN BINARY MODE IS ENABLED (BY PORT C
; REGISTER X POINTS TO TOP OF RELEVANT POINTER TABLE
; REGISTER A CONTAINS THE CONTENTS OF THE ACIA STATUS REGISTE
; REGISTER B CONTAINS THE INPUT CHARACTER
; IRQ INTERRUPTS ARE DISABLED DURING THIS ENTIRE ROUTINE
; IT IS CRUCIAL THAT THIS ROUTINE BE AS SHORT AS POSSIBLE SO
; CHARACTERS ARE NOT LOST
LTREAD:
LDY \\PUSHIX,X    ; FETCH INPUT BUFFER POINTER AND REFRESH BUFF
STB ,Y+           ; STORE CHARACTER INTO INPUT BUFFER
ANDA #30          ; SAVE ONLY OVERRUN AND FRAMING ERROR BITS OF
EXG Y,D           ; MOVE UPDATED INPUT WRITE POINTER TO AC
ANDA #^C8         ; TAKE CARE OF ANY WRAP-AROUND
CMPD \\POPIX,X    ; IS INPUT BUFFER FULL?
EXG Y,D           ; RESTORE Y AND D
BNE 1$            ; NO, GO ON
ORA #20           ; YES, SET OVERRUN BIT
LDY \\PUSHIX,X    ; AND RESTORE OLD INPUT WRITE BUFFER POINTER

1$:
ANDB #7F          ; MASK OFF BIT 8 OF INPUT CHAR
CMPB #ETX         ; IS CTRL C?
BNE 2$            ; NO, GO ON
TST \\CCFLGX,X    ; YES, IS SECOND CTRL C?
BEQ 3$            ; NO, FIRST
ORA #40           ; YES, SET SECOND CTRL C BIT OF STATUS

2$:
CLR B             ; PREPARE TO CLEAR CTRL C FLAG

3$:
STB \\CCFLGX,X    ; STORE CTRL C FLAG STATE
STY \\PUSHIX,X    ; STORE INPUT WRITE BUFFER POINTER FOR NEXT T

WATCH:
ORA \\STATX,X     ; OR IN CURRENT PORT TERMINAL INPUT STATUS BY
STA \\STATX,X     ; AND WRITE BACK
LDD \\POPIX,X     ; FETCH INPUT BUFFER READ POINTER
SUBD \\PUSHIX,X   ; DETERMINE NUMBER OF FREE LOCATIONS IN BUFFE
ANDA #7           ; ONLY LOOK AT 11 BITS (2K)
CMPD #MAXRM       ; FREE SPACE CRITICAL?
```

```
        BHI  2$              ;LOTS OF SPACE
        TST  \FLAGDX,X       ;IS FLAGGED INPUT IN EFFECT?
        BEQ  1$              ;NO, FORGET IT
        TST  \FROZX,X        ;XOFF ALREADY SENT?
        BNE  1$              ;YES, LET'S GO ALREADY
        LDA  #XOFF!80        ;QUEUE XOFF
        STA  \FROZX,X
        TST  \\OTFLGX,X      ;IS OUTPUT CURRENTLY IN PROGRESS?
        LBEQ TRIGGR          ;NO, START NEW OUTPUT

1$:
        RTI                  ;DONE WITH TERMINAL INPUT

2$:
        LDB  \\HOLDX,X       ;TIMEOUT HOLD MODE IN EFFECT?
        BITB #3
        BEQ  3$              ;NO, ALL DONE
        TST  \RLOADX,X       ;ALREADY TIMED OUT?
        BEQ  3$              ;YES, SKIP ACTIVE BIT
        LDA  #2              ;NO, INDICATE ACTIVE
        STA  \RLOADX,X

3$:
        RTI                  ;DONE WITH TERMINAL INPUT

.SBTTL   TERMINAL INPUT INTERRUPT SERVICE ROUTINE (NON-BINARY
;THIS ROUTINE CONTAINS SOME FRILLS...SUCH AS OUTPUT CONTROL
;<CTRL S> AND <CTRL Q>
;ALSO, <CTRL C> AND <CTRL O> KILLS THE OUTPUT BUFFER
;AND <CTRL X> KILLS THE INPUT BUFFER
;DOUBLE <CTRL C>, DATA OVERRUN, AND FRAMING ERROR DETECTION
;THIS ROUTINE IS USED WHEN BINARY MODE IS DISABLED (BY PORT
;THIS ROUTINE IS ALSO DEFAULT AT POWER-UP/RESET TIME
;REGISTER X POINTS TO TOP OF RELEVANT POINTER TABLE
;REGISTER A CONTAINS THE CONTENTS OF THE ACIA STATUS REGISTE
;REGISTER B CONTAINS THE INPUT CHARACTER
;IRQ INTERRUPTS ARE DISABLED DURING THIS ENTIRE ROUTINE
;IT IS IMPORTANT THAT THIS ROUTINE BE AS SHORT AS POSSIBLE S
;CHARACTERS ARE NOT LOST

HOSTIN:
        LDY  \\PUSHIX,X      ;FETCH INPUT BUFFER POINTER AND REFRESH BUFF
        STB  ,Y              ;STORE CHARACTER INTO INPUT BUFFER
        ANDB #7F             ;MASK OFF BIT 8
        CMPB #CAN            ;IS INPUT A CTRL X?
        BNE  1$              ;NO, GO ON
        STY  \KILLIX,X       ;YES, REQUEST KILL INPUT BUFFER

1$:
        ANDA #30             ;SAVE ONLY OVERRUN AND FRAMING ERROR BITS OF
        EXG  Y,D             ;MOVE INPUT WRITE POINTER TO AC
        ADDD #1              ;INCREMENT POINTER
        ANDA #^CB            ;TAKE CARE OF ANY WRAP-AROUND
        CMPD \\POPIX,X       ;IS INPUT BUFFER FULL?
        EXG  Y,D             ;RESTORE Y AND D
```

```
        BNE 2$              ;NO, GO ON
        ORA #20             ;YES, SET OVERRUN BIT
        BRA 3$              ;DON'T UPDATE THE BUFFER WRITE POINTER

2$:
        STY \\PUSHIX,X      ;STORE NEW BUFFER WRITE POINTER

3$:
        CMPB #ETX           ;IS CTRL C?
        BNE 4$              ;NO, GO ON
        CLR \\GOFLGX,X      ;YES, CLEAR OUTPUT STOPPED FLAG
        ORA #40             ;DEFAULT TO SECOND CTRL C IN A ROW
        TST \\CCFLGX,X      ;IS SECOND CTRL C?
        BNE 8$              ;YES, REQUEST KILL OUTPUT BUFFER
        STB \\CCFLGX,X      ;NO, SET CTRL C FLAG
        ANDA #^C40          ;CLEAR SECOND CTRL C RECEIVED BIT
        BRA 8$              ;AND REQUEST KILL OUTPUT BUFFER

4$:
        CLR \\CCFLGX,X      ;CLEAR CTRL C FLAG

5$:
        CMPB #XOFF          ;IS INPUT A CTRL S?
        BNE 6$              ;NO, GO ON
        STB \\GOFLGX,X      ;YES, SET STOP OUTPUT FLAG
6$:
        CMPB #XON           ;IS INPUT A CTRL Q?
        BNE 7$              ;NO, GO ON
        CLR \\GOFLGX,X      ;YES, CLEAR STOP OUTPUT FLAG

7$:
        CMPB #SI            ;IS INPUT A CTRL O?
        BNE 9$              ;NO, GO ON

8$:
        TST \KILLOX,X       ;IS AN OUTPUT BUFFER KILL REQUEST ALREADY QU
        BMI 9$              ;YES, GO ON
        LDY \\PUSHOX,X      ;REQUEST OUTPUT BUFFER KILL
        STY \KILLOX,X

9$:
        LBRA WATCH          ;CHECK FOR FLAGGED INPUT MODE

.SBTTL  TERMINAL INPUT INTERRUPT SERVICE ROUTINE FOR SELF TE
;THIS ROUTINE CONTAINS ABSOLUTELY NO FRILLS
;NO ERROR DETECTION IS INCLUDED
;INPUT IS STORED IN THE CHANNEL'S INPUT BUFFER
;BUFFER POINTERS ARE UNCHANGED
;REGISTER X POINTS TO TOP OF RELEVANT POINTER TABLE
;REGISTER A CONTAINS THE CONTENTS OF THE ACIA STATUS REGISTE
;REGISTER B CONTAINS THE INPUT CHARACTER
;IRQ INTERRUPTS ARE DISABLED DURING THIS ENTIRE ROUTINE

INSELF:
        LDY \\PUSHIX,X      ;LOAD INPUT BUFFER POINTER
        STB ,Y              ;STORE CHARACTER
```

```
        LDA TRACE           ;FETCH INTERRUPT STATUS
        ORA \MARKX,X        ;MARK CHANNEL WHO DID IT
        STA TRACE           ;AND SAVE FOR SELF TEST
        RTI                 ;DONE WITH TERMINAL INPUT
              .SBTTL  TERMINAL OUTPUT INTERRUPT SERVICE ROUTINE
;REGISTER X POINTS TO THE TOP OF THE RELEVANT POINTER TABLE

OUTPUT:
        LDA #TXOFF          ;TURN TRANSMIT INTERRUPT OFF
        STA [\TTCSRX,X]
        TST \\GOFLGX,X      ;IS OUTPUT STOPPED?
        BNE EMPTY           ;YES, GO NO FURTHER
        LDA \FROZX,X        ;SEND XOFF OR XON?
        BPL 2$              ;NO, GO ON
        ANDA #7F            ;YES, MASK QUEUE BIT
        STA [\TPORTX,X]     ;AND TRANSMIT
        CMPA #XON           ;WAS IT AN XON?
        BNE 1$              ;NO, LEAVE FLAG SET
        CLRA                ;YES, INDICATE INPUT NO LONGER STOPPED

1$:
        STA \FROZX,X        ;SAVE INPUT STOPPED STATUS
        BRA TRIGGR          ;ENABLE OUTPUT INTERRUPTS

2$:
        LDY \\POPOX,X       ;FETCH OUTPUT BUFFER READ POINTER
        CMPY \\PUSHOX,X     ;ANY MORE CHARS TO OUTPUT?
        BNE XMIT            ;YES, OUTPUT ANOTHER

EMPTY:
        CLR \\OTFLGX,X      ;CLEAR CHAR OUTPUT IN PROGRESS FLAG

EXIT:
        RTI                 ;RETURN FROM INTERRUPT

;ATTRIBUTE BITS EXAMINATION SECTION
;REGISTER Y POINTS TO THE OUTPUT BUFFER READ POINTER
;REGISTER X POINTS TO THE TOP OF THE RELEVANT POINTER TABLE
;ATTRX OFFSET WILL POINT TO LAST READ ATTRIBUTES UPON BRANCH
;THIS IS PART OF THE OUTPUT ROUTINE

XMIT:
        TST \KILLOX,X       ;HAS KILL OUTPUT BUFFER REQUEST BEEN MADE?
        BMI EMPTY           ;YES, GO NO FURTHER
        ANDCC #^CIMASK      ;ALLOW INTERRUPTS
        LDB \\1,Y           ;GET CURRENT CHARACTER ATTRIBUTES
        STB \ATTRX,X        ;SAVE AS LAST READ ATTRIBUTES
        BEQ PUTCHR          ;NO ATTRIBUTES
        CMPB #0E8           ;GENERATE OUTPUT BREAK?
        BLO 1$              ;NO, GO ON
        LDA #BREAK          ;YES, LET ACIA HANDLE IT
        STA [\TTCSRX,X]
        BRA 2$              ;FIND OUT HOW LONG

1$:
        TSTB                ;START OF REPEAT MODE?
```

```
        BPL 2$              ;START REPEAT MODE BIT IS NOT EVEN SET
        STY \\LOOPX,X       ;REPEAT MODE, SAVE STARTING ADDRESS OF LOOP

2$:
        ANDB #7             ;LOOK ONLY AT DELAY BITS
        BEQ PUTCHR          ;NO DELAY BITS
        LBSR SETOFF         ;START TIMER
        RTI                 ;ALL FOR NOW

;ACTUAL TERMINAL OUTPUT SECTION
;REGISTER Y POINTS TO THE OUTPUT BUFFER READ POINTER
;REGISTER X POINTS TO THE TOP OF THE RELEVANT POINTER TABLE
;ATTRX OFFSET POINTS TO CURRENT ATTRIBUTE INFORMATION
;READ POINTER IS UPDATED TO REFLECT READ
;THIS IS PART OF THE OUTPUT ROUTINE

PUTCHR:
        CMPY \\PUSHOX,X     ;HAS OUTPUT BUFFER BEEN ZEROED VERY RECENTLY
        BEQ TRIGGR          ;YES, SKIP POINTER UPDATE
        LDB \ATTRX,X        ;FETCH CURRENT ATTRIBUTE INFORMATION AND REF
        LDA ,Y              ;GET NEXT CHARACTER TO OUTPUT
        BITB #8             ;OK TO OUTPUT THIS CHAR?
        BNE 1$              ;NO, SKIP IT
        STA [\TPORTX,X]     ;YES, OUTPUT

1$:
        TST \\LOOPX,X       ;IS REPEAT MODE ENABLED?
        BMI 2$              ;YES, DON'T CLEAR ATTRIBUTE BYTE
        CLRA                ;NO, CLEAR ATTRIBUTE BYTE
        STA \\1,Y           ;BUT DON'T USE THE CLR INSTRUCTION!
        BRA 3$              ;SKIP REPEAT MODE SECTION

2$:
        BITB #40            ;IS THIS THE END OF REPEAT MODE?
        BEQ 3$              ;NO, GO ON
        CMPB #0E8           ;SURE IT'S NOT JUST A BREAK?
        BHS 3$              ;BREAK
        LDD \\LOOPX,X       ;FETCH BEGINNING ADDRESS OF LOOP FOR NEXT OU
        BRA 4$              ;DON'T UPDATE CURRENT READ POINTER

3$:
        TFR Y,D             ;PREPARE TO UPDATE READ POINTER FOR NEXT TIM
        ANDA #^C8           ;MAKE ROOM FOR ANY OVERFLOW DUE TO UPDATE
        ADDD #2             ;2 BYTES PER OUTPUT
        ORA #8              ;RESTORE BUFFER ADDRESS BIT

4$:
        STD \\POPOX,X       ;STORE NEW OUTPUT READ POINTER

TRIGGR:
        ORCC #IMASK         ;NO MORE IRQ INTERRUPTS (POTENTIAL STACK OVE
        LDA #TXON           ;ENABLE OUTPUT INTERRUPTS
        STA [\TTCSRX,X]
        RTI                 ;DONE

.SBTTL  TIMER INTERRUPT SERVICE ROUTINE
```

;REGISTER B CONTAINS INTERRUPT TRACKING STATUS FOR SELF TEST
;REGISTER X POINTS TO THE BOTTOM OF INTERRUPTING CHANNEL'S P

```
TYMOUT:
    STB TRACE          ;LOG INTERRUPT STATUS FOR SELF TEST
    LDY [\TIMERX,X]    ;CLEAR INTERRUPT BIT
    DEC \RLOADX,X      ;DECREMENT RELOAD COUNT AND CHECK FOR 0
    BNE 1$             ;NO, COUNTER IS RESET AUTOMATICALLY
    LDA \PTMSKX,X      ;FETCH COUNTER DISABLE CONTROL BYTE
    STA [\PTCTLX,X]    ;AND DISABLE PTM INTERRUPTS
    LDA \\HOLDX,X      ;IS TIMEOUT HOLD MODE IN EFFECT?
    BITA #3
    BNE 1$             ;YES, RETURN TO MAINLINE
    ANDCC #^CIMASK     ;RE-ENABLE IRQ INTERRUPTS
    LDY \\POPOX,X      ;LOAD OUTPUT READ POINTER
    BRA PUTCHR         ;OUTPUT CHARACTER

1$:
    RTI                ;DONE WITH THIS INTERRUPT
        .SBTTL BAUD RATE CONSTANTS LOOKUP TABLE

CLKTBL:
    .WORD B150         ;150   BAUD
    .WORD B300         ;300   BAUD
    .WORD B600         ;600   BAUD
    .WORD B1200        ;1200  BAUD

DEFALT:
    .WORD B2400        ;2400  BAUD
    .WORD B4800        ;4800  BAUD
    .WORD B9600        ;9600  BAUD

TOPCLK:
    .WORD B19200       ;19200 BAUD
```

;TABLE OF MAXIMUM TIMEOUTS FOR SELF TEST BAUD RATE AND TIMER
;EACH ENTRY IS ALSO USED TO COMPUTE A CORRESPONDING 'MINTBL'
;ORDER MUST BE THE SAME AS FOR 'CLKTBL'
;THE FIRST EIGHT TIMEOUTS ARE FOR BAUD RATE TESTING
;THE LAST THREE TIMEOUTS ARE FOR PROGRAMMABLE TIMER TESTING

```
MAXTBL:
    .WORD 6068.        ;150   BAUD   (103  MSEC)
    .WORD 3034.        ;300   BAUD   (51.8 MSEC)
    .WORD 1517.        ;600   BAUD   (25.9 MSEC)
    .WORD 759.         ;1200  BAUD   (12.9 MSEC)
    .WORD 379.         ;2400  BAUD   ( 6.4 MSEC)
    .WORD 190.         ;4800  BAUD   ( 3.2 MSEC)
    .WORD 95.          ;9600  BAUD   ( 1.6 MSEC)
    .WORD 47.          ;19200 BAUD   ( .81 MSEC)

.WORD 187.         ;2     MSEC   ( 3.2 MSEC)
    .WORD 374.         ;4     MSEC   ( 6.4 MSEC)
    .WORD 4681.        ;50    MSEC   (80.0 MSEC)
```

;TABLE OF MINIMUM TIMEOUTS FOR SELF TEST BAUD RATE AND TIMER

```
;EACH ENTRY IS EQUAL TO MAXIMUM TIME ALLOWED MINUS MINIMUM T
;ORDER MUST BE THE SAME AS FOR 'CLKTBL'
;THE FIRST EIGHT TIMEOUTS ARE FOR BAUD RATE TESTING
;THE LAST THREE TIMEOUTS ARE FOR PROGRAMMABLE TIMER TESTING

MINTBL:
.WORD  6068.-3413. ;150    BAUD  (58.3 MSEC)
.WORD  3034.-1707. ;300    BAUD  (29.1 MSEC)
.WORD  1517.-853.  ;600    BAUD  (14.5 MSEC)
.WORD  759.-427.   ;1200   BAUD  ( 7.2 MSEC)
.WORD  379.-213.   ;2400   BAUD  ( 3.6 MSEC)
.WORD  190.-107.   ;4800   BAUD  ( 1.8 MSEC)
.WORD  95.-53.     ;9600   BAUD  ( .91 MSEC)
.WORD  47.-27.     ;19200  BAUD  ( .46 MSEC)

.WORD  187.-105.   ;2      MSEC  ( 1.8 MSEC)
.WORD  374.-211.   ;4      MSEC  ( 3.6 MSEC)
.WORD  4681.-2633. ;50     MSEC  (45.0 MSEC)

.SBTTL TIME DELAY CONSTANTS TABLE

DLYTBL:
.BYTE  1           ;RELOAD COUNT FOR 2 MSEC
.WORD  2458.       ;COUNT VALUE
.BYTE  0           ;FILLER

.BYTE  1           ;RELOAD COUNT FOR 4 MSEC
.WORD  4916.       ;COUNT VALUE
.BYTE  0           ;FILLER

TSTMAX:
.BYTE  1           ;RELOAD COUNT FOR 50 MSEC
.WORD  61440.      ;COUNT VALUE
.BYTE  0           ;FILLER

.BYTE  10.         ;RELOAD COUNT FOR 500 MSEC
.WORD  61440.      ;COUNT VALUE
.BYTE  0           ;FILLER

.BYTE  20.         ;RELOAD COUNT FOR 1 SECOND
.WORD  61440.      ;COUNT VALUE
.BYTE  0           ;FILLER

.BYTE  40.         ;RELOAD COUNT FOR 2 SECONDS
.WORD  61440.      ;COUNT VALUE
.BYTE  0           ;FILLER

.BYTE  100.        ;RELOAD COUNT FOR 5 SECONDS
.WORD  61440.      ;COUNT VALUE
.SBTTL SELF TEST MESSAGE AREA
;'!' SENDS CR/LF

MESG1:
.ASCII /!LT-11 SELF TEST  V/
.BYTE  IDENT+'0
```

```
        .ASCII  /./
        .BYTE   MOD+'0
        .ASCIZ  /!!ROM/

MESG2A:
        .ASCIZ  /!!RAM ('E' ENDS, 'L' LOOPS, 'S' STOPS ON ERROR)/

MESG2B:
        .ASCIZ  /![0000-03FF] /

MESG3:
        .ASCIZ  /![8000-BFFF] /

MESG4:
        .ASCIZ  /!!LOOPING.../

MESG6:
        .ASCIZ  "!!TERMINAL I/O!"<CR><CR>       ;('INIT' ROUTINE IN

MESG99:
        .ASCIZ  /!!TEST COMPLETE!/<CR><CR>      ;('INIT' INITIALIZE

;ERROR MESSAGE AREA

ERR1:
        .ASCIZ  /!** ROM ERROR **/

ERR2A:
        .ASCIZ  <CR><LF>/** RAM ERROR AT ADDRESS /

ERR2B:
        .ASCIZ  /   EX:/
ERR2C:
        .ASCIZ  /   RE:/

ERR2D:
        .ASCIZ  / ** /

ERR3:
        .ASCIZ  /!!** STOPPED **!/

ERR4A:
        .ASCIZ  "!** I/O ERROR ON CHANNEL "

ERR4B:
        .ASCIZ  / - RATE:/

ERR4C:
        .ASCIZ  / - EARLY INPUT/

ERR4D:
        .ASCIZ  / - NO INPUT/

ERR4E:
        .ASCIZ  / - UNEXPECTED INTERRUPT/
```

```
;SPECIAL ROM DATA FOR CHECKSUM TEST DUE TO THE PROCESSOR BE
;ACCESS SOME ROM LOCATIONS BECAUSE OF THE PROGRAMMABLE INTER

VECLST:
.WORD PORT11       ;SAME CONTENTS AS ADDRESSES F000-F001
.WORD ATT11        ;SAME CONTENTS AS ADDRESSES F002-F003
.WORD OUT11        ;SAME CONTENTS AS ADDRESSES F004-F005
.WORD HUNTER       ;SAME CONTENTS AS ADDRESSES F006-F007
.WORD START        ;SAME CONTENTS AS ADDRESSES F008-F009

.SBTTL INTERRUPT VECTOR ADDRESSES
.=0FFE0

INTVEC:
.WORD 0FFFF        ;HARDWARE RESERVES LOCATIONS FROM FFE0 ON
.WORD 0FFFF
.WORD 0FFFF
.WORD 0FFFF
.WORD IN11         ;HOST INPUT CHANNEL 3
.WORD IN11         ;HOST INPUT CHANNEL 2
.WORD IN11         ;HOST INPUT CHANNEL 1
.WORD IN11         ;HOST INPUT CHANNEL 0
.WORD PORT11       ;HOST PORT CONTROL OUTPUT (SEE 'VECLST' ABOV
.WORD ATT11        ;HOST DATA ATTRIBUTE OUTPUT (SEE 'VECLST' AB
.WORD OUT11        ;HOST DATA OUTPUT (SEE 'VECLST' ABOVE)
.WORD HUNTER       ;IRQ INTERRUPTS (SEE 'VECLST' ABOVE)
.WORD START        ;DUMMY (HARDWARE DETERMINES FIRQ VECTORS) (S
.WORD START        ;SWI2
.WORD TESTME       ;NMI OR SWI3 (INITIATES SELF TEST)
.WORD START        ;POWER UP/RESTART

.END START
```

APPENDIX B

| No. | \_Product Term\_ 15 | 14 | 13 | 12 | 11 | 10 | 9 | 8 | 7 | 6 | 5 | 4 | 3 | 2 | 1 | 0 | \_Active Level\_ 7 | 6 | 5 | 4 | 3 | 2 | 1 | 0 |
|---|---|---|---|---|---|---|---|---|---|---|---|---|---|---|---|---|---|---|---|---|---|---|---|---|
| 0  | — | — | L | H | L | L | L | L | L | — | — | L | L | L | H | H | . | A | A | . | . | A | . | A |
| 1  | — | — | L | H | L | L | L | L | L | — | — | L | L | H | H | H | A | A | A | . | A | . | A | A | A |
| 2  | — | — | L | H | L | L | L | L | L | — | — | L | H | L | H | H | A | . | A | . | . | . | . | . | A |
| 3  | — | — | L | H | L | L | L | L | L | — | — | H | L | L | H | H | . | A | A | . | . | A | A | A |
| 4  | — | — | L | H | L | L | L | L | L | L | L | H | L | H | H | H | A | A | A | . | . | A | A | A |
| 5  | — | — | L | H | L | L | L | L | L | H | H | H | L | H | H | H | A | A | A | . | . | A | A | A |
| 6  | — | — | L | H | L | L | L | L | L | L | H | H | L | H | H | H | A | A | A | . | A | A | . | A |
| 7  | — | — | L | H | L | L | L | L | H | L | H | L | H | H | H | A | A | A | A | . | A | . | A |
| 8  | — | — | L | H | L | L | L | L | L | — | — | H | H | L | H | H | A | A | . | . | . | A | . | A |
| 9  | — | — | L | H | L | L | L | L | L | — | — | H | H | H | H | H | A | A | A | A | A | . | . | A |
| 10 | — | — | L | H | L | L | L | L | H | — | — | L | L | L | H | L | . | A | A | . | . | A | . | A |
| 11 | — | — | L | H | L | L | L | L | H | — | — | L | L | H | H | L | A | A | A | . | . | A | A | A |
| 12 | — | — | L | H | L | L | L | L | H | — | — | L | H | L | H | L | A | . | A | . | . | . | . | A |
| 13 | — | — | L | H | L | L | L | L | H | — | — | H | L | L | H | L | . | A | A | . | . | A | . | A |
| 14 | — | — | L | H | L | L | L | L | H | L | L | H | L | H | H | L | A | A | A | . | . | A | A | A |
| 15 | — | — | L | H | L | L | L | L | H | H | H | H | L | H | H | L | A | A | A | . | . | A | A | A |
| 16 | — | — | L | H | L | L | L | L | H | L | H | H | L | H | H | L | A | A | A | . | A | A | . | A |
| 17 | — | — | L | H | L | L | L | H | H | L | H | L | H.H | L | A | A | A | A | . | A | . | A |
| 18 | — | — | L | H | L | L | L | L | H | — | — | H | H | L | H | L | A | A | . | . | . | A | . | A |
| 19 | — | — | L | H | L | L | L | L | H | — | — | H | H | H | H | L | A | A | A | A | . | . | A |
| 20 | — | — | L | H | L | L | L | H | L | — | — | L | L | L | L | H | . | A | A | . | . | A | . | A |
| 21 | — | — | L | H | L | L | L | H | L | — | — | L | L | H | L | H | A | A | A | . | . | A | A | A |
| 22 | — | — | L | H | L | L | L | H | L | — | — | L | H | L | L | H | A | . | A | . | . | . | . | A |
| 23 | — | — | L | H | L | L | L | H | L | — | — | H | L | L | L | H | . | A | A | . | . | A | A | A |
| 24 | — | — | L | H | L | L | L | H | L | L | L | H | L | H | L | H | A | A | A | . | . | A | A | A |
| 25 | — | — | L | H | L | L | L | H | L | H | H | H | L | H | L | H | A | A | A | . | . | A | A | A |
| 26 | — | — | L | H | L | L | L | H | L | L | H | H | L | H | L | H | A | A | A | . | A | A | . | A |

-continued

APPENDIX B

| No. | 15 | 14 | 13 | 12 | 11 | 10 | 9 | 8 | 7 | 6 | 5 | 4 | 3 | 2 | 1 | 0 | 7 | 6 | 5 | 4 | 3 | 2 | 1 | 0 |
|---|---|---|---|---|---|---|---|---|---|---|---|---|---|---|---|---|---|---|---|---|---|---|---|---|
| 27 | — | — | L | H | L | L | L | H | L | H | L | H | L | H | L | H | A | A | A | A | . | A | . | A |
| 28 | — | — | L | H | L | L | L | H | L | — | — | H | H | L | L | H | A | A | . | . | . | A | . | A |
| 29 | — | — | L | H | L | L | L | H | L | — | — | H | H | H | L | H | A | A | A | A | A | . | . | A |
| 30 | — | — | L | H | L | L | L | H | H | — | — | L | L | L | L | L | . | A | A | . | . | A | . | A |
| 31 | — | — | L | H | L | L | L | H | H | — | — | L | L | H | L | L | A | A | A | . | . | A | A | A |
| 32 | — | — | L | H | L | L | L | H | H | — | — | L | H | L | L | L | A | . | A | . | . | . | . | A |
| 33 | — | — | L | H | L | L | L | H | H | — | — | H | L | L | L | L | . | A | A | . | . | A | . | A |
| 34 | — | — | L | H | L | L | L | H | H | L | L | H | L | H | L | L | A | A | A | . | . | A | A | A |
| 35 | — | — | L | H | L | L | L | H | H | H | H | H | L | H | L | L | A | A | A | . | . | A | A | A |
| 36 | — | — | L | H | L | L | L | H | H | L | H | H | L | H | L | L | A | A | A | . | A | A | . | A |
| 37 | — | — | L | H | L | L | L | H | H | H | L | H | L | H | L | L | A | A | A | A | . | A | . | A |
| 38 | — | — | L | H | L | L | L | H | H | — | — | H | H | L | L | L | A | A | . | . | . | A | . | A |
| 39 | — | — | L | H | L | L | L | H | H | — | — | H | H | H | L | L | A | A | A | A | A | . | . | A |
| 40 | — | — | H | — | — | — | — | — | — | — | — | — | — | — | — | — | A | A | A | . | . | A | . | . |
| 41 | — | — | — | L | — | — | — | — | — | — | — | — | — | — | — | — | A | A | A | . | . | A | . | . |
| 42 | — | — | — | — | H | — | — | — | — | — | — | — | — | — | — | — | A | A | A | . | . | A | . | . |
| 43 | — | — | — | — | — | H | — | — | — | — | — | — | — | — | — | — | A | A | A | . | . | A | . | . |
| 44 | — | — | — | — | — | — | — | L | — | — | — | — | — | — | — | L | A | A | A | . | . | A | . | . |
| 45 | — | — | — | — | — | — | — | H | — | — | — | — | — | — | — | H | A | A | A | . | . | A | . | . |
| 46 | — | — | — | — | — | — | — | — | L | — | — | — | — | — | — | L | A | A | A | . | . | A | . | . |
| 47 | — | — | — | — | — | — | — | — | H | — | — | — | — | — | — | H | A | A | A | . | . | A | . | . |

L: LOW INPUT
H: HIGH INPUT
—: DON'T CARE INPUT
A: HIGH OUTPUT
.: LOW OUTPUT
INPUTS 12-7 CORRESPOND TO UNIBUS ADDRESS LINES A10-A5

I claim:

1. A communication interface for controlling data transmission between a host computer and at least one external device, the data consisting of one or more characters, said communications interface comprising:
   (a) control means comprising a microprocessor;
   (b) data storage means and bus means coupling said control means in addressing relation to said data storage means so that said data storage means is addressed by said microprocessor of said control means;
   (c) said interface further includidng means for
      (i) coupling data from the host computer to an output buffer maintained within said data storage means, said output buffer having a plurality of sequentially addressable data storage character locations in said data storage means which are addressed by said microprocessor without data transfer from said microprocessor such that a data character received from the host computer is stored in the next sequentially available data storage location of said output buffer without reading of said data by said microprocessor; and
      (ii) data transfer from said output buffer to an external output device independently of the operation of the host computer; and
   (d) address storage means for storing a pointer to the next sequentially available data storage location of said output buffer, said address storage means being accessed by said microprocessor for obtaining said pointer for addressing said next sequentially available data storage location of said output buffer.

2. A communications interface as recited in claim 1, said control means further including means for
   (i) controlling, independently of the operation of the host computer, data transfer from an external input device to an input buffer maintained within said data storage means; and
   (ii) controlling data transfer from said input buffer to the host computer.

3. A communications interface as recited in claim 2 further comprising a register for storing data to be input to the host computer and wherein said control means control data transfer from said input buffer to the host computer by transferring the data from said input buffer to said register and then signalling the host computer that the data may be extracted from said register.

4. A communications interface as recited in claim 3 wherein said output buffer comprises 1,022 sequentially addressable data storage locations.

5. A communications interface as recited in claim 3 wherein said input buffer comprises 2,048 sequentially addressable data storage locations.

6. A commmunications interface as recited in claim 1 wherein said means for coupling data from said host computer to an output buffer comprises:
   (a) a register for storing data received from the host computer; and
   (b) means for disabling data transfer from said microprocessor to said data storage means and for enabling data transfer from said register to said data storage means;
whereby data is transferred from said register into a data storage location of said data storage means addressed by said microprocessor.

7. A communications interface as recited in claim 6 further comprising:
   (a) a counter connected to said register for counting data characters received from the host computer; and
   (b) means for resetting said counter via said control means if a preselected number of data storage locations of said output buffer are available to receive data;
whereby:
   (i) a predetermined count of said counter signals the host computer that no data storage locations of said output buffer are available to receive data; and (ii) resetting of said counter signals the host computer that data storage locations of said output buffers are available to receive data.

8. A communications interface as recited in claim 6 further comprising digital circuit means for changing the access operation in said address storage means so as to change to the address of the first data storage location of said output buffer if the address as first accessed in said address storage means exceeds the address of the last data storage location of said output buffer.

9. A communications interface as recited in claim 6 further comprising a timer under control of said control means for timing host computer specified time delays between transmission of successive data characters from said output buffer to the output device.

10. A communications interface as recited in claim 6 further comprising a programmable under control of said control means timer for timing the rate of data transfer from said output buffer to the output device.

11. A communications interface for controlling data transmission between a host computer and a plurality of input and output devices, the data consisting of one or more characters, said communications interface comprising:

(a) control means comprising a microprocessor; and
(b) data storage means and bus means coupling said control means in addressing relation to said data storage means so that said data storage means is addressed by the microprocessor of said control means, said data storage means including a plurality of output buffers, each one of said output buffers corresponding to one of said output devices and each adapted to store a plurality of characters, and further including means for coupling data from the host computer to an output buffer corresponding to an output device specified by the host computer, said output buffers each having a plurality of sequentially addressable data storage locations in said data storage means for respective characters, which locations are addressed by said microprocessor without data transfer from said microprocessor such that data for a character received from the host computer is stored in the next sequentially available data storage location of the output buffer corresponding to the output device specified by the host computer without reading of the data by said microprocessor;

(c) said control means including means for controlling data transfer from said output buffers to said corresponding output devices independently of the operation of the host computer;
(d) the interface further comprising address storage means for storing a pointer to the next sequentially available data storage location in the output buffer corresponding to the output device specified by the host computer, said address storage means being accessed by said microprocessor for obtaining said pointer for addressing the next sequentially available data storage location of the output buffer corresponding to the output device specified by the host computer, wherein said pointer is incremented before consecutive access thereof; and
(e) a counter for counting data characters received from said host computer for indicating to said host computer that no storage locations are available in the output buffer corresponding to the output device specified by the host computer when the count of said counter exceeds a predetermined value, said counter being responsive to the availability of storage locations in the output buffer corresponding to the output device specified by the host computer for changing the count in said counter when a predetermined number of storage locations become available.

12. A communications interface as recited in claim 11 wherein said data storage means further includes a plurality of input buffers, each one of said input buffers corresponding to one of said input devices; and said control means further including means for (i) controlling, independently of the operation of the host computer, data transfer from said input devices to said corresponding input buffers; and
(ii) controlling data transfer from said input buffers to the host computer.

13. A communications interface as recited in claim 11 wherein said means for coupling data from said host computer to an output buffer comprises:

(a) a single register for storing one character of data received from the host computer; and
(b) means for disabling data transfer from said microprocessor to said data storage means and for enabling data transfer from said register to said data storage means;

whereby data is transferred from said register into a data storage location of said data storage means addressed by said microprocessor.

* * * * *